United States Patent
Jung et al.

(10) Patent No.: US 11,908,123 B2
(45) Date of Patent: Feb. 20, 2024

(54) OBJECT INSPECTION APPARATUS AND OBJECT INSPECTION METHOD USING SAME

(71) Applicant: KOH YOUNG TECHNOLOGY INC., Seoul (KR)

(72) Inventors: Choung Min Jung, Siheung-si (KR); Ho Jun Lee, Bucheon-si (KR); Nam Kyu Park, Namyangju-si (KR); Han Rim Kim, Seoul (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 391 days.

(21) Appl. No.: 17/256,497

(22) PCT Filed: Apr. 16, 2019

(86) PCT No.: PCT/KR2019/004557
§ 371 (c)(1),
(2) Date: Dec. 28, 2020

(87) PCT Pub. No.: WO2020/004793
PCT Pub. Date: Jan. 2, 2020

(65) Prior Publication Data
US 2021/0279859 A1    Sep. 9, 2021

Related U.S. Application Data

(60) Provisional application No. 62/692,079, filed on Jun. 29, 2018.

(51) Int. Cl.
*G06T 7/00* (2017.01)
*G01N 21/01* (2006.01)
(Continued)

(52) U.S. Cl.
CPC ........... *G06T 7/0004* (2013.01); *G01N 21/01* (2013.01); *G01N 21/88* (2013.01); *G06T 7/40* (2013.01);
(Continued)

(58) Field of Classification Search
CPC . G06T 7/004; G06T 7/40; G06T 2207/30108; H04N 23/695; G01N 21/01;
(Continued)

(56) References Cited

U.S. PATENT DOCUMENTS 4,679,075 A * 7/1987 Williams ........... G01N 21/8851
209/939
5,249,912 A * 10/1993 Warga, III ......... G01N 27/9026
414/746.3
(Continued)

FOREIGN PATENT DOCUMENTS

CN    102333617    1/2012
CN    204731344    10/2015
(Continued)

OTHER PUBLICATIONS

Korean Office Action with English translation for Korean Patent Application No. 10-2020-7037616, dated Dec. 28, 2020.
(Continued)

*Primary Examiner* — Tri T Ton
*Assistant Examiner* — Jarreas Underwood
(74) *Attorney, Agent, or Firm* — KILE PARK REED & HOUTTEMAN PLLC

(57) ABSTRACT

An object inspection apparatus according to an embodiment disclosed herein includes: a first flipper apparatus configured to rotate a first object; a second flipper apparatus configured to rotate a second object; and a single camera device configured to move from a position corresponding to one of the first flipper apparatus and the second flipper apparatus to
(Continued)

a position corresponding to the other, the camera device being configured to inspect object surfaces of the first object and the second object. Each of the first flipper apparatus and the second flipper apparatus includes at least one flipper unit.

15 Claims, 35 Drawing Sheets

(51) Int. Cl.
*G01N 21/88* (2006.01)
*G06T 7/40* (2017.01)
*H04N 23/695* (2023.01)

(52) U.S. Cl.
CPC ... *H04N 23/695* (2023.01); *G01N 2021/0106* (2013.01); *G01N 2021/0187* (2013.01); *G06T 2207/30108* (2013.01)

(58) Field of Classification Search
CPC .......... G01N 21/88; G01N 2021/0106; G01N 2021/0187
See application file for complete search history.

(56) References Cited

U.S. PATENT DOCUMENTS

| | | | |
|---|---|---|---|
| 5,828,500 A * | 10/1998 | Kida | G01M 11/02 359/799 |
| 6,199,679 B1 * | 3/2001 | Heuft | B07C 5/3408 198/346.2 |
| 10,121,238 B2 * | 11/2018 | Krolczyk | G01M 17/027 |
| 11,499,922 B2 * | 11/2022 | Pearson | G01N 21/9009 |
| 11,533,441 B2 * | 12/2022 | Edwards | G01N 21/952 |
| 2002/0131166 A1 | 9/2002 | Woo et al. | |
| 2002/0173229 A1 * | 11/2002 | Kobayashi | B24B 37/345 451/6 |
| 2003/0052968 A1 | 3/2003 | Murakami | |
| 2003/0159528 A1 | 8/2003 | Kim et al. | |
| 2003/0206794 A1 | 11/2003 | Konig et al. | |
| 2007/0222976 A1 | 9/2007 | Hashimoto | |
| 2011/0081223 A1 | 4/2011 | Medel et al. | |
| 2011/0311344 A1 | 12/2011 | Yamane | |
| 2012/0033209 A1 | 2/2012 | Osterkamp et al. | |
| 2012/0210554 A1 * | 8/2012 | Han | H01L 24/75 29/700 |
| 2013/0279655 A1 | 10/2013 | Ookawa | |
| 2014/0010604 A1 | 1/2014 | Cohen et al. | |
| 2014/0334605 A1 | 11/2014 | Ookawa | |
| 2015/0204801 A1 | 7/2015 | Itou | |
| 2015/0362310 A1 | 12/2015 | Taniguchi et al. | |
| 2016/0011123 A1 | 1/2016 | Shibata et al. | |
| 2016/0238373 A1 * | 8/2016 | Featherstone | H04N 7/183 |
| 2017/0255037 A1 | 9/2017 | Ma et al. | |
| 2018/0297784 A1 * | 10/2018 | Park | B65G 47/22 |
| 2019/0073760 A1 * | 3/2019 | Wang | G06T 7/001 |

FOREIGN PATENT DOCUMENTS

| | | |
|---|---|---|
| CN | 106044135 | 10/2016 |
| CN | 206235296 | 6/2017 |
| EP | 3 369 683 | 9/2018 |
| JP | 11-108650 | 4/1999 |
| JP | 2002-267620 | 9/2002 |
| JP | 2004-149320 | 5/2004 |
| JP | 2006-220495 | 8/2006 |
| JP | 2013-51333 | 3/2013 |
| JP | 2013-142677 | 7/2013 |
| JP | 2013-142678 | 7/2013 |
| JP | 2013-224857 | 10/2013 |
| JP | 2015-55631 | 3/2015 |
| KR | 20-0394150 | 8/2005 |
| KR | 10-2006-0066248 | 6/2006 |
| KR | 10-0783618 | 12/2007 |
| KR | 10-2012-0026745 | 3/2012 |
| KR | 10-2012-0096727 | 8/2012 |
| KR | 10-2013-0034920 | 4/2013 |
| KR | 10-2014-0007509 | 1/2014 |
| KR | 10-2017-0050580 | 5/2017 |
| KR | 10-2017-0051375 | 5/2017 |
| KR | 101736269 B1 * | 5/2017 |
| WO | 2008/136778 | 11/2008 |
| WO | 2017074075 | 5/2017 |

OTHER PUBLICATIONS

Korean Office Action with English translation for Korean Patent Application No. 10-2020-7037620, dated Dec. 18, 2020.
Korean Office Action with English translation for Korean Patent Application No. 10-2020-7037623, dated Dec. 28, 2020.
International Search Report, with English translation, corresponding to International Application No. PCT/KR2019/004554, dated Jul. 19, 2019.
Written Opinion, with English translation, corresponding to International Application No. PCT/KR2019/004554, dated Jul. 19, 2019.
International Search Report, with English translation, corresponding to International Application No. PCT/KR2019/004555, dated Jul. 19, 2019.
Written Opinion, with English translation, corresponding to International Application No. PCT/KR2019/004555, dated Jul. 19, 2019.
International Search Report, with English translation, for International Application No. PCT/KR2019/004557, dated Jul. 16, 2019.
Written Opinion, with English translation, for International Application No. PCT/KR2019/004557, dated Jul. 16, 2019.
European Office Action for European Application No./Patent No. 19826924.3; dated Aug. 16, 2021.
European Office Action for European Application No./Patent No. 19825087.0; dated Jul. 21, 2021.
Japanese Office Action, with English translation, for Japanese Patent Application No. 2020-573208, dated Feb. 22, 2022.
Japanese Office Action, with English translation, for Japanese Patent Application No. 2020-573209, dated Jan. 18, 2022.
Korean Office Action with English translation for Korean Patent Application No. 10-2020-7037616, dated Sep. 6, 2022.
Korean Office Action with English translation for Korean Patent Application No. 10-2020-7037620, dated Sep. 13, 2022.
Korean Office Action with English translation for Korean Patent Application No. 10-2020-7037623, dated Sep. 13, 2022.
Chinese Office Action, with English Translation, for Chinese Application No. 201980044162.6, dated Dec. 21, 2023.
Chinese Office Action, with English Translation, for Chinese Application No. 201980044259.7, dated Dec. 28, 2023.
Office Action issued in U.S. Appl. No. 17/256,490, dated Oct. 5, 2023.

* cited by examiner

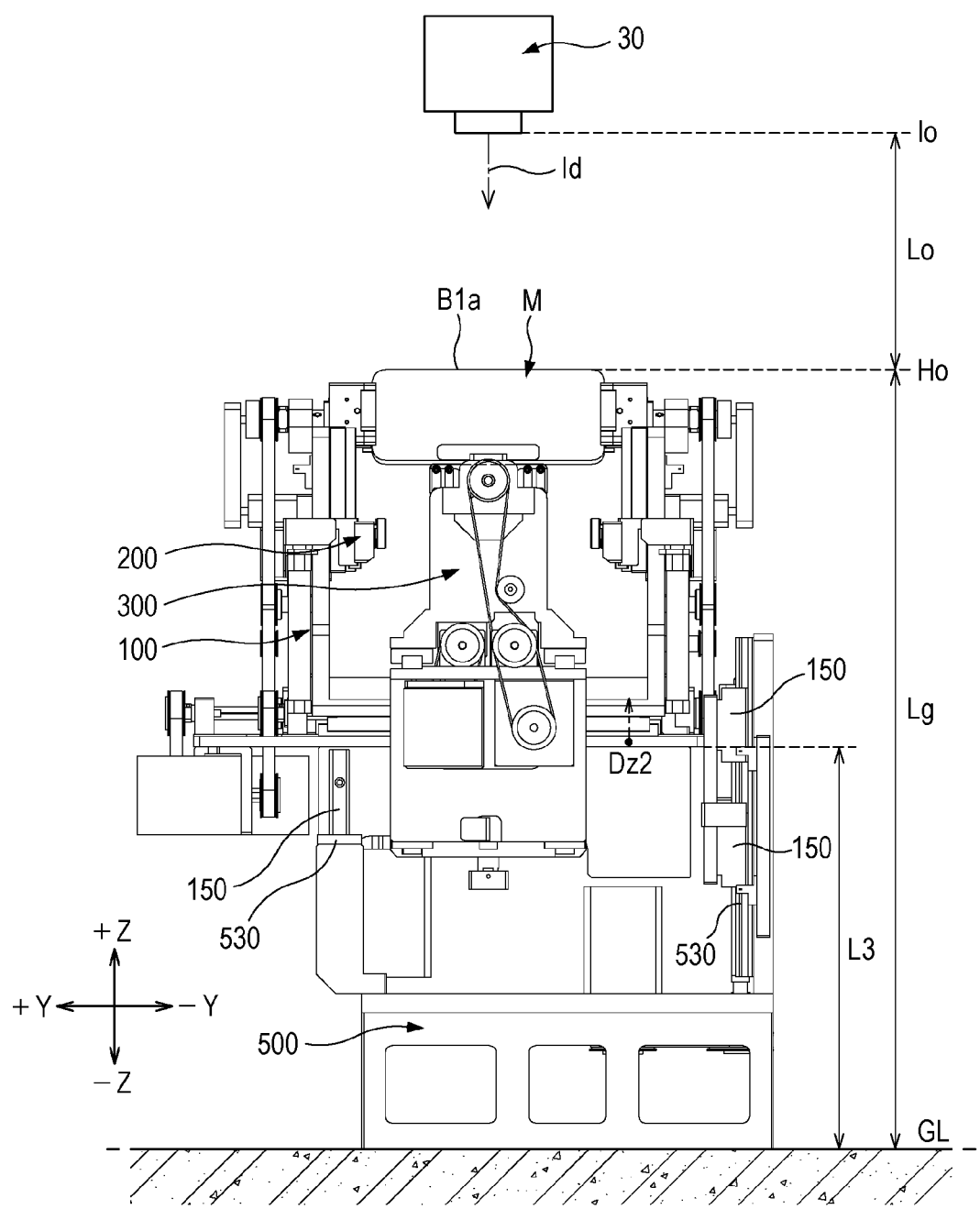

US 11,908,123 B2

OBJECT INSPECTION APPARATUS AND OBJECT INSPECTION METHOD USING SAME

TECHNICAL FIELD

The present disclosure relates to a flipper apparatus for holding and rotating an object and a method for inspecting an object using the flipper apparatus.

BACKGROUND

In the case of manufacturing and distributing various articles as they are or assembling the articles with other articles, performing an inspection of the manufactured state or assembled state of the articles (objects) is an essential process to increase the reliability of products. Conventionally, articles have been visually inspected, but a technique for improving precision and increasing working speed has been developed using inspection equipment.

With the introduction of process automation, such inspection process has adopted a method of automatically transferring the inspection objects. The most common method is to use a conveyor belt to transfer the articles. In the case of inspecting an article that has been automatically transferred with inspection equipment, in order to inspect the bottom surface of the article after inspecting the top surface of the article, it is necessary to turn the article upside down. The work of turning the article upside down is usually done by hand or by providing a separate turn-over apparatus (a flipper apparatus).

SUMMARY

Conventionally, in order to inspect the top and side surfaces of an object while transferring the object using a transfer rail, a camera device is required for each of the top and side surfaces of the object, and there is a problem in that the cost of the inspection apparatus is substantial because camera devices are very expensive. Embodiments of the present disclosure solve the problem of the prior art described above.

Conventionally, there is a problem in that, when a camera device inspects a surface of an object while the object is rotated, a loss time in which the camera device does not inspect the object during the rotation of the object occurs, and thus the inspection of the object is delayed. Embodiments of the present disclosure solve the problem of the prior art described above.

An aspect of the present disclosure provides embodiments of an object inspection apparatus. An object inspection apparatus according to a representative embodiment includes: a first flipper apparatus configured to hold and rotate a first object; a second flipper apparatus configured to hold and rotate a second object; and a single camera device configured to move from a position corresponding to one of the first flipper apparatus and the second flipper apparatus to a position corresponding to the other, the camera device being configured to inspect object surfaces of the first object and the second object facing a +Z-axis direction. Each of the first flipper apparatus and the second flipper apparatus includes at least one flipper unit configured to hold an object in a predetermined axis direction and to rotate the object about a predetermined axis.

Another aspect of the present disclosure provides embodiments of an object inspection method. An object inspection method according to a representative embodiment uses a first flipper apparatus configured to hold and rotate a first object, a second flipper apparatus configured to hold and rotate a second object, and a camera device configured to inspect object surfaces of the first object and the second object facing a +Z-axis direction. The object inspection method includes: a first object inspection step in which the first flipper apparatus rotates the first object and the camera device inspects an object surface of the first object; and a second object inspection step in which the second flipper apparatus rotates the second object and the camera device inspects an object surface of the second object while the first object inspection step is performed. While the first object inspection step and the second object inspection step are performed, the camera device moves at least once from a position corresponding to one of the first flipper apparatus and the second flipper apparatus to a position corresponding to the other.

According to embodiments of the present disclosure, it is possible to inspect surfaces of multiple angles of an object using a single camera device.

According to embodiments of the present disclosure, since a single camera device inspects objects alternately, it is possible to reduce a loss time in which the camera device does not perform inspection due to the rotation of the objects.

According to embodiments of the present disclosure, it is possible to efficiently utilize a space while inspecting two objects together, and to shorten an inspection time required per each object.

BRIEF DESCRIPTION OF DRAWINGS

FIG. 17C is an elevation view illustrating the flipper apparatus 10 in the state of FIG. 15A when viewed in the X-axis direction.

DETAILED DESCRIPTION

Figure 1:
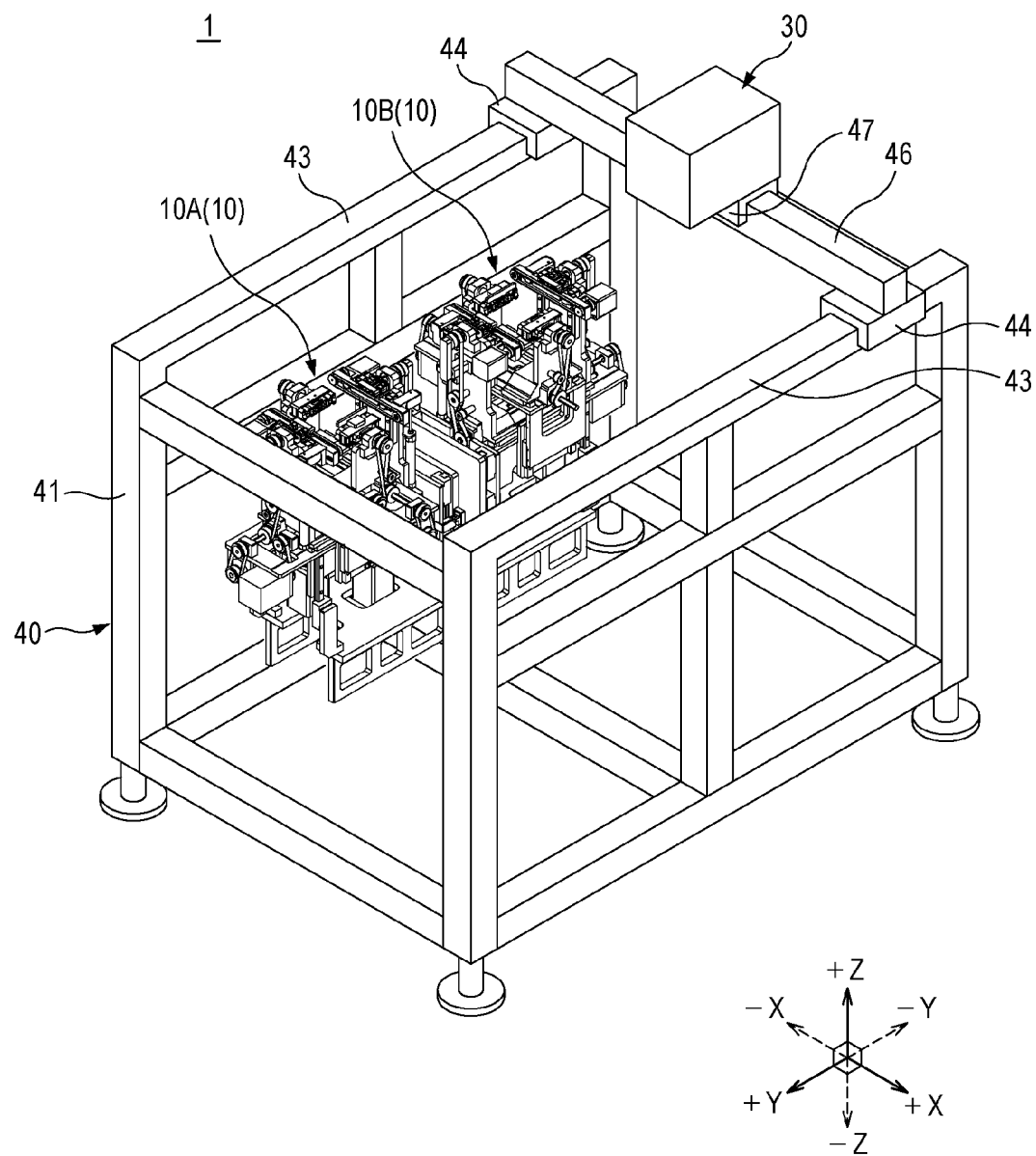
FIG. 1 is a perspective view illustrating an object inspection apparatus 1 according to an embodiment of the present disclosure.

Embodiments of the present disclosure are illustrated for describing the technical concept of the present disclosure. The scope of the claims according to the present disclosure is not limited to the embodiments described below or to the detailed descriptions of these embodiments.

All technical or scientific terms used herein have meanings that are generally understood by a person having ordinary knowledge in the art to which the present disclosure pertains, unless otherwise specified. The terms used herein are selected only for more clear illustration of the present disclosure, and are not intended to limit the scope of the claims in accordance with the present disclosure.

The expressions "include," "provided with," "have" and the like used herein should be understood as open-ended terms connoting the possibility of inclusion of other embodiments, unless otherwise mentioned in a phrase or sentence including the expressions.

A singular expression can include meanings of plurality, unless otherwise mentioned, and the same is applicable for a singular expression stated in the claims.

The terms "first," "second," etc. used herein are used to distinguish a plurality of components from one another, and are not intended to limit the order or importance of the relevant components.

When a certain component is described as "coupled to" or "connected to" another component, this should be understood as meaning that the certain component may be coupled or connected directly to the other component or that the certain component may be coupled or connected to the other component via a new intervening component.

In order to describe the present disclosure with reference to the drawings, the description will be made on the basis of a space orthogonal coordinate system based on the X-axis, the Y-axis, and the Z-axis orthogonal to one another. That is, each configuration of the embodiments may be described on the XYZ orthogonal coordinates. Each axis direction (the X-axis direction, Y-axis direction, or Z-axis direction) refers to both directions in which each axis extends. The plus (+) sign in front of each axis (+X-axis direction, +Y-axis direction, or +Z-axis direction) refers to the positive direction, which is one of two directions in which each axis extends. The minus (−) sign in front of each axis (−X-axis direction, −Y-axis direction, or −Z-axis direction) refers to the negative direction, which is the remaining one of the two directions in which each axis extends. This is merely a reference set for describing the present disclosure so that the present disclosure can be clearly understood, and it is needless to say that the directions may be defined differently depending on where the reference is placed.

Directional designators such as "upward" and "up" used in this disclosure refer to the +Z-axis direction, and directional designators such as "downward" and "down" refer to the −Z-axis direction. A flipper apparatus 10 illustrated in the accompanying drawings may be differently oriented, and the directional designators may be interpreted accordingly.

The term "object" used in the present disclosure means a thing to be inspected, and in the present disclosure, a mobile phone case is shown as an example of the object, but is not limited thereto. For example, the object may be any of various types having various shapes, such as a spool valve having a cylindrical shape as a whole. In the object, a surface facing one direction among outer surfaces to be inspected may be referred to as an "object surface." In the drawings of the present disclosure, an object M and object surfaces A, B1, B1a, B1b, B2, B3, B3a, B3b, B4, and C are shown.

Hereinafter, embodiments of the present disclosure will be described with reference to the accompanying drawings. In the accompanying drawings, like or corresponding components are indicated by like reference numerals. In the following description of embodiments, repeated descriptions of the identical or corresponding components will be omitted. However, even if a description of a component is omitted, such a component is not intended to be excluded in an embodiment.

Figure 2:
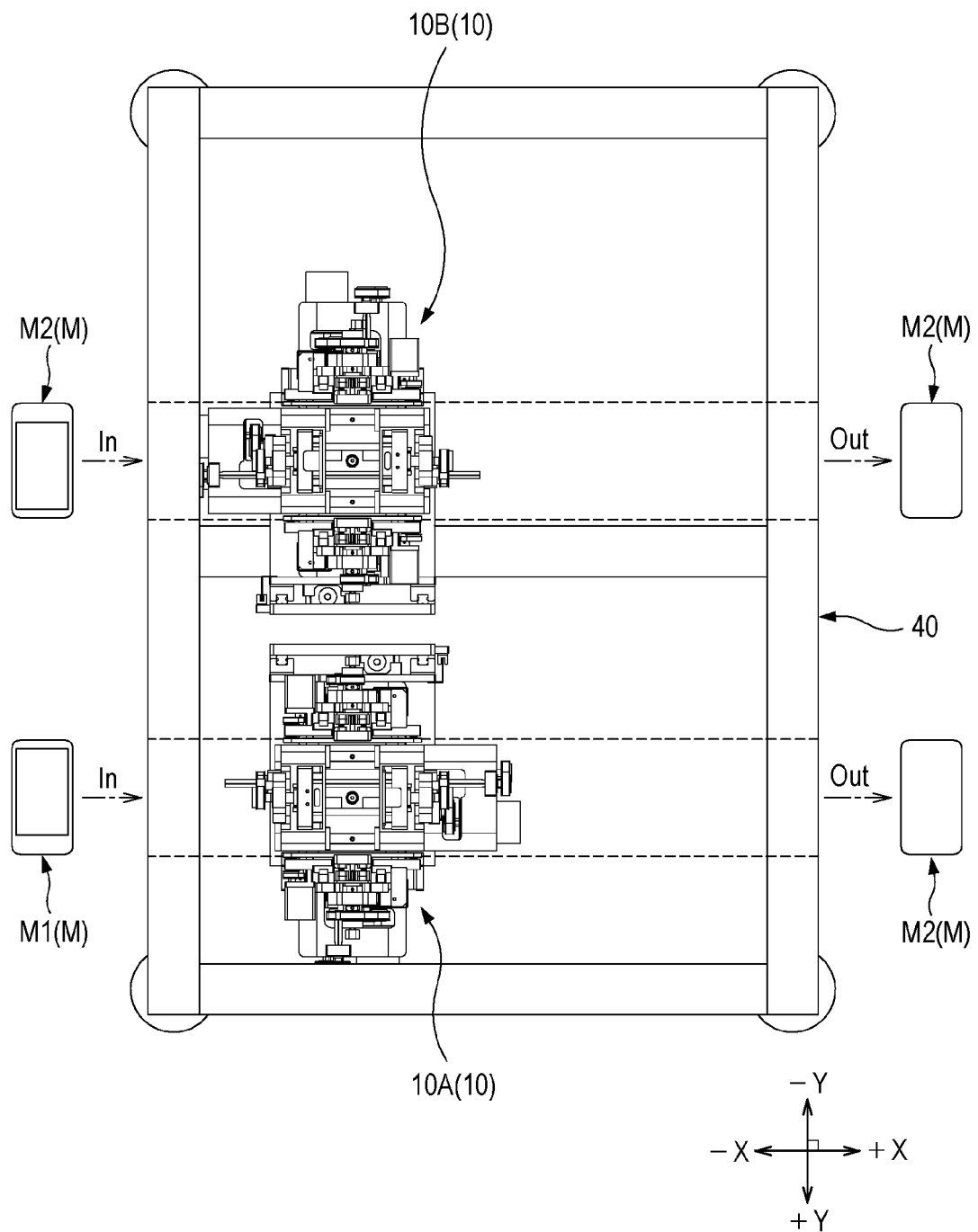
FIG. 2 is a top plan view of the object inspection apparatus 1 of FIG. 1, in which a camera device 30 and some parts 44, 46, and 47 of a camera device frame are omitted.

FIG. 1 is a perspective view illustrating an object inspection apparatus 1 according to an embodiment of the present disclosure. FIG. 2 is a top plan view of the object inspection apparatus 1 of FIG. 1, in which a camera device 30 and some parts 44, 46, and 47 of the camera device frame are omitted.

Referring to FIGS. 1 and 2, the object inspection apparatus 1 is a device that inspects a plurality of objects M. The object inspection apparatus 1 inspects object surfaces of the objects M. The object inspection apparatus 1 includes a plurality of flipper apparatuses 10A and 10B. The plurality of flipper apparatuses 10A and 10B include a first flipper apparatus 10A configured to hold and rotate a first object M1, and a second flipper apparatus 10B configured to hold and rotate a second object M. Here, an object M rotated by the first flipper apparatus 10A will be referred to as a "first object M1," and an object M rotated by the second flipper apparatus 10B will be referred to as a "second object M2."

The first flipper apparatus 10A and the second flipper apparatus 10B may be arranged in the Y-axis direction. The first flipper apparatus 10A and the second flipper apparatus 10B may be configured as apparatuses that are same as each other or may be configured to have some differences.

The object inspection apparatus 1 may include a conveyor belt apparatus (not illustrated) and/or a robot arm device for moving the objects M to the flipper apparatuses 10. The conveyor belt apparatus, the robot arm device, and/or the like may be provided such that the objects can be moved from one of the conveyor belt apparatus and the transfer unit 200 to the other. For example, a conveyor belt (not illustrated) may be disposed on each of the inlet side and the outlet side of the transfer unit 200. The objects M may flow into the transfer unit 200 via the conveyor belts (see arrows In in FIG. 2) and may flow out from the conveyor belts via the transfer unit 200 (see arrows Out in FIG. 2).

The object inspection apparatus 1 includes a camera device 30 configured to inspect object surfaces of the objects M facing the +Z-axis direction. The camera device 30 may be provided above the flipper apparatuses 10. The camera device 30 may inspect the object surfaces while facing the −Z-axis direction.

The object inspection apparatus 1 includes a single camera device 30 configured to inspect an object surface of the first object M1 and an object surface of the second object M2. The camera device 30 inspects the object surfaces of the first object M1 and the second object M2 facing the +Z-axis direction.

The camera device 30 is configured to move from a position corresponding to one of the first flipper apparatus 10A and the second flipper apparatus 10B to a position corresponding to the other. Here, the position corresponding to the first flipper apparatus 10A means a position at which the first object M1 held by the first flipper apparatus 10A can be inspected, and a position corresponding to the second flipper apparatus 10B means a position at which the second object M2 held by the second flipper apparatus 10B can be inspected.

The camera device 30 may be configured to move in the Y-axis direction. Through this, the camera device 30 may move between the positions respectively corresponding to the first flipper apparatus 10A and the second flipper apparatus 10B arranged in the Y-axis direction.

The camera device 30 may be configured to move in the X-axis direction. Through this, the camera device 30 may inspect each portion of the object surface of the object M while moving in the X-axis direction and the Y-axis direction.

The camera device 30 includes a camera device frame 40 movably supporting the camera device 30. The camera device frame 40 may support the camera device 30 to be movable in the X-axis direction and the Y-axis direction.

The camera device frame 40 includes a base frame 41 supported by an external environment (e.g., a floor, a wall or another structure). The first flipper apparatus 10A and the second flipper apparatus 10B may be supported on the base frame 41.

The camera device frame 40 may include Y-axis guides 43 extending in the Y-axis direction and Y-axis sliders 44 configured to be movable in the Y-axis direction along the Y-axis guides 43. When the Y-axis sliders 44 move along the Y-axis guides 43, the camera device 30 supported by the Y-axis sliders 44 can move along with the Y-axis sliders 44 in the Y-axis direction.

The camera device frame 40 may include an X-axis guide 46 extending in the X-axis direction and an X-axis slider 47 configured to be movable in the X-axis direction along the X-axis guide 46. When the X-axis slider 47 moves along the X-axis guide 46, the camera device 30 supported by the X-axis slider 47 can move along with the X-axis slider 47 in the X-axis direction.

Figure 3A:
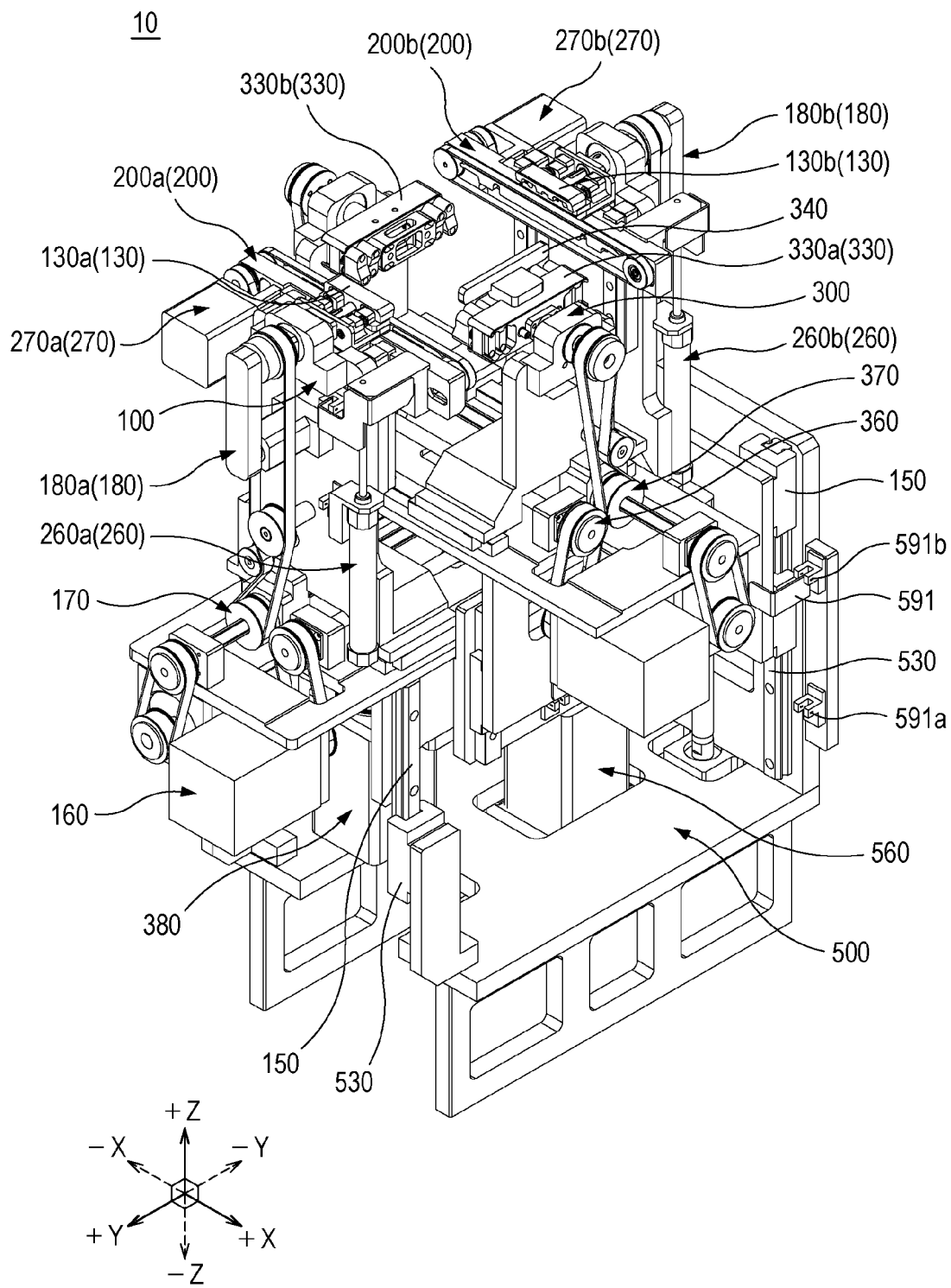
FIG. 3A is a perspective view illustrating a flipper apparatus 10 according to the embodiment of FIG. 1.
Figure 3B:
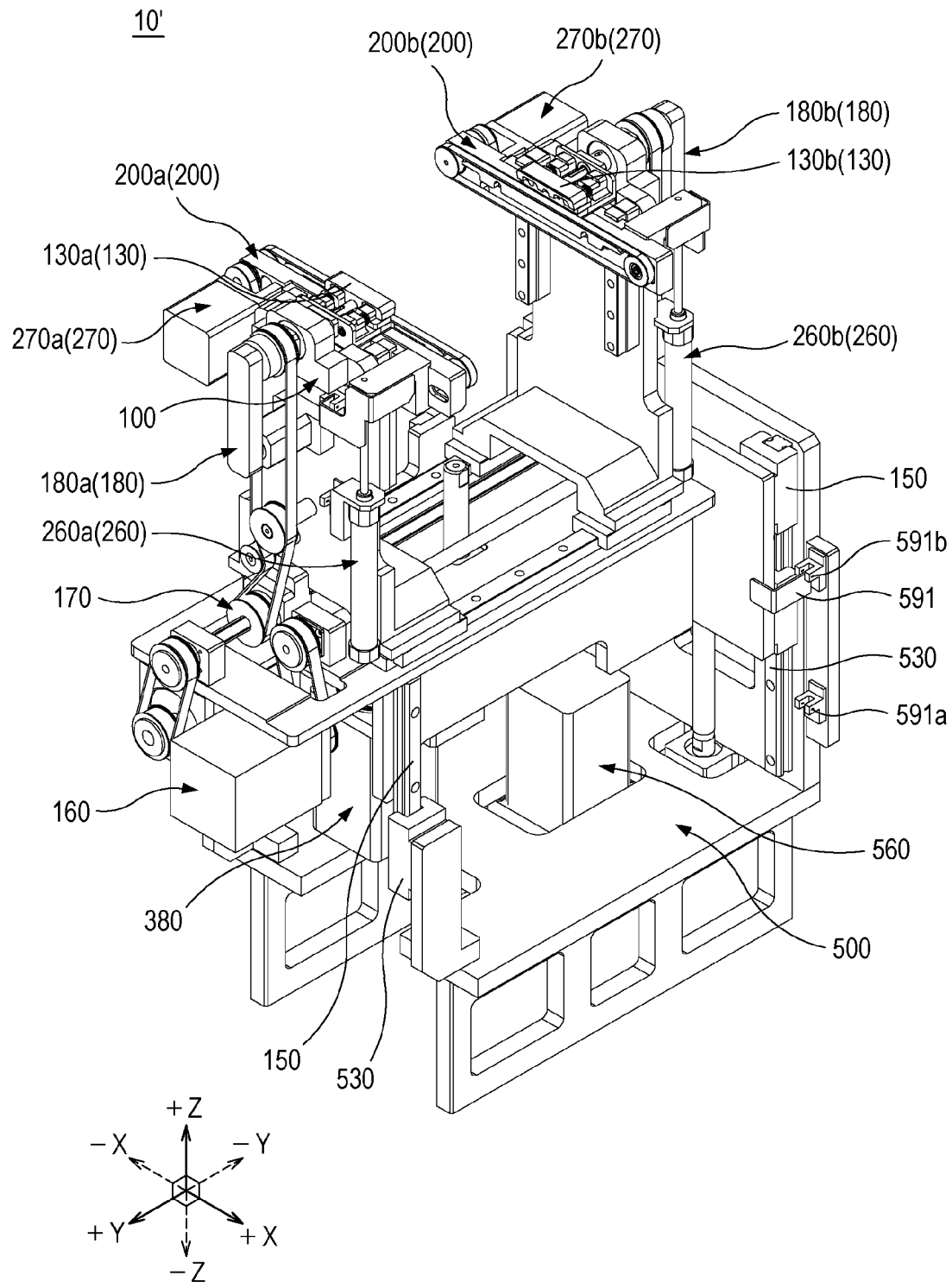
FIG. 3B is a perspective view illustrating a flipper apparatus 10' according to another embodiment.

FIG. 3A is a perspective view illustrating a flipper apparatus 10 according to an embodiment of the present disclosure, and FIG. 3B is a perspective view illustrating a flipper apparatus 10' according to another embodiment.

Referring to FIGS. 3A and 3B, each of the first flipper apparatus 10A and the second flipper apparatus 10B includes at least one flipper unit (100 and/or 300) configured to hold an object in a predetermined axis direction and to rotate the object about a predetermined axis. Here, the predetermined axis direction may be the X-axis direction or the Y-axis direction. Hereinafter, the content of the flipper apparatus 10 may be applied to each of the first flipper apparatus 10A and the second flipper apparatus 10B.

The at least one flipper unit may include a Y-axis flipper unit 100 configured to hold an object M in the Y-axis direction and rotate the object M about the Y-axis. The flipper apparatus 10 may include a Z-axis elevation unit 500 on which the at least one flipper unit is supported. The Z-axis elevation unit 500 is configured to move the at least one flipper unit up and down in the Z-axis direction. The flipper apparatus 10 may include a transfer unit 200 configured to transfer an object M in the X-axis direction.

Referring to FIG. 3A, the at least one flipper unit of the flipper apparatus 10 according to an embodiment includes an X-axis flipper unit 300 configured to hold an object M in the X-axis direction and to rotate the object M about the X-axis. The at least one flipper unit of the flipper apparatus 10 includes a Y-axis flipper unit 100 and the X-axis flipper unit 300.

Referring to FIG. 3A, the Z-axis elevation unit 500 may support the X-axis flipper unit 300. The Z-axis elevation unit 500 may be configured to move the X-axis flipper unit 300 up and down in the Z-axis direction. When a first component "supports" a second component, it covers not only the case where the second component is in direct contact with the first component and is supported on the first component, but also the case where the first component supports the second component via a third component interposed between the first component and the second component. In the present embodiment, the Z-axis elevation unit 500 supports the Y-axis flipper unit 100 and the X-axis flipper unit 300, and is configured to move the Y-axis flipper unit 100 and the X-axis flipper unit 300 up and down in the Z-axis direction.

Referring to FIG. 3B, the at least one flipper unit of the flipper apparatus 10' according to another embodiment does not include the X-axis flipper unit. The at least one flipper unit of the flipper apparatus 10' includes the Y-axis flipper unit 100.

In another embodiment (not illustrated), the first flipper apparatus and/or the second flipper apparatus may include a Y-axis flipper unit, an X-axis flipper unit, and a transfer unit. Here, the transfer unit is configured to move an object in a specific direction (e.g., the X-axis direction), and a first position of the object that is preset such that the Y-axis flipper unit holds the object and a second position of the object that is preset such that the X-axis flipper unit holds the object may be spaced apart from each other in the specific direction on the transfer unit. For example, the object introduced into the flipper apparatus via the transfer unit may be held at the first position by the Y-axis flipper unit, may be subjected to an inspection while being rotated about the Y-axis, and may then be placed at the first position. Thereafter, the object moved from the first position to the second position by the transfer unit may be held by the X-axis flipper unit, may be subjected to an inspection while being rotated about the X-axis, and may then be placed at the second position. Thereafter, the object may be discharged from the flipper apparatus by the transfer unit.

In addition, the first flipper apparatus and the second flipper apparatus may be implemented in various structures. Hereinafter, a configuration will be described in detail with reference to the flipper apparatus 10 according to the embodiment of FIG. 3A, but this is only an example, and some of the following descriptions may be applied to various other embodiments including that of FIG. 3B.

Figure 4:
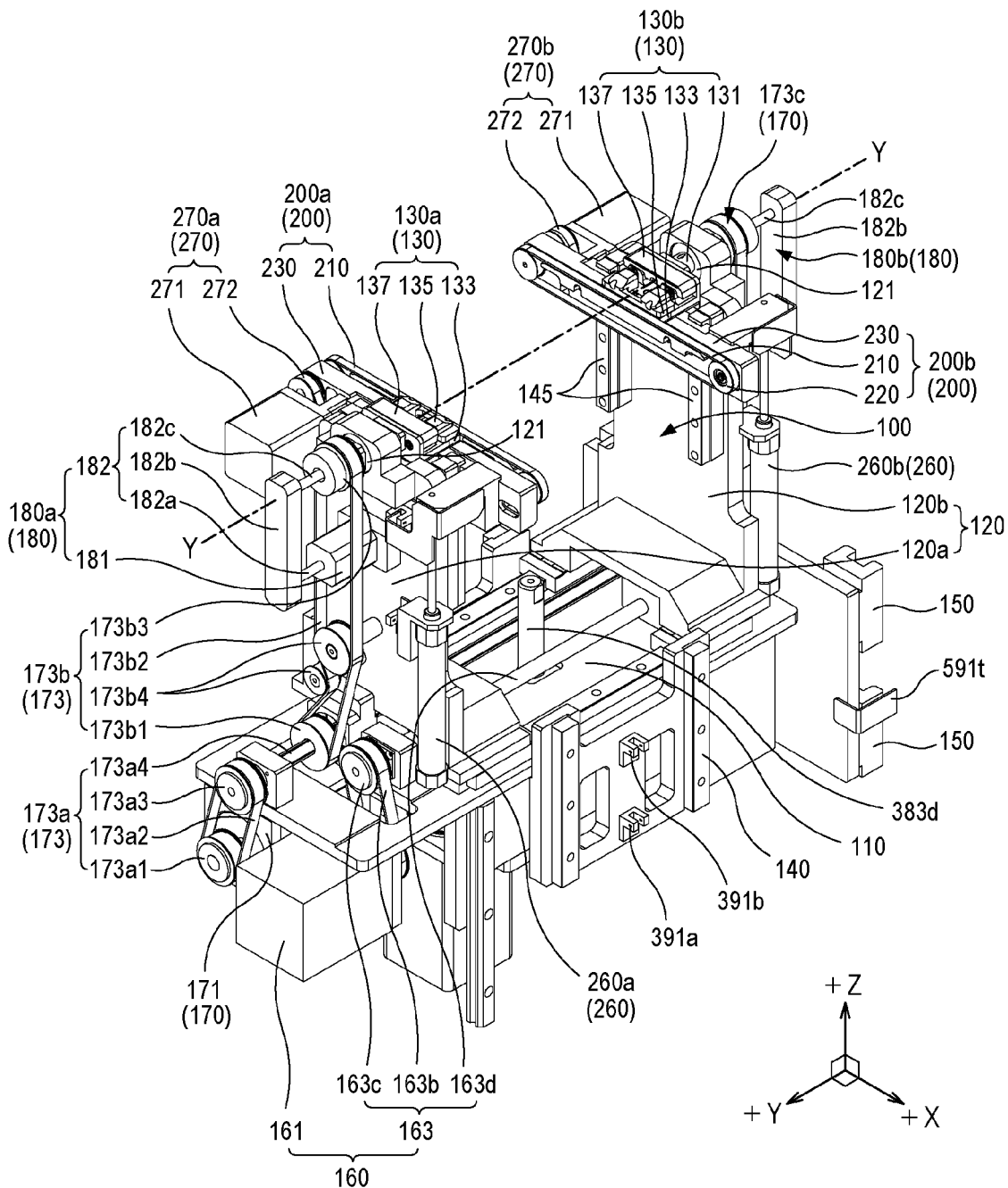
FIGS. 4 and 5 are perspective views illustrating a Y-axis flipper unit 100, a transfer unit 200, and drivers 160, 170, 180, 260, 270, and 380 of FIG. 3A.
Figure 5:
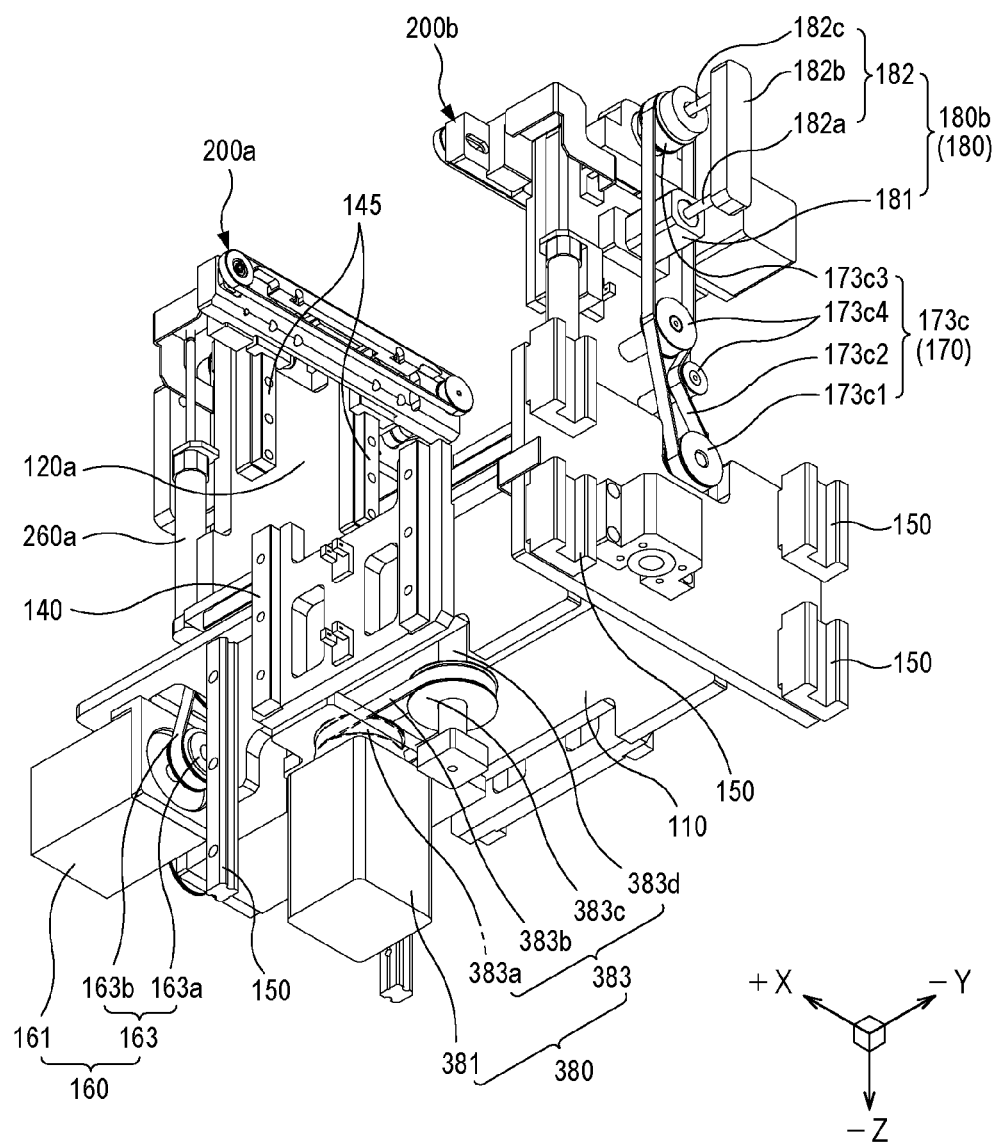

FIGS. 4 and 5 are perspective views illustrating the Y-axis flipper unit 100, the transfer unit 200, and drivers 160, 170, 180, 260, 270, and 380 of FIG. 3A. FIG. 4 illustrates the Y-axis Y, which is the rotational axis of Y-axis holders 130. An assembly of the Y-axis flipper unit 100 and the transfer unit 200 may be referred to as a "Y-axis flipper assembly (100, 200)". The Y-axis flipper assembly (100, 200) may include one or more drivers 160, 170, 180, 260, and 270.

Referring to FIGS. 4 and 5, the Y-axis flipper unit 100 is supported on the Z-axis elevation unit 500 so as to be movable in the Z-axis direction with respect to the Z-axis elevation unit 500. The Y-axis flipper unit 100 is configured to rotate the object about the Y-axis. The Y-axis flipper unit 100 is configured to narrow or widen a space between a pair of Y-axis holders 130a and 130b in the Y-axis direction. The Y-axis flipper unit 100 is configured to narrow or widen a space between a pair of Y-axis auxiliary grip parts 137 in the Y-axis direction.

The Y-axis flipper unit 100 includes a Y-axis flipper base 110 supported on the Z-axis elevation unit 500. The Y-axis flipper base 110 is disposed in the Z-axis elevation unit 500 to be movable in the Z-axis direction. The Y-axis flipper base 110 supports a pair of body frames 120a and 120b.

The Y-axis flipper unit 100 includes body frames 120 supported on the Y-axis flipper base 110. The body frames 120 are supported on the Y-axis flipper base 110 to be movable in the Y-axis direction.

The Y-axis flipper unit 100 includes a pair of body frames 120a and 120b configured to operate so as to narrow or widen a space therebetween in the Y-axis direction. The pair of body frames 120a and 120b include a first body frame 120a disposed in the +Y-axis direction and a second body frame 120b disposed in the −Y-axis direction. The Y-axis flipper base 110 supports a pair of body frames 120a and 120b.

The Y-axis flipper unit 100 includes rotation joints 121 rotatably supporting the Y-axis holders 130. Y-axis shafts 131 of the Y-axis holders 130 may be supported by the rotation joints 121 to be rotatable about the Y-axis.

The Y-axis flipper unit 100 includes the Y-axis holders 130 configured to hold an object in the Y-axis direction of the object. The Y-axis flipper unit 100 includes a pair of Y-axis holders 130a and 130b supported on the corresponding pair of body frames 120a and 120b. The pair of Y-axis holders 130a and 130b include a first Y-axis holder 130a disposed in the +Y-axis direction and a second Y-axis holder 130b disposed in the −Y-axis direction.

The pair of Y-axis holders 130a and 130b are configured to rotate about the Y-axis with respect to the pair of body frames 120a and 120b. The pair of Y-axis holders 130a and 130b are configured to hold the object therebetween. The pair of Y-axis holders 130a and 130b are configured to hold the object in the Y-axis direction.

The Y-axis flipper unit 100 includes Y-axis shafts 131 supported on the body frames 120 to be rotatable about the Y-axis. The Y-axis shafts 131 may be disposed to pass through the corresponding body frames 120 in the Y-axis direction. The Y-axis shafts 131 may be rotatably supported by the rotation joints 121 of the body frames 120.

A detailed description will be made with reference to one of the pair of Y-axis holders 130 as follows. In one Y-axis holder 130, a first direction Y1 refers to a direction facing the other Y-axis holder, and a second direction Y2 refers to a direction opposite to the first direction Y1.

The Y-axis holder 130 includes a Y-axis shaft 131 supported on the body frame 120 to be rotatable about the Y-axis. The support grip part 133 may be fixed to the end of the Y-axis shafts 131 in the first direction. The Y-axis shaft 131 is coupled with a rotation rod 182c.

The Y-axis holder 130 includes the support grip part 133 supported on the Y-axis shaft 131. The support grip part 133 is configured to protrude in the Y-axis direction Y1 to be engaged with one end of the object. The support grip part 133 protrudes in the Y-axis direction on the −Z-axis direction side with reference to an elastic grip part 135 to form a support surface capable of coming into contact with the object M in the +Z-axis direction. The support grip part 133 forms a protruding end in the first direction.

The Y-axis shaft 131 is fixed to the second direction side of the support grip part 133. The support grip part 133 may guide the moving direction of the elastic grip part 135. The support grip part 133 may guide the moving direction of the auxiliary grip part 137.

The Y-axis holder includes the elastic grip part 135 configured to generate an elastic force when coming into contact with and being pressed by the object M. The elastic grip part 135 is configured to compress an elastic member (not illustrated) when the elastic grip part 135 is brought into contact with the object M. The elastic grip part 135 may be supported on the Y-axis shaft 131 via the support grip part 133.

The Y-axis holder 130 includes an auxiliary grip part 137 configured to move from the +Z-axis direction side in the Y-axis direction with reference to the elastic grip part 135. The auxiliary grip part 137 is configured to be movable in the Y-axis direction with respect to the support grip part 133. The auxiliary grip part 137 is configured to rotate integrally with the Y-axis shaft 131. In the present disclosure, "rotate integrally" means that a plurality of components move together without changing their positions relative to each other. The auxiliary grip part 137 forms a protruding end in the first direction.

The auxiliary grip part 137 is configured to move in the Y-axis direction to be engaged with or disengaged from the other end of the object M. The one end of the object M is engaged with the support grip part 133. The "one end" and the "other end" of the object M referred to herein mean ends in opposite directions (in the Z-axis direction) perpendicular to the Y-axis.

The flipper apparatus 10 may include an auxiliary grip part driver 180 configured to provide a driving force for moving the auxiliary grip part 137 in the Y-axis direction with respect to the Y-axis shaft 131. The auxiliary grip part driver 180 may include a cylinder 181 configured to provide a driving force and a driving force transmission part 182 configured to transmit the driving force of the cylinder 181 to the Y-axis holder 130.

In an embodiment, the driving force transmission part 182 may include a cylinder rod 182a configured to receive the driving force of the cylinder 181 to move in the Y-axis direction. The driving force transmission part 182 may include a connection rod 182b fixed to the cylinder rod 182a to move integrally with the cylinder rod 182a. The driving force transmission part 182 may include a rotation rod 182c connected to the connection rod 182b. The rotation rod 182c is connected to the connection rod 182b to move in the Y-axis direction following the Y-axis direction movement of the connection rod 182b, and is connected to the connection rod 182b to be rotatable about the Y-axis.

The auxiliary grip part driver 180 includes the rotation rod 182c having one end to which the auxiliary grip part 137 is fixed. The auxiliary grip part 137 may be fixed to the end of the rotation rod 182c in the first direction. The rotation rod 182c is configured to transmit the driving force of the auxiliary grip part driver 180 to the auxiliary grip part 137. The rotation rod 182c is movable in the Y-axis direction with respect to the support grip part 133 together with the auxiliary grip part 137.

The rotation rod 182c is configured to be integrally rotatable with the Y-axis shaft 131 and to be movable in the Y-axis direction with respect to the Y-axis shaft 131. The rotation rod 182c may be disposed to pass through the Y-axis shaft 131 in the Y-axis direction.

The Y-axis flipper unit 100 may include an X-axis flipper guide 140 configured to guide the movement of the X-axis flipper unit 300 in the Z-axis direction. The X-axis flipper unit 300 may include a transfer unit guide 145 configured to guide the movement of the transfer unit 200 in the Z-axis direction. The Y-axis flipper unit 100 may include a Z-axis slider 150 configured to slide in the Z-axis direction along the Z-axis guide 530 of the Z-axis elevation unit 500.

The Y-axis flipper unit 100 may include a Y-axis rotation home sensor (not illustrated) configured to detect a position of a predetermined rotation angle of the Y-axis holder 130. The Y-axis flipper unit 100 may include an auxiliary grip unit sensor (not illustrated) configured to generate a detection signal when the auxiliary grip part 137 moves to a predetermined position with respect to the support grip part 133. The Y-axis flipper unit 100 may include a Y-axis movement sensor (not illustrated) configured to generate a detection signal when the body frame 120 moves to a predetermined position relative to the Y-axis flipper base 110. The Y-axis movement sensor may detect the state in which a space between a pair of body frames 120a and 120b is narrowed in the Y-axis direction and the state in which the space is widened in the Y-axis direction.

The Y-axis flipper unit 100 may include a Y-axis contactor sensor (not illustrated) configured to generate a detection signal when the object is brought into contact with a Y-axis contactor and the Y-axis contactor moves a predetermined distance in the Y-axis direction with respect to the support grip part 133. The Y-axis contactor sensor may detect a signal when the Y-axis contactor compresses at least one elastic member 135b to be described later. A Y-axis movement driver 160 to be described later may be configured to stop providing a driving force when a signal is detected by the Y-axis contactor sensor while providing the driving force in a direction in which the pair of body frames 120a and 120b get closer to each other.

The transfer unit 200 is supported on the Y-axis flipper unit 100. The transfer unit 200 is configured to move in the Z-axis direction with respect to the Y-axis flipper unit 100. The transfer unit 200 is configured to operate the transfer belt 210 so as to transfer the object placed on the transfer belt 210 in the X-axis direction.

In this embodiment, the transfer unit 200 includes a conveyor belt structure on which an object is placed. However, in another embodiment (not illustrated), the transfer unit includes a slider having a groove on which the object is placed and a rail structure guiding the movement of the slider. In addition, the transfer unit may be implemented in various ways, but will be described below with reference to this embodiment.

The transfer unit 200 may include a pair of transfer parts 200a and 200b. The pair of transfer parts 200a and 200b are supported on the pair of body frames corresponding thereto. The pair of transfer parts 200a and 200b include a first transfer part 200a supported on the first body frame 120a and a second transfer part 200b supported on the second body frame 120b. The pair of transfer parts 200a and 200b are configured to transfer the object in the X-axis direction.

The transfer unit 200 includes a transfer belt 210 supporting the object and being configured to transfer the object in the X-axis direction. The transfer unit 200 includes a transfer pulley 220 configured to operate the transfer belt 210 by rotation. The transfer unit 200 includes a transfer frame 230 on which the transfer pulley 220 is disposed. The transfer frame 230 is supported on the body frame 120.

The Y-axis flipper assembly (100, 200) may include a transfer unit elevation sensor (not illustrated) configured to generate a detection signal when the transfer unit 200 moves to a predetermined position with respect to the Y-axis flipper unit 100. The transfer unit elevation sensor may detect the state in which the transfer unit 200 is raised in the Z-axis direction and the state in which the transfer unit 200 is lowered in the Z-axis direction. A pair of transfer unit elevation sensors corresponding to the pair of transfer units 200a and 200b may be provided.

The flipper apparatus 10 includes a Y-axis movement driver 160 configured to provide a driving force for moving the pair of body frames 120a and 120b in the Y-axis direction with respect to the Y-axis flipper base 110. The Y-axis movement driver 160 is supported on the Y-axis flipper unit 100. The Y-axis movement driver 160 may include a motor 161 and a driving force transmission part 163 configured to transmit the driving force of the motor 161 to the pair of body frames 120a and 120b.

In an embodiment, the driving force transmission part 163 may include a pulley 163a fixed to the rotation shaft of the motor 161 to rotate, a belt 163b wound around the pulley 163a to receive a rotational force, and a pulley 163c engaged with the belt 163b to receive the rotational force. The driving force transmission part 163 may include a lead screw 163d coupled to the pulley 163c to rotate integrally with the pulley 163c. When the lead screw 163d rotates in one direction, the pair of body frames 120a and 120b may move along the lead screw 163d to narrow a space therebetween in the Y-axis direction, and when the lead screw 163d rotates in the other direction, the pair of body frames 120a and 120b may move along the lead screw 163d to be spaced apart from each other in the Y-axis direction.

The flipper apparatus 10 includes a Y-axis holder rotation driver 170 configured to provide a driving force for rotating the Y-axis holder 130 with respect to the body frame 120. The Y-axis holder rotation driver 170 may provide a driving force for rotating the Y-axis shaft 131. The Y-axis holder rotation driver 170 is supported on the Y-axis flipper unit 100. The Y-axis holder rotation driver 170 may include a motor 171 and driving force transmission parts 173a, 173b, and 173c configured to transmit the driving force of the motor 171 to the pair of Y-axis holders 130a and 130b.

The driving force transmission parts 173a, 173b, and 173c may include a basic driving force transmission part 173a configured to transmit the rotational force of the motor 171 to the first driving force transmission part 173b and the second driving force transmission part 173c. The driving force transmission parts 173a, 173b, and 173c may include a first driving force transmission part 173b configured to receive a rotational force from the basic driving force transmission part 173a and to transmit the rotational force to the first Y-axis holder 130a, and a second driving force transmission part 173c configured to receive a rotational force from the basic driving force transmission part 173a and to transmit the rotational force to the second Y-axis holder 130b.

In an embodiment, the basic driving force transmission part 173a may include a pulley 173a1 fixed to the rotation shaft of the motor 171 to rotate, a belt 173a2 wound around the pulley 173a1 to receive a rotational force, and a pulley 173a3 engaged with the belt 173a2 to receive the rotational force. The basic driving force transmission part 173a may include a serrated shaft 173a4 coupled to the pulley 173a3 to rotate integrally with the pulley 173a3. The motor 171 and the basic driving force transmission part 173a may be supported on the Y-axis flipper base 110.

In an embodiment, the first driving force transmission part 173b may include a pulley 173b1 coupled to the serrated shaft 173a4 to receive a rotational force and configured to be movable in the Y-axis direction along the serrated shaft 173a4. The first driving force transmission part 173b may include a belt 173b2 wound around the pulley 173b1 to receive a rotational force, and a pulley 173b3 engaged with the belt 173b2 to receive the rotational force and to rotate the first Y-axis holder 130a. The first driving force transmission part 173b may include a guide pulley 173b4 configured to come into contact with the belt 173b2 so as to guide the position of the belt 173b2. The first driving force transmission part 173b is supported on the first body frame 120a.

In an embodiment, the second driving force transmission part 173c may include a pulley 173c1 coupled to the serrated shaft 173a4 to receive a rotational force and configured to be movable in the Y-axis direction along the serrated shaft 173a4. The second driving force transmission part 173c may include a belt 173c2 wound around the pulley 173c1 to receive a rotational force, and a pulley 173c3 engaged with the belt 173c2 to receive the rotational force and to rotate the second Y-axis holder 130b. The second driving force transmission part 173c may include a guide pulley 173c4 configured to come into contact with the belt 173c2 so as to guide the position of the belt 173c2. The second driving force transmission part 173c is supported on the second body frame 120b.

The flipper apparatus 10 may include an auxiliary grip part driver 180 configured to provide a driving force for operating the auxiliary grip part 137. A pair of auxiliary grip part drivers 180a and 180b may be provided to provide a driving force for operating the pair of auxiliary grip parts, respectively. The auxiliary grip part driver 180 may be supported on the body frame 120.

The flipper apparatus 10 includes a transfer unit elevation driver 260 configured to provide a driving force for moving the transfer unit 200 in the Z-axis direction with respect to the Y-axis flipper unit 100. The transfer unit elevation driver 260 may be supported on the body frame 120. For example, the transfer unit elevation driver 260 may include a cylinder configured to drive a rod in the vertical direction.

The transfer unit elevation driver 260 includes a pair of transfer part elevation drivers 260a and 260b configured to operate the pair of transfer parts 200a and 200b, respectively. The transfer part elevation drivers 260a and 260b are supported on the body frame 120. The transfer part elevation drivers 260a and 260b provide a driving force for moving the transfer parts 200a and 200b in the Z-axis direction with respect to the body frame 120. A pair of transfer part elevation drivers 260a and 260b include a first transfer part elevation driver 260a configured to move the first transfer part 200a up and down, and a second transfer part elevation driver 260b configured to move the second transfer part 200b up and down.

The flipper apparatus 10 includes a belt driver 270 configured to provide a driving force for operating the transfer belt 210. The belt driver 270 may be supported on the transfer frame 230. For example, the belt driver 270 may include a motor 271 and a belt and pulley 272 configured to transmit the driving force of the motor 271 to the transfer belt 210.

The belt driver 270 includes a pair of belt drivers 270a and 270b configured to operate the transfer belts 210 of the pair of transfer parts 200a and 200b, respectively. The pair of belt drivers 270a and 270b include a first belt driver 270a configured to operate the transfer belt 210 of the first transfer part 200a and a second belt driver 270b configured to operate the transfer belt 210 of the second transfer part 200b.

The flipper apparatus 10 may include an X-axis flipper elevation driver 380 configured to provide a driving force for moving the X-axis flipper unit 300 in the Z-axis direction with respect to the Y-axis flipper unit 100. The X-axis flipper elevation driver 380 may be supported on the Y-axis flipper base 110. The X-axis flipper elevation driver 380 may include a motor 381 and a driving force transmission part 383 configured to transmit the driving force of the motor 381 to the X-axis flipper unit 300.

In an embodiment, the driving force transmission part 383 may include a pulley 383a fixed to the rotation shaft of the motor 381 to rotate, a belt 383b wound around the pulley 383a to receive a rotational force, and a pulley 383c engaged with the belt 383b to receive the rotational force. The driving force transmission part 383 may include a lead screw 383d coupled to the pulley 383c to rotate integrally with the pulley 383c. When the lead screw 383d rotates in one direction, the X-axis flipper base 310 moves in the +Z-axis direction along the lead screw 383d, and when the lead screw 383d rotates in the other direction, the X-axis flipper base 310 may move in the −Z-axis direction along the lead screw 383d.

Figure 6:
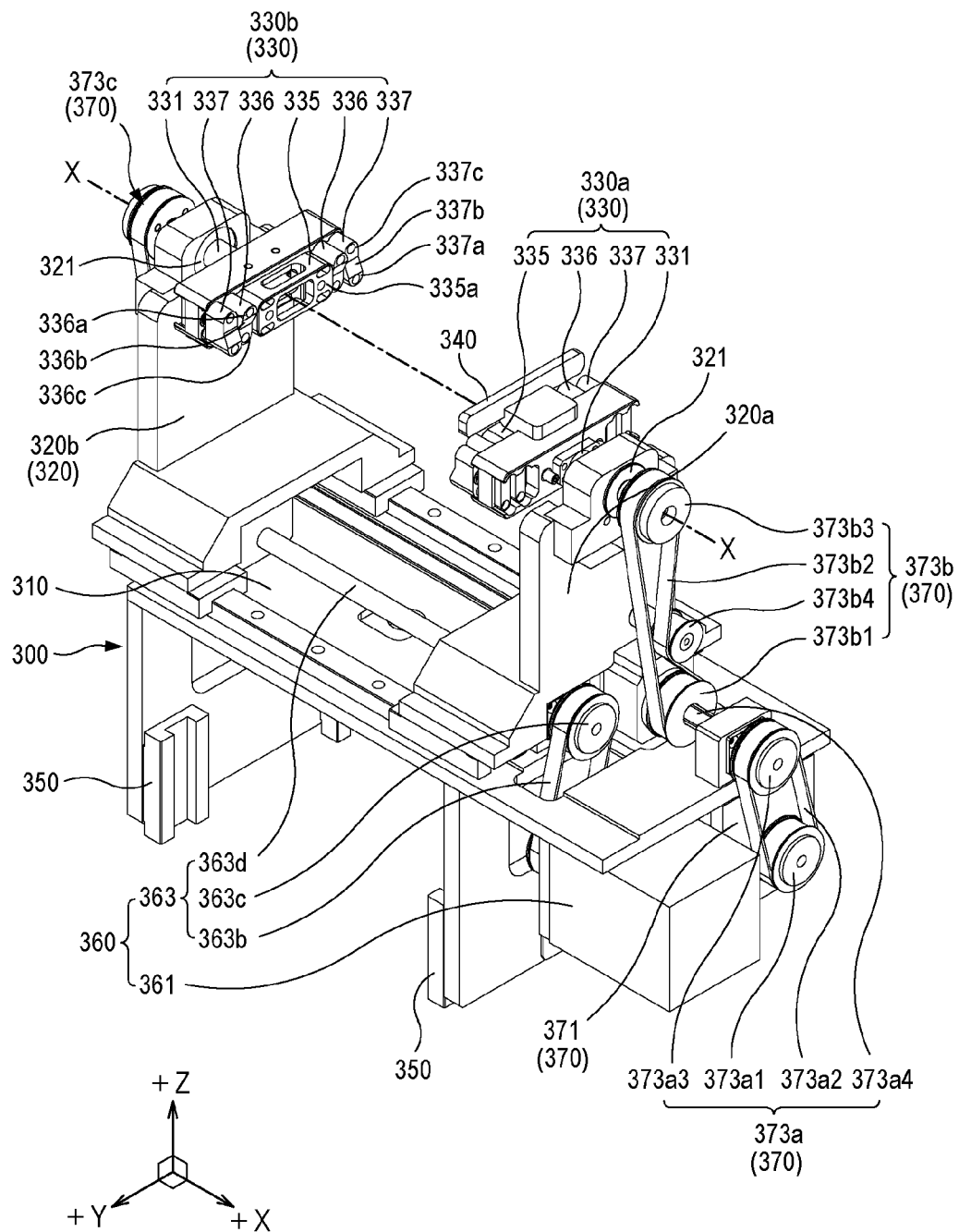
FIG. 6 is a perspective view illustrating an X-axis flipper unit 300 and drivers 360 and 370 of FIG. 3A.

FIG. 6 is a perspective view illustrating the X-axis flipper unit 300 and the drivers 360 and 370 of FIG. 3A. FIG. 6 illustrates the X-axis X, which is the rotational axis of the X-axis holders 330.

Referring to FIG. 6, the X-axis flipper unit 300 may be supported on the Y-axis flipper unit 100 so as to be movable in the Z-axis direction with respect to the Y-axis flipper unit 100. The X-axis flipper unit 300 is configured to rotate the object about the X-axis. The X-axis flipper unit 300 is configured to narrow or widen a space between a pair of X-axis holders 330a and 330b in the X-axis direction. The X-axis flipper unit 300 is configured to be movable in the Z-axis direction with respect to the Y-axis flipper unit 100.

The X-axis flipper unit 300 includes an X-axis flipper base 310 supported on the Z-axis elevation unit 500. The X-axis flipper base 310 may be supported on the Z-axis elevation unit 500 via the Y-axis flipper unit 100. The X-axis flipper base 310 may be supported on the Y-axis flipper base 110. The X-axis flipper base 310 may be disposed to be movable in the Z-axis direction with respect to the Y-axis flipper unit 100.

The X-axis flipper unit 300 includes side frames 320 supported on the X-axis flipper base 310. The side frames 320 are supported on the X-axis flipper base 310 to be movable in the X-axis direction.

The X-axis flipper unit 300 includes a pair of side frames 320 configured to operate so as to narrow or widen a space therebetween in the X-axis direction. The pair of side frames 320 include a first side frame 320a disposed in the +X-axis direction and a second side frame 320b disposed in the −X-axis direction. The X-axis flipper base 310 supports a pair of side frames 320.

The X-axis flipper unit 300 includes rotation joints 321 rotatably supporting the X-axis holders 330. X-axis shafts 331 of the X-axis holders 330 may be supported by the rotation joints 321 to be rotatable about the X-axis.

The X-axis flipper unit 300 includes the X-axis holders 330 configured to hold the object in the X-axis direction of the object. The X-axis flipper unit 300 includes a pair of X-axis holders 330a and 330b supported on the pair of corresponding side frames 320a and 320b. The pair of X-axis holders 330a and 330b include a first X-axis holder 330a disposed in the +X-axis direction and a second X-axis holder 330b disposed in the −X-axis direction.

The pair of X-axis holders 330a and 330b are configured to rotate about the X-axis with respect to the pair of side frames 320a and 320b. The pair of X-axis holders 330a and 330b are configured to hold the object therebetween.

The X-axis flipper unit 300 includes X-axis shafts 331 supported on the side frames 320 to be rotatable about the X-axis. The X-axis shafts 331 may be disposed to pass through the corresponding side frames 320 in the X-axis direction. The X-axis shafts 331 may be rotatably supported by the rotation joints 321 of the side frames 320.

The X-axis holders 330 are supported on the side frames 320 to be rotatable about the X-axis. Each X-axis holder 330 includes an X-axis contactor 335 having a contact surface 335a configured to come into contact with the object in the X-axis direction. The X-axis contactor 335 is supported on the X-axis shaft 331. The X-axis contactor 335 is disposed on the X-axis. The X-axis contactor 335 is disposed such that the X-axis passes through the X-axis contactor 335.

The X-axis holder 330 may include a first grip part 336 formed such that a +Z-axis direction portion protrudes in the X-axis direction compared to a −Z-axis direction portion. The first grip part 336 is supported on the X-axis shaft 331. The first grip part 336 is disposed on one side of the X-axis contactor 335. The first grip part 336 is disposed in a direction perpendicular to the X-axis with respect to the X-axis contactor 335.

The +Z-axis direction portion of the first grip part 336 protrudes in the X-axis direction so as to form a first protruding surface 336a, and the −Z-axis direction portion of the first grip part 336 is recessed in the X-axis direction so as to form a first recessed surface 336c. The first grip part 336 forms a first inclined surface 336b connecting the first protruding surface 336a and the first recessed surface 336c to each other. A pair of first grip parts 336 may be provided on both sides of the X-axis contactor 335.

The X-axis holder 330 may include a second grip part 337 formed such that a −Z-axis direction portion protrudes in the X-axis direction compared to a +Z-axis direction portion. The second grip part 337 is supported on the X-axis shaft 331. The second grip part 337 is disposed on one side of the first grip part 336. The second grip part 337 is disposed in a direction perpendicular to the X-axis with respect to the first grip part 336.

The X-axis contactor 335, the first grip part 336, and the second grip part 337 may be arranged along any one direction perpendicular to the X-axis. The X-axis contactor 335, the first grip part 336, and the second grip part 337 may be arranged along the Y-axis direction.

The +Z-axis direction portion of the second grip part 337 protrudes in the X-axis direction so as to form a second protruding surface 337a, and the −Z-axis direction portion of the second grip part 337 is recessed in the X-axis direction so as to form a second recessed surface 337c. The second grip part 337 forms a second inclined surface 337b connecting the second protruding surface 337a and the second recessed surface 337c to each other. A pair of second grip parts 337 may be provided on both sides of the X-axis contactor 335.

The X-axis flipper unit 300 may include a transfer stopper 340 configured to limit the movement of the object moved by the transfer unit 200. The transfer stopper 340 may be disposed on only one of the pair of X-axis holders 330a and 330b. In this embodiment, the transfer stopper 340 is fixed to a first X-axis holder 330a. The transfer stopper 340 may protrude from the first X-axis holder 330a in the +Z-axis direction so as to form a surface facing the −X-axis direction. The object moved in the X-axis direction by the transfer unit 200 may be engaged with the transfer stopper 340 so that the movement thereof in the X-axis direction can be stopped.

The X-axis flipper unit 300 may include X-axis flipper sliders 350 configured to slide in the Z-axis direction along the X-axis flipper guide 140 of the Y-axis flipper unit 100.

A pair of X-axis flipper sliders 350 may be configured to face each other in the X-axis direction.

The X-axis flipper unit 300 may include an X-axis rotation home sensor (not illustrated) configured to detect a position of a predetermined rotation angle of the X-axis holder 330. The X-axis flipper unit 300 may include an X-axis contactor sensor (not illustrated) configured to generate a detection signal when the object comes into contact with the X-axis contactor 335. The X-axis flipper unit 300 may include an X-axis movement sensor (not illustrated) configured to generate a detection signal when the side frames 320 move to a predetermined position with respect to the X-axis flipper base 310. The X-axis movement sensor may detect the state in which a space between the pair of side frames 320a and 320b is narrowed in the X-axis direction and the state in which the space is widened in the X-axis direction.

The X-axis flipper unit 300 may include Z-axis movement sensors 391a and 391b configured to generate a detection signal when the X-axis flipper base 310 moves to a predetermined position with respect to the Y-axis flipper base 110 (see FIG. 5). When the X-axis flipper base 310 is disposed at a predetermined position with respect to the Y-axis flipper base 110, a target (not illustrated) fixed to the X-axis flipper base 310 is detected by the Z-axis movement sensors 391a and 391b.

The flipper apparatus 10 includes an X-axis movement driver 360 configured to provide a driving force for moving the pair of side frames 320a and 320b in the X-axis direction with respect to the X-axis flipper base 310. The X-axis movement driver 360 is supported on the X-axis flipper unit 300. The X-axis movement driver 360 may include a motor 361 and a driving force transmission part 363 configured to transmit the driving force of the motor 361 to the pair of side frames 320a and 320b.

In an embodiment, the driving force transmission part 363 may include a pulley (not illustrated) fixed to the rotation shaft of the motor 361 to rotate, a belt 363b wound around the pulley to receive a rotational force, and a pulley 363c engaged with the belt 363b to receive the rotational force. The driving force transmission part 363 may include a lead screw 363d coupled to the pulley 363c to rotate integrally with the pulley 363c. When the lead screw 363d rotates in one direction, the pair of side frames 320a and 320b may move along the lead screw 363d to narrow a space therebetween in the X-axis direction, and when the lead screw 363d rotates in the other direction, the pair of side frames 320a and 320b may move along the lead screw 363d to be spaced apart from each other in the X-axis direction.

The flipper apparatus 10 includes an X-axis holder rotation driver 370 configured to provide a driving force for rotating the X-axis holders 330 with respect to the side frames 320. The X-axis holder rotation driver 370 may provide a driving force for rotating the X-axis shafts 331. The X-axis holder rotation driver 370 is supported on the X-axis flipper unit 300. The X-axis holder rotation driver 370 may include a motor 371 and driving force transmission parts 373a, 373b, and 373c configured to transmit the driving force of the motor 371 to the pair of X-axis holders 330a and 330b.

The driving force transmission parts 373a, 373b, and 373c may include a basic driving force transmission part 373a configured to transmit the rotational force of the motor 371 to the first driving force transmission part 373b and the second driving force transmission part 373c. The driving force transmission parts 373a, 373b, and 373c may include a first driving force transmission part 373b configured to receive a rotational force from the basic driving force transmission part 373a and to transmit the rotational force to the first X-axis holder 330a, and a second driving force transmission part 373c configured to receive a rotational force from the basic driving force transmission part 373a and to transmit the rotational force to the second X-axis holder 330b.

In an embodiment, the basic driving force transmission part 373a may include a pulley 373a1 fixed to the rotation shaft of the motor 371 to rotate, a belt 373a2 wound around the pulley 373a1 to receive a rotational force, and a pulley 373a3 engaged with the belt 373a2 to receive the rotational force. The basic driving force transmission part 373a may include a serrated shaft 373a4 coupled to the pulley 373a3 to rotate integrally with the pulley 373a3. The motor 371 and the basic driving force transmission part 373a may be supported on the X-axis flipper base 310.

In an embodiment, the first driving force transmission part 373b may include a pulley 373b1 coupled to the serrated shaft 373a4 to receive a rotational force and configured to be movable in the X-axis direction along the serrated shaft 373a4. The first driving force transmission part 373b may include a belt 373b2 wound around the pulley 373b1 to receive a rotational force, and a pulley 373b3 engaged with the belt 373b2 to receive the rotational force and to rotate the first X-axis holder 330a. The first driving force transmission part 373b may include a guide pulley 373b4 configured to come into contact with the belt 373b2 so as to guide the position of the belt 373b2. The first driving force transmission part 373b is supported on the first side frame 320a.

In an embodiment, the second driving force transmission part 373c may include a pulley (not illustrated) coupled to the serrated shaft 373a4 to receive a rotational force and configured to be movable in the X-axis direction along the serrated shaft 373a4. The second driving force transmission part 373c is configured in the form of the first driving force transmission part 373b, and may rotate the second X-axis holder 330b. The second driving force transmission part 373c is supported on the second side frame 320b.

Figure 7:
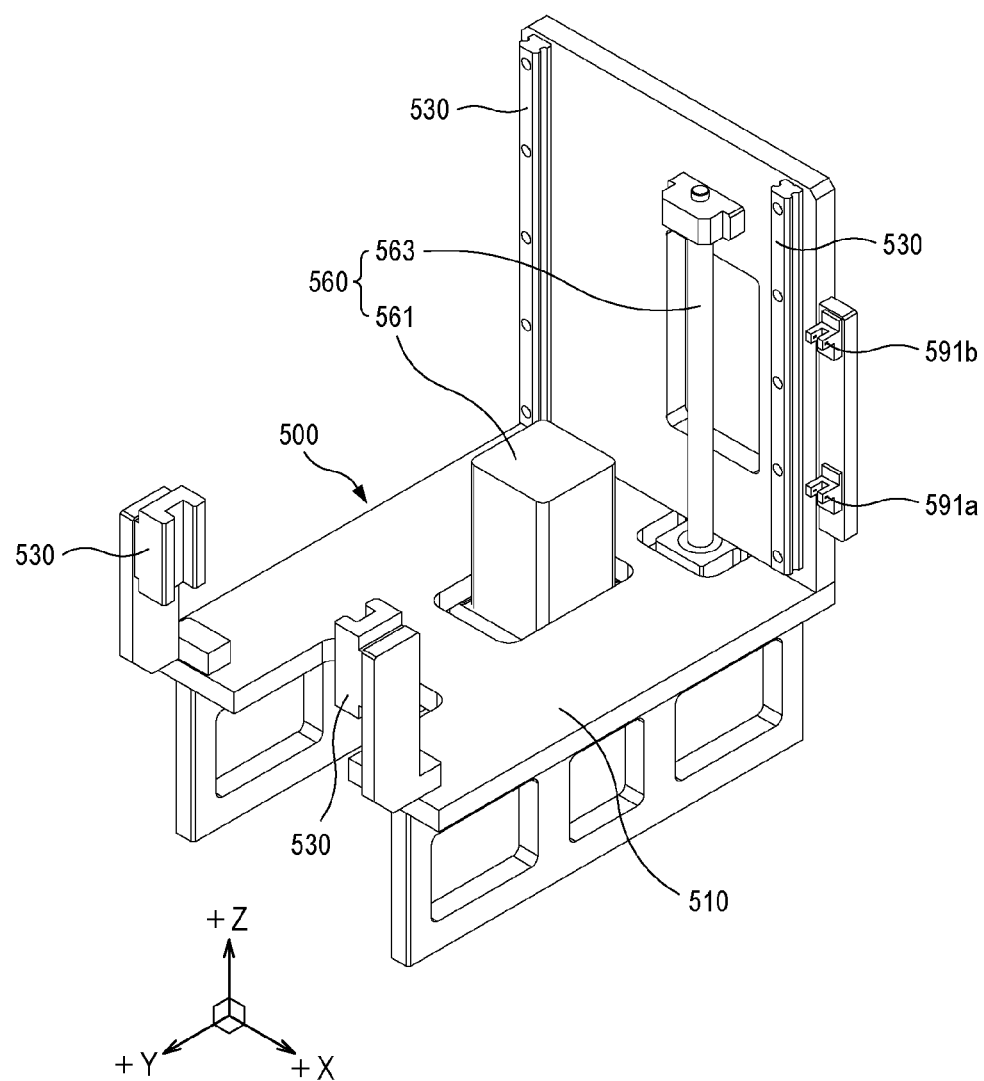
FIGS. 7 and 8 are perspective views illustrating a Z-axis elevation unit 500 and a Z-axis elevation driver 560 of FIG. 3A.
Figure 8:
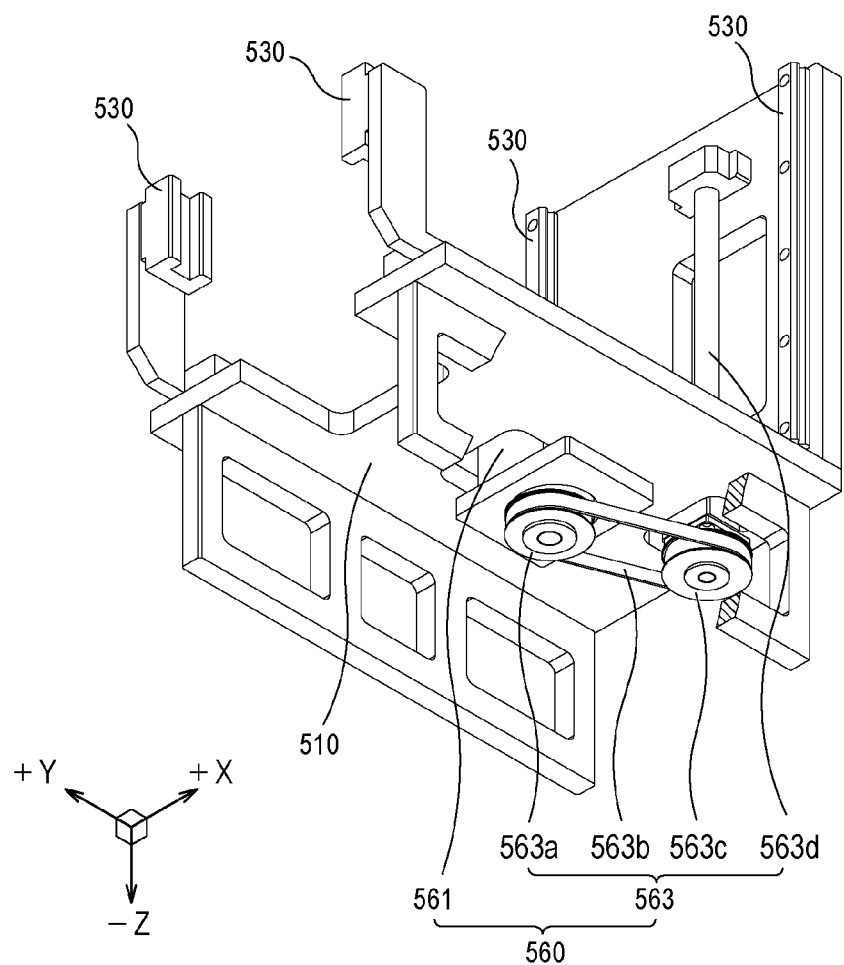

FIGS. 7 and 8 are perspective views illustrating the Z-axis elevation unit 500 and the Z-axis elevation driver 560 of FIG. 3A. Referring to FIGS. 7 and 8, the Z-axis elevation unit 500 may be supported in an environment outside the flipper apparatus 10 (e.g., an external floor or wall). The Y-axis flipper unit 100 may be raised and lowered in the Z-axis direction with respect to the Z-axis elevation unit 500.

The Z-axis elevation unit 500 may include a support frame 510 supported by an external environment. The Z-axis elevation unit 500 may include a Z-axis guide 530 formed on the support frame 510. The Z-axis guide 530 guides the movement of the Y-axis flipper unit 100 in the Z-axis direction.

The Z-axis elevation unit 500 may include elevation sensors 591a and 591b configured to generate a detection signal when the Y-axis flipper base 110 moves to a predetermined position with respect to the Z-axis elevation unit 500. When the Y-axis flipper base 110 is disposed at a predetermined position relative to the Z-axis elevation unit 500, a target 591t fixed to the Y-axis flipper base 110 is detected by the Z-axis movement sensors 391a and 391b (see FIG. 3A).

The flipper apparatus 10 may include a Z-axis flipper elevation driver 560 configured to provide a driving force for moving the Y-axis flipper unit 100 and the X-axis flipper unit 300 in the Z-axis direction with respect to the Z-axis elevation unit 500. The Z-axis elevation driver 560 may be supported on the Z-axis elevation unit 500. The Z-axis elevation driver 560 may include a motor 561 and a driving force transmission part 563 configured to transmit the driving force of the motor 561 to the Y-axis flipper unit 100.

In an embodiment, the driving force transmission part 563 may include a pulley 563a fixed to the rotation shaft of the motor 561 to rotate, a belt 563b wound around the pulley 563a to receive a rotational force, and a pulley 563c engaged with the belt 563b to receive the rotational force. The driving force transmission part 563 may include a lead screw 563d coupled to the pulley 563c to rotate integrally with the pulley 563c. When the lead screw 563d rotates in one direction, the Y-axis flipper base 110 moves in the +Z-axis direction along the lead screw 563d, and when the lead screw 563d rotates in the other direction, the Y-axis flipper base 110 may move in the −Z-axis direction along the lead screw 563d.

FIGS. 9 to 16 are perspective views sequentially illustrating a process of operating the flipper apparatus 10 according to an embodiment, in which, for convenience of description, the X-axis flipper unit 300 and the Z-axis elevation unit 500 are omitted in some drawings.

Figure 9:
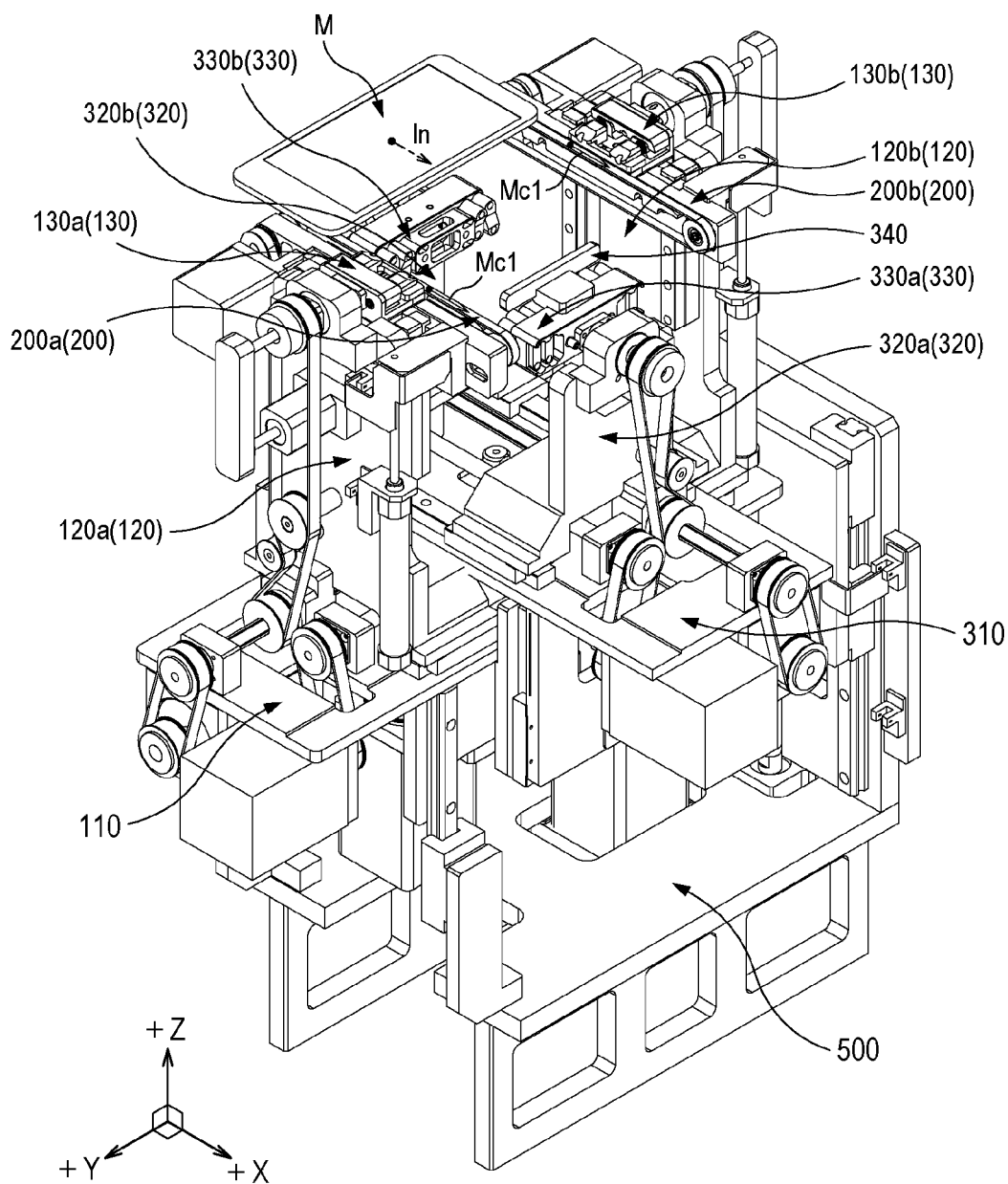
FIGS. 9 to 16 are perspective views sequentially illustrating a process of operating the flipper apparatus 10 according to an embodiment, in which, for convenience of description, the X-axis flipper unit 300 and the Z-axis elevation unit 500 are omitted in some drawings.

Referring to FIG. 9, an object M is introduced into the flipper apparatus 10. The top surfaces of the transfer belts 210 of the transfer unit 200 move in the +X-axis direction (see arrows Mc1). Accordingly, the object M placed on the transfer belts 210 moves in the +X-axis direction (see arrow In).

Figure 10:
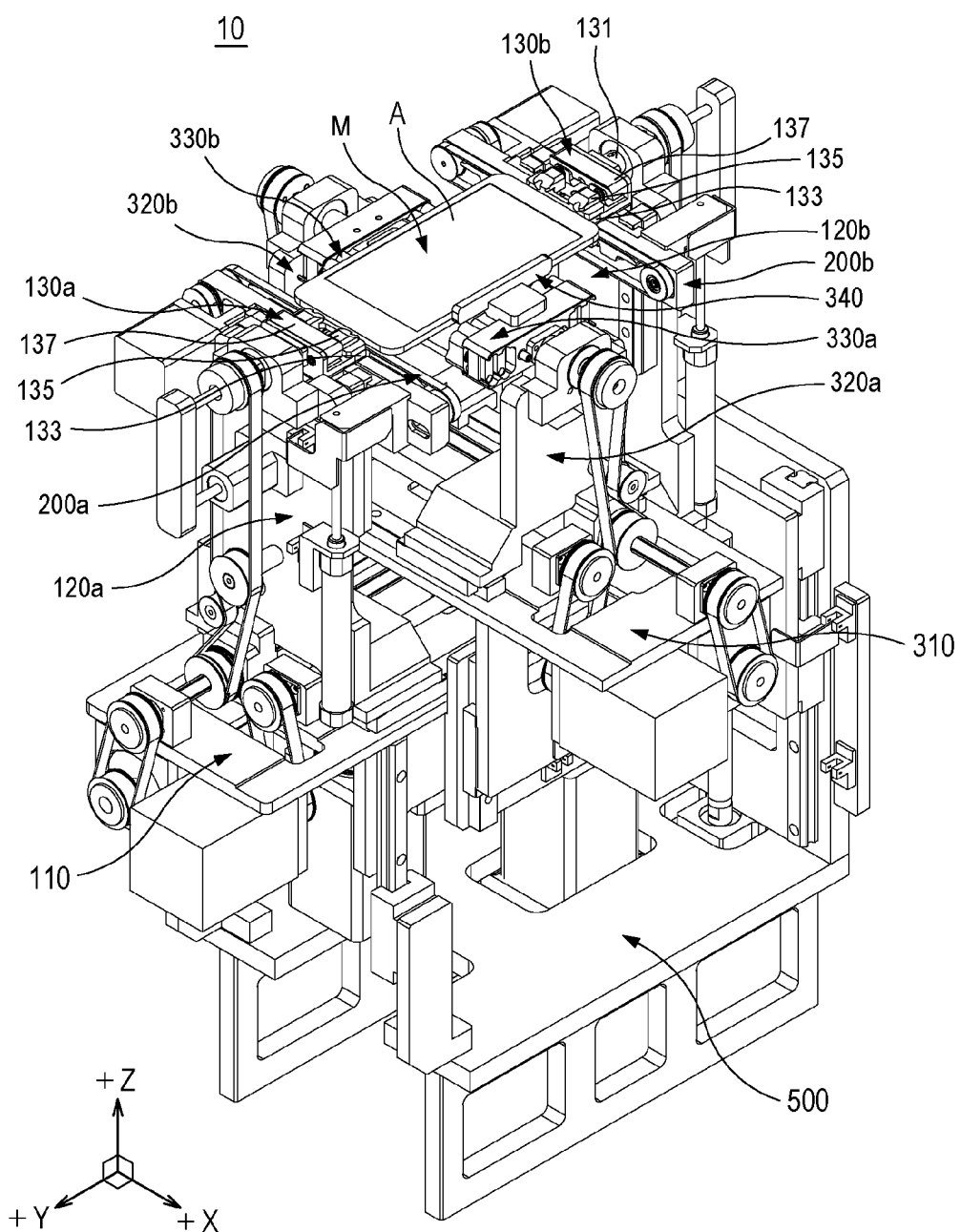

Referring to FIGS. 9 and 10, the X-axis flipper unit 300 is in the state of having been lowered by a predetermined range with respect to the Y-axis flipper unit 100, and the object M is not engaged with the X-axis flipper unit 300 on the path through which the object M is transferred to a correct position in the flipper apparatus 10, and is engaged with the transfer stopper 340 of the X-axis flipper unit 300 when the flipper apparatus 10 reaches the correct position. Referring to FIG. 10, the object M is engaged with the transfer stopper 340 at a predetermined correct position and is stopped so that the object M can no longer move in the +X-axis direction. Thereafter, the pair of side frames 320a and 320b are spaced apart from each other in the X-axis direction and move in the +Z-axis direction with respect to the Y-axis flipper unit 100 to maintain the state of being spaced apart from the object M.

Figure 11:
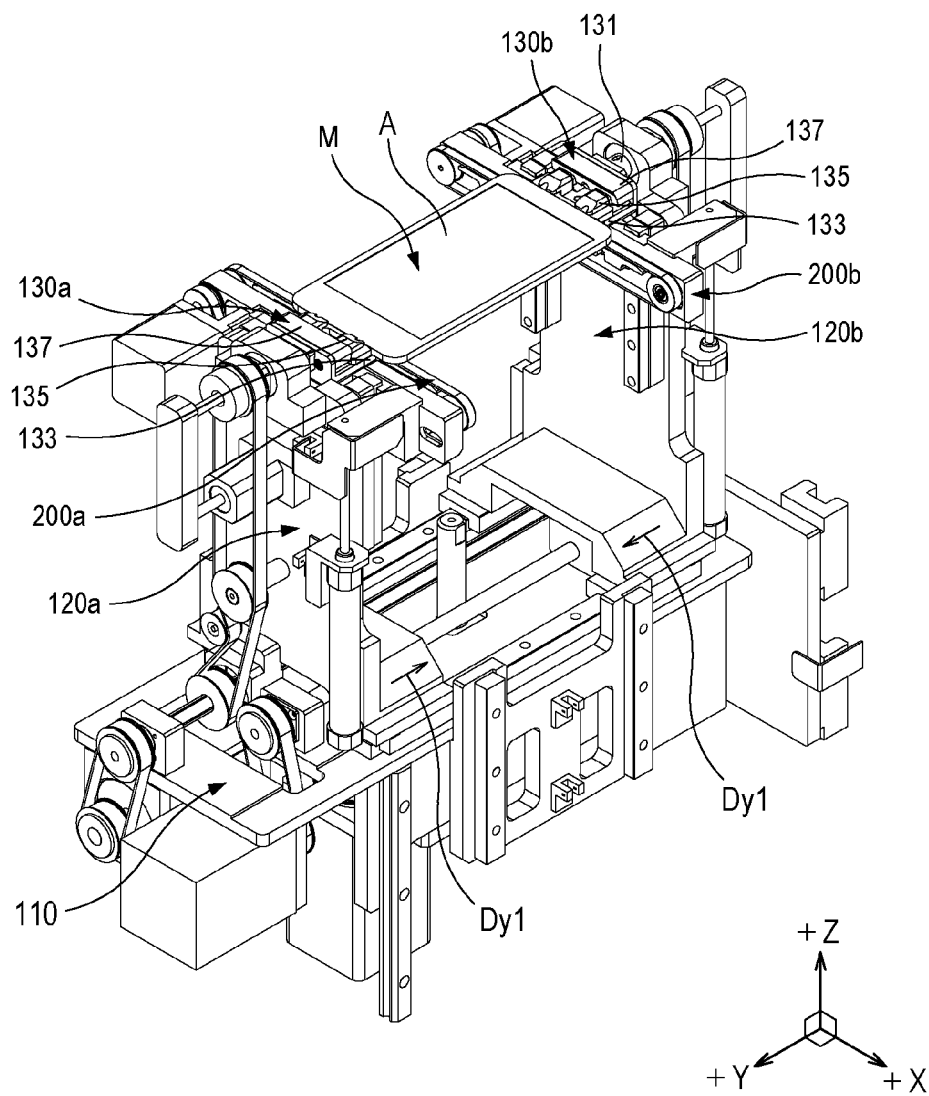

Referring to FIG. 11, a space between the pair of body frames 120a and 120b of the Y-axis flipper unit 100 is narrowed in the Y-axis direction (see arrows Dy1). Here, the support grip parts 133 of the Y-axis holders 130 support the bottom surface of the object M.

Figure 12:
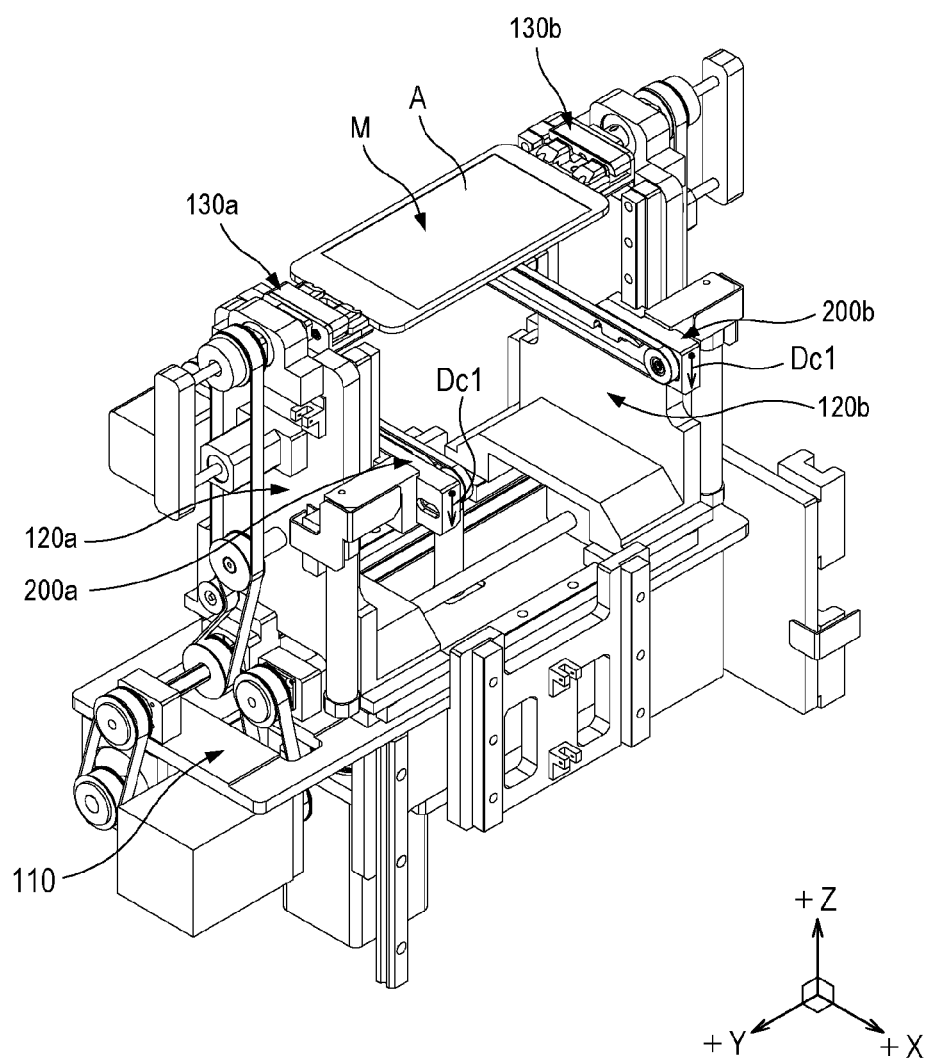

Referring to FIG. 12, the transfer units 200a and 200b move in the −Z-axis direction along the body frame 120 (see arrows Dc1). Through this, it is possible to prevent the transfer unit 200 from interfering with the object M when the object M rotates.

Referring to FIG. 12, in the state in which the support grip parts 133 of the Y-axis holders 130 support the bottom side of the object M and the elastic grip parts 135 are in contact with both sides of the object M in the Y-axis direction, an object surface A of the object M facing the +Z-axis direction is inspected by the camera device. Here, a pair of auxiliary grip parts 137 are in the state of being spaced further apart from each other compared to the pair of support grip parts 133, and since the auxiliary grip parts 137 do not block the +Z-axis direction of the object surface A, the entire object surface A can be inspected. The inspection of the object surface A can be performed while the transfer units 200a and 200b are being lowered in the −Z-axis direction, and in this case, the inspection time can be shortened.

Figure 13:
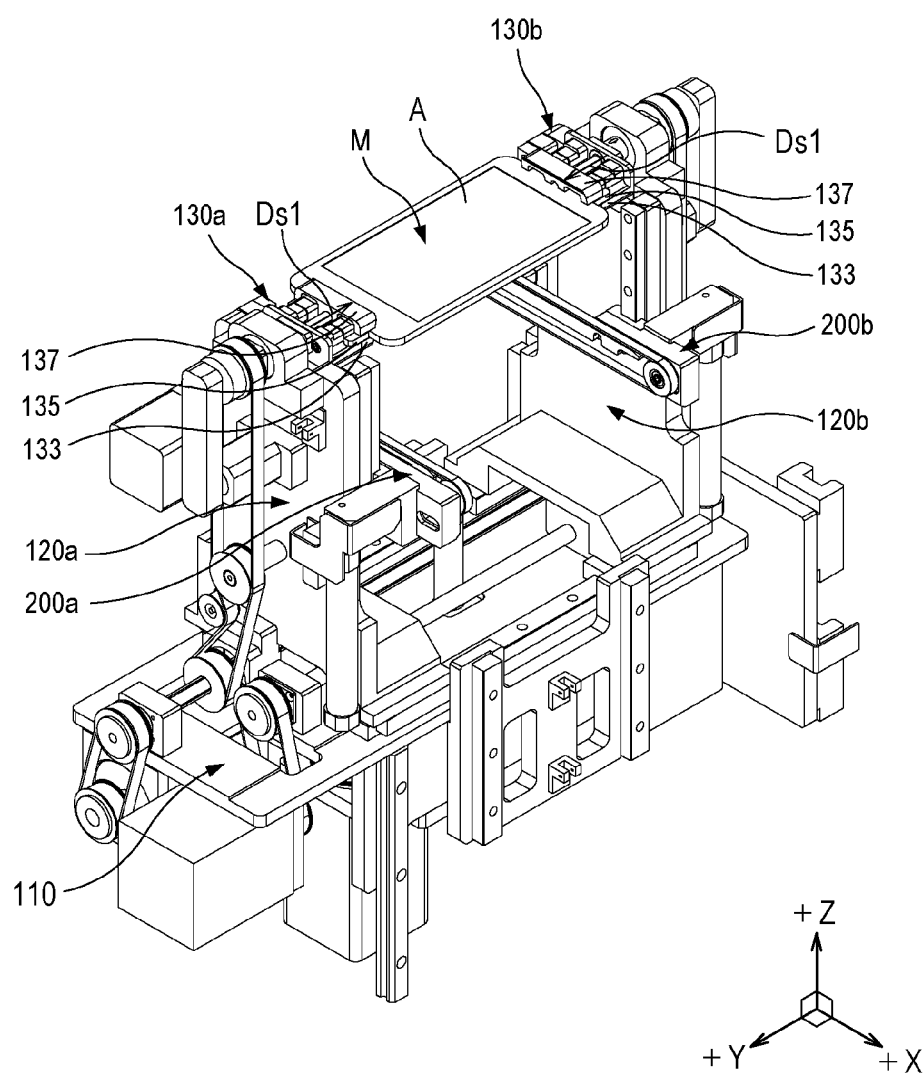

Referring to FIG. 13, for inspection of object surfaces B1 and B2 after the inspection of the object surface A, the pair of auxiliary grip parts 137 move into the state in which a space therebetween is further narrowed compared to the pair of support grip parts 133 (see arrows Ds1). The support grip parts 133 and the auxiliary grip parts 137 hold the top and bottom sides of the object M so that the object M can be stably rotated.

Figure 14:
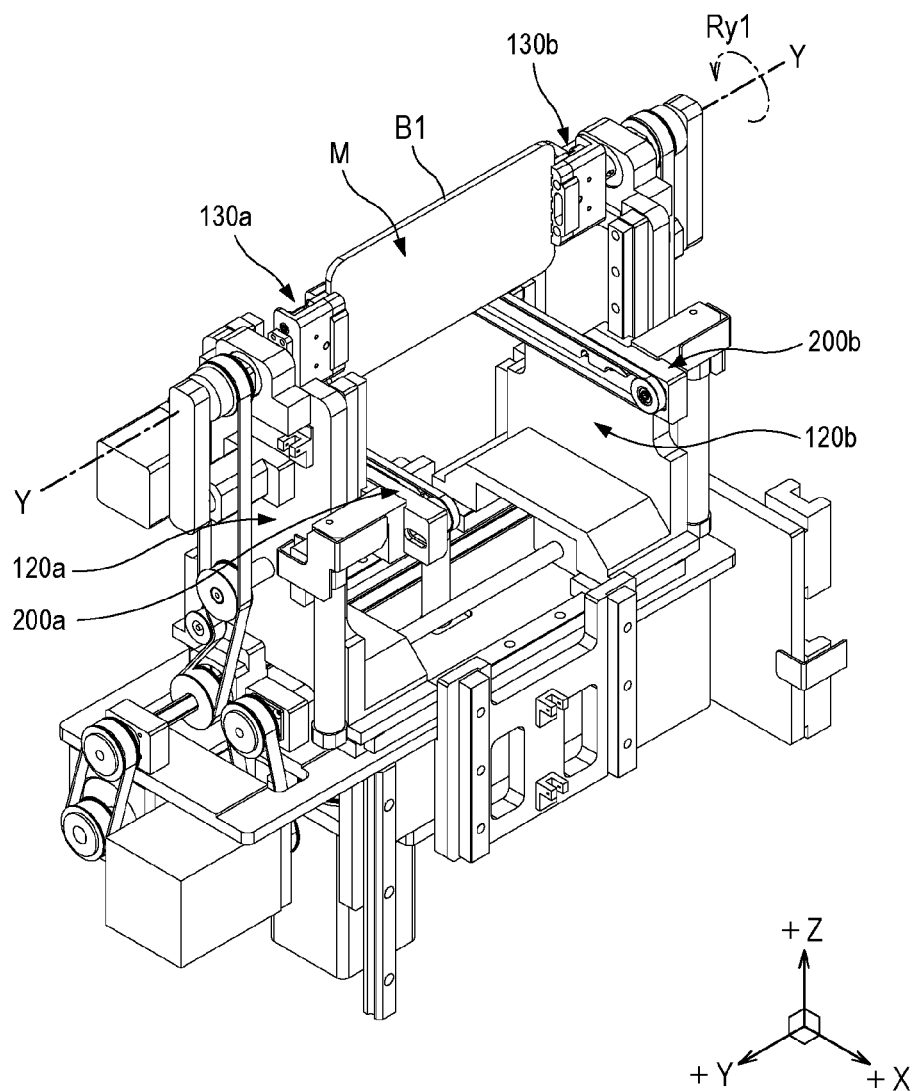

Referring to FIG. 14, by rotating the object M in any one rotation direction Ry1 about the Y-axis in the state in which the Y-axis holders 130 hold the object M, an object surface B1 perpendicular to the object surface A faces the +Z-axis direction. Here, the object surface B1 is inspected by the camera device.

Figure 15A:
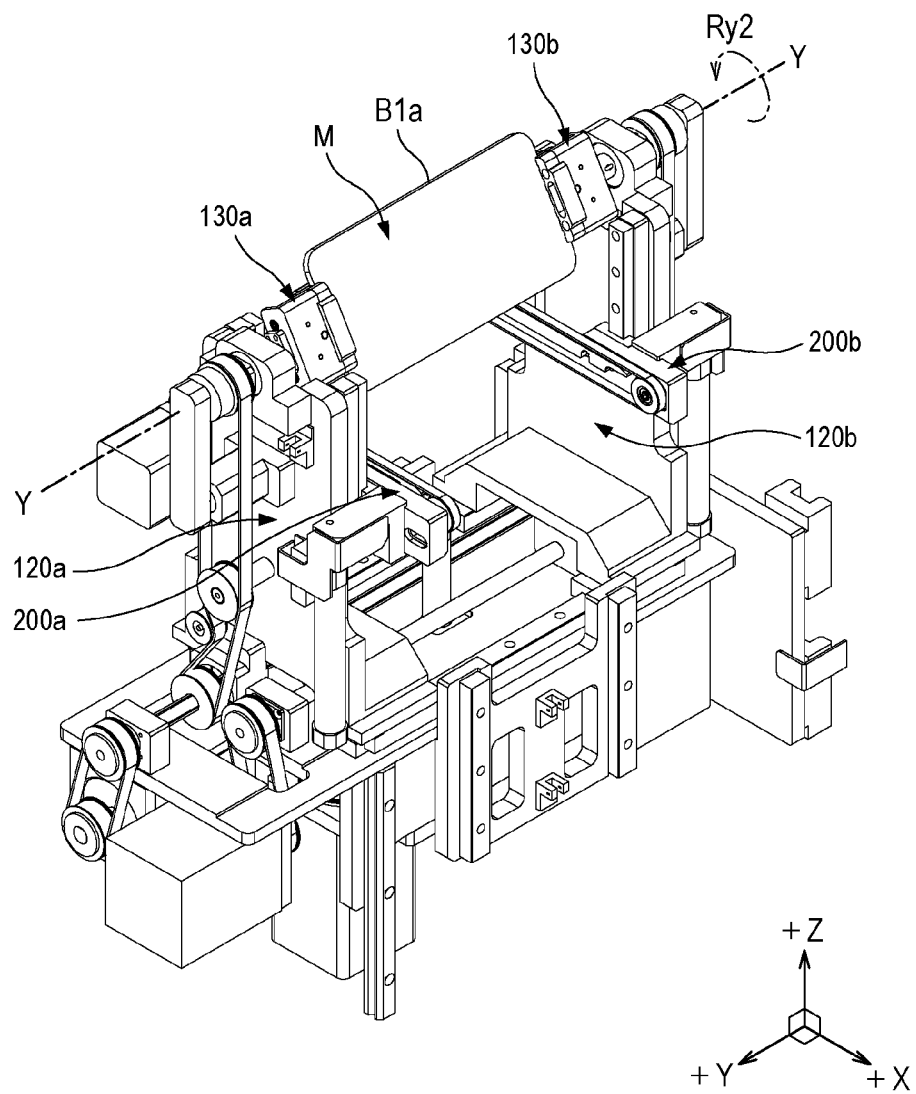
Figure 15B:
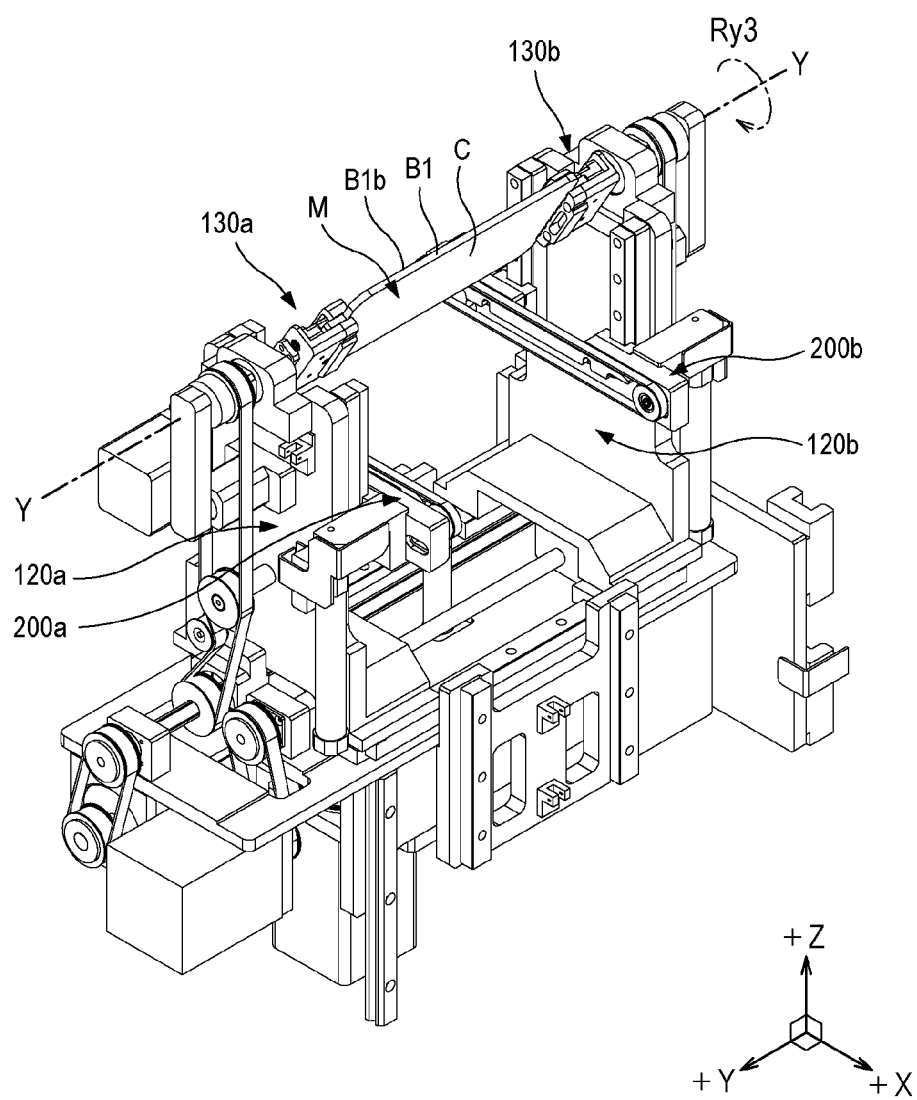

Referring to FIGS. 15A and 15B, the Y-axis holders 130 rotate the object M by an angle of less than 90 degrees about the Y-axis, and object surfaces B1a and B1b, which are inclined by an angle of less than 90 degrees with respect to the object surface B1, can also be inspected. When the corners of the object M are rounded, this inspection method becomes very useful. For example, referring to FIG. 15A, the object surface B1a is inspected by rotating the Y-axis holders 130 in any one rotation direction Ry2, and referring to FIG. 15B, the object surface B1b may be inspected by rotating the Y-axis holders 130 in the opposite rotation direction Ry3.

Figure 16:
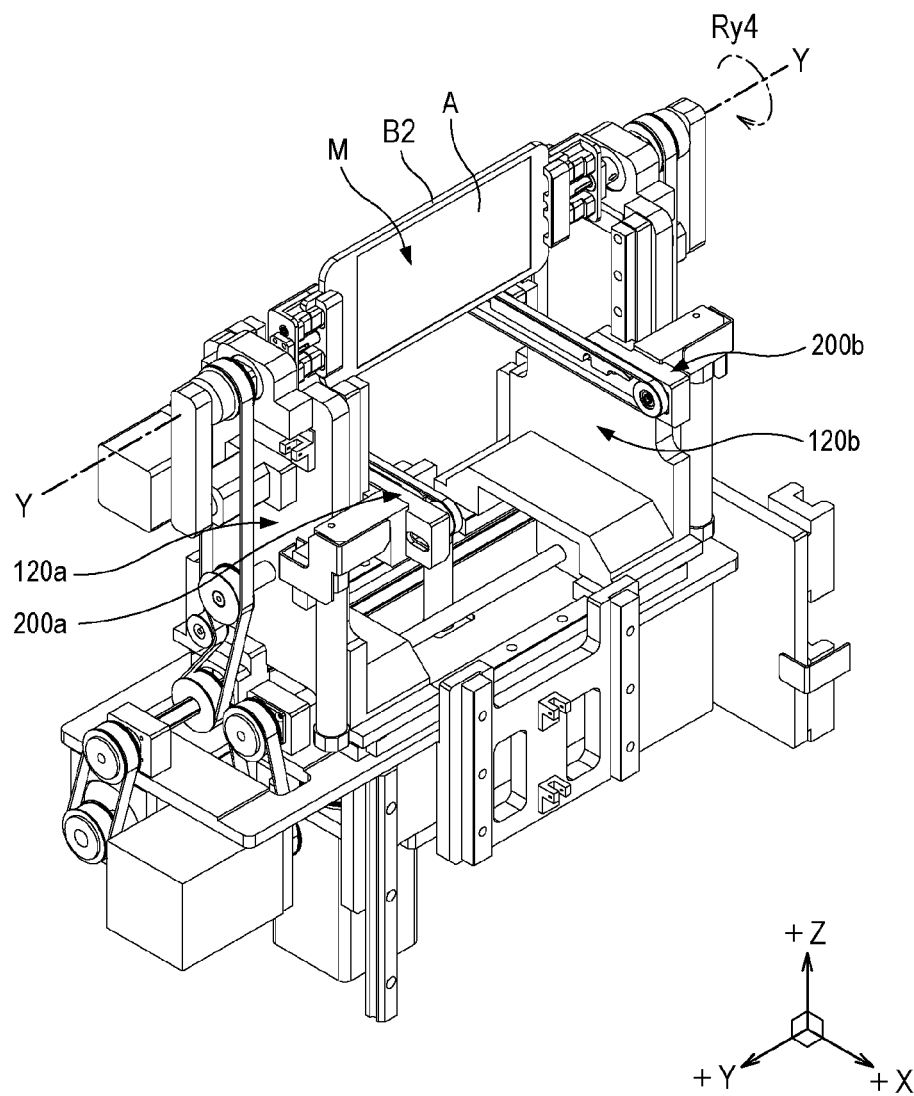

Referring to FIG. 16, when the Y-axis holders 130 rotate the object M in any one rotation direction Ry4 about the Y-axis, the object surface B2, which is opposite to the object surface B1, faces the +Z-axis direction. Here, the object surface B2 is inspected by the camera device.

Figure 17A:
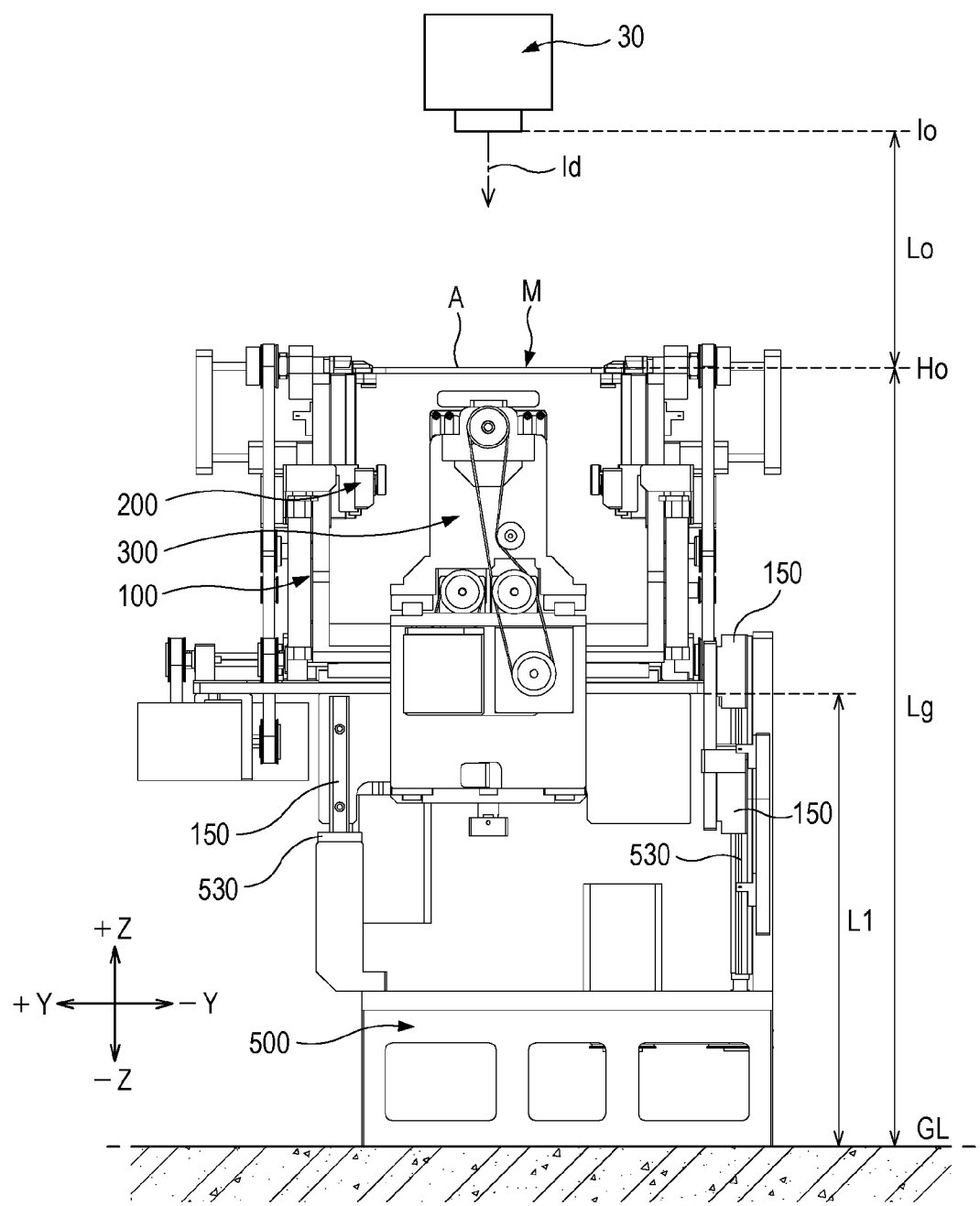
FIG. 17A is an elevation view illustrating the flipper apparatus 10 in the state of FIG. 12 when viewed in the X-axis direction.
Figure 17B:
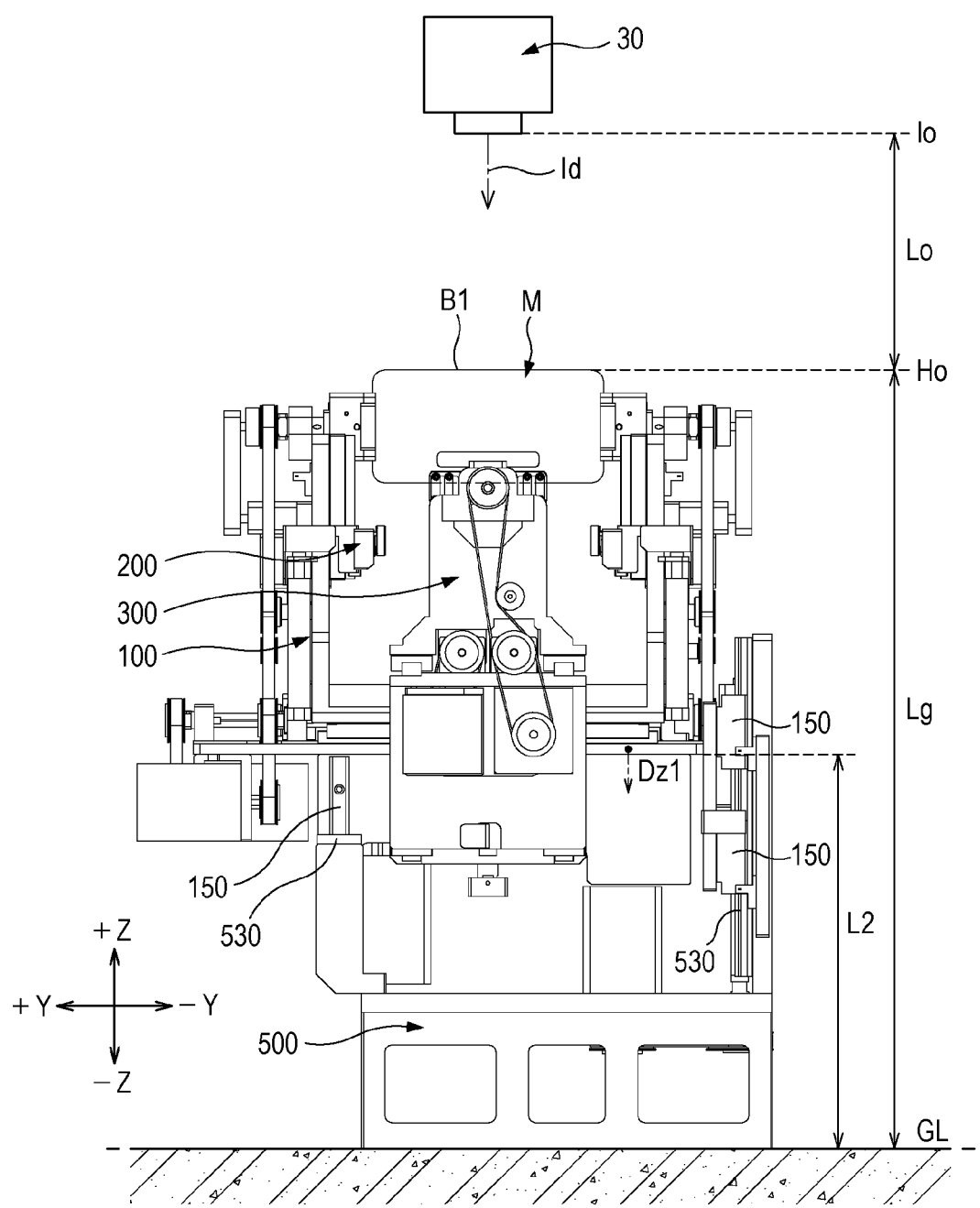
FIG. 17B is an elevation view illustrating the flipper apparatus 10 in the state of FIG. 14 when viewed in the X-axis direction.

FIG. 17A is an elevation view illustrating the flipper apparatus 10 in the state of FIG. 12 when viewed in the X-axis direction. FIG. 17B is an elevation view illustrating the flipper apparatus 10 in the state of FIG. 14 when viewed in the X-axis direction. FIG. 17C is an elevation view illustrating the flipper apparatus 10 in the state of FIG. 15A when viewed in the X-axis direction.

Referring to FIGS. 17A to 17C, the camera device 30 is disposed on a horizontal plane Io separated by a predetermined distance (Lo+Lg) in the Z-axis direction from the ground surface GL, and the inspection direction Id of the camera device 30 becomes the −Z-axis direction. The camera device 30 may inspect the object surface of the object M while moving in the X-axis direction and the Y-axis direction.

The camera device 30 maintains a predetermined distance Lo from the object surface of the object M facing the +Z-axis direction. To this end, the distance between the object surface and the ground surface GL may be maintained at a predetermined distance Lg. The Z-axis elevation unit 500 moves the Y-axis flipper unit 100 in the Z-axis direction so as to maintain the distance Lg constant.

Referring to FIG. 17A, the distance L1 between a reference point of the Y-axis flipper unit 100 and the ground surface GL during inspection of the object surface A is illustrated.

Referring to FIG. 17B, since the position of the object surface B1 relative to the Y-axis flipper unit 100 becomes higher than that of the object surface B1 relative to the Y-axis flipper unit 100, the Z-axis elevation unit 500 may move the Y-axis flipper unit 100 downward by a predetermined distance (see arrow Dz1). Here, the distance L2 between the Y-axis flipper unit 100 and the ground surface GL becomes shorter than the distance L1.

Referring to FIG. 17C, since the position of the object surface B1a relative to the Y-axis flipper unit 100 becomes lower than that of the object surface B1 relative to the Y-axis flipper unit 100, the Z-axis elevation unit 500 may move the Y-axis flipper unit 100 upward by a predetermined distance (see arrow Dz2). Here, the distance L3 between the Y-axis flipper unit 100 and the ground surface GL becomes longer than the distance L2, but becomes shorter than the distance L1.

FIGS. 18 to 26 are perspective views sequentially illustrating a process of operating the flipper apparatus 10 according to an embodiment after the state of FIG. 16, in which, for convenience of description, the Y-axis flipper unit 100 and the Z-axis elevation unit 500 are omitted in some drawings.

Figure 18:
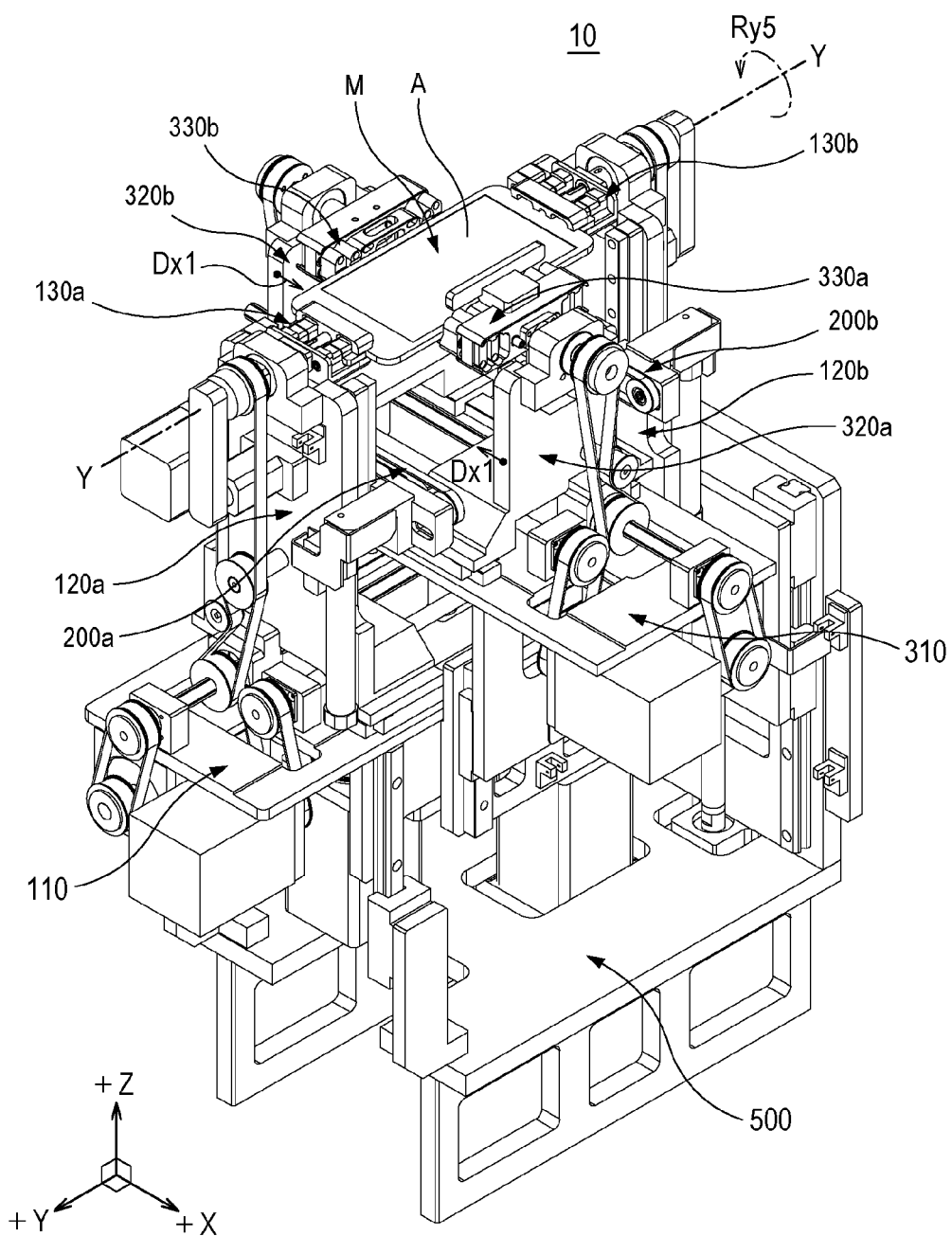
FIGS. 18 to 26 are perspective views sequentially illustrating a process of operating the flipper apparatus 10 according to an embodiment after the state of FIG. 16, in which, for convenience of description, the Y-axis flipper unit 100 and the Z-axis elevation unit 500 are omitted in some drawings.

Referring to FIG. 18, the Y-axis holders 130 rotate the object M (see arrow Ry5), and dispose the object such that the object surface A faces the +Z-axis direction. The pair of side frames 320a and 320b remain in the state in which a space therebetween is widened in the X-axis direction before that time, and then a space therebetween is narrowed in the X-axis direction such that the pair of X-axis holders 330a and 330b hold the object M (see arrows Dx1).

Figure 19:
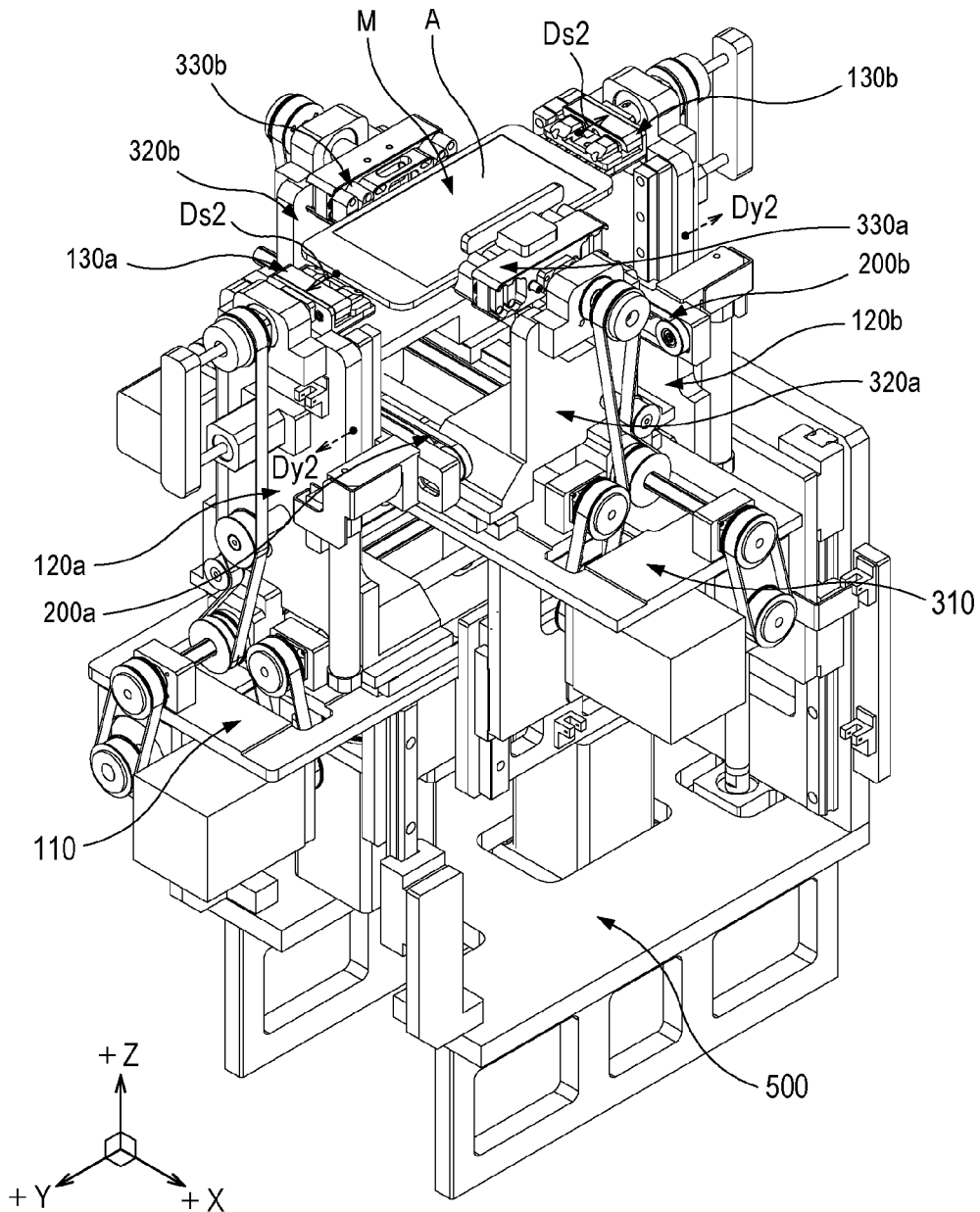

Referring to FIG. 19, the auxiliary grip parts 137 move in the second direction with respect to the support grip parts 133 so as to be in the disengaged state (see arrow Ds2), and a space between the pair of body frames 120a and 120b is widened so as to cause the pair of Y-axis holders 130a and 130b to be spaced apart from the object M (see arrows Dy2). Through this, when the X-axis holders 330 rotate the object M, there is no interference with the Y-axis holders 130.

Figure 20:
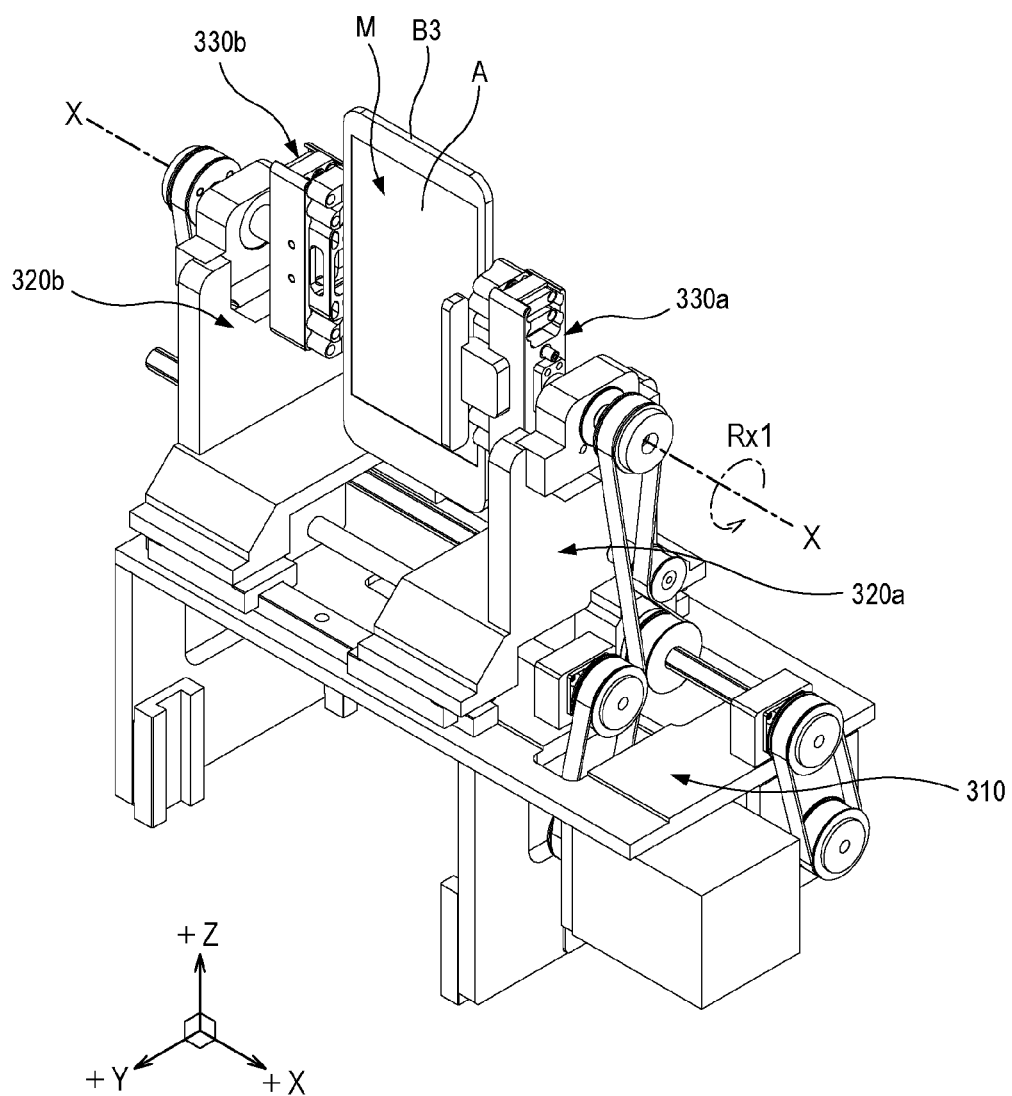

Referring to FIG. 20, by rotating the object M in any one rotation direction Rx1 about the X-axis in the state in which the X-axis holders 330 hold the object M, an object surface B3 perpendicular to the object surface A faces the +Z-axis direction. Here, the object surface B3 is inspected by the camera device.

Figure 21A:
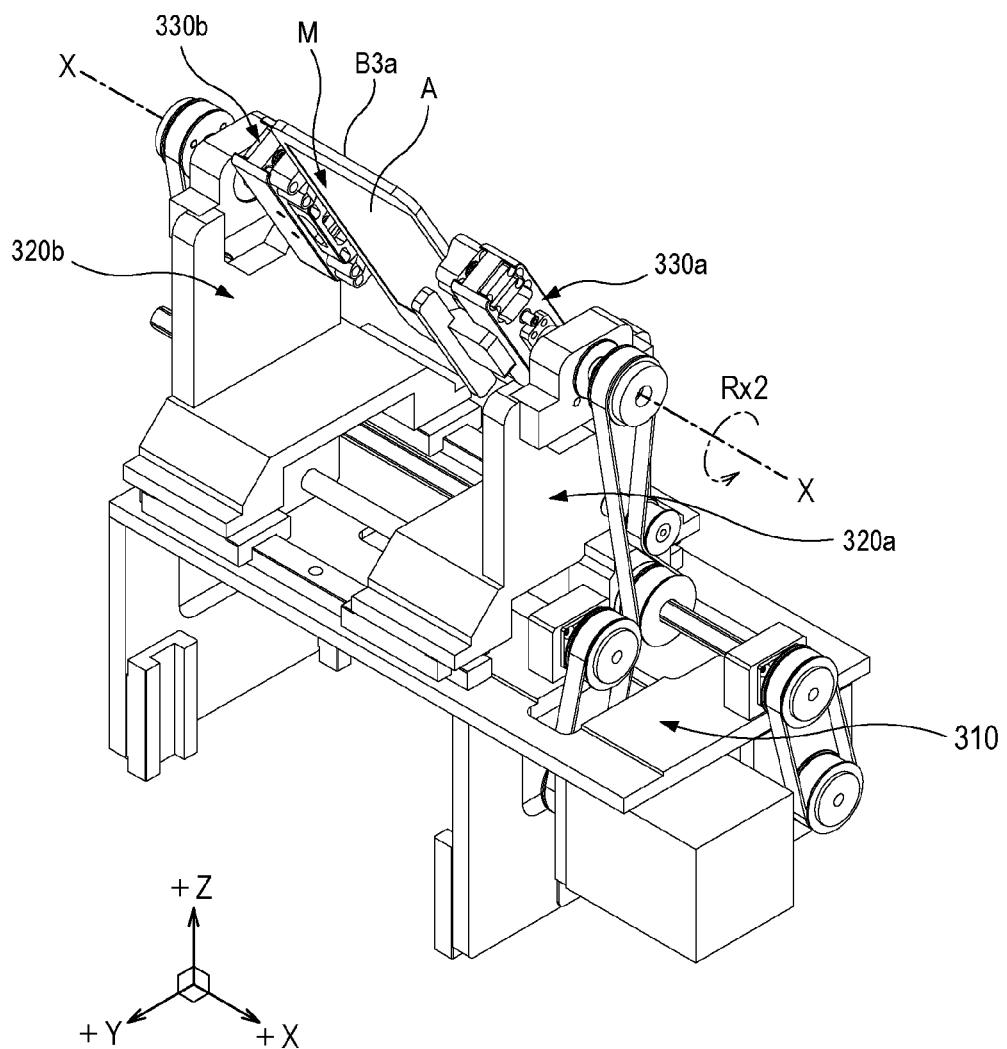
Figure 21B:
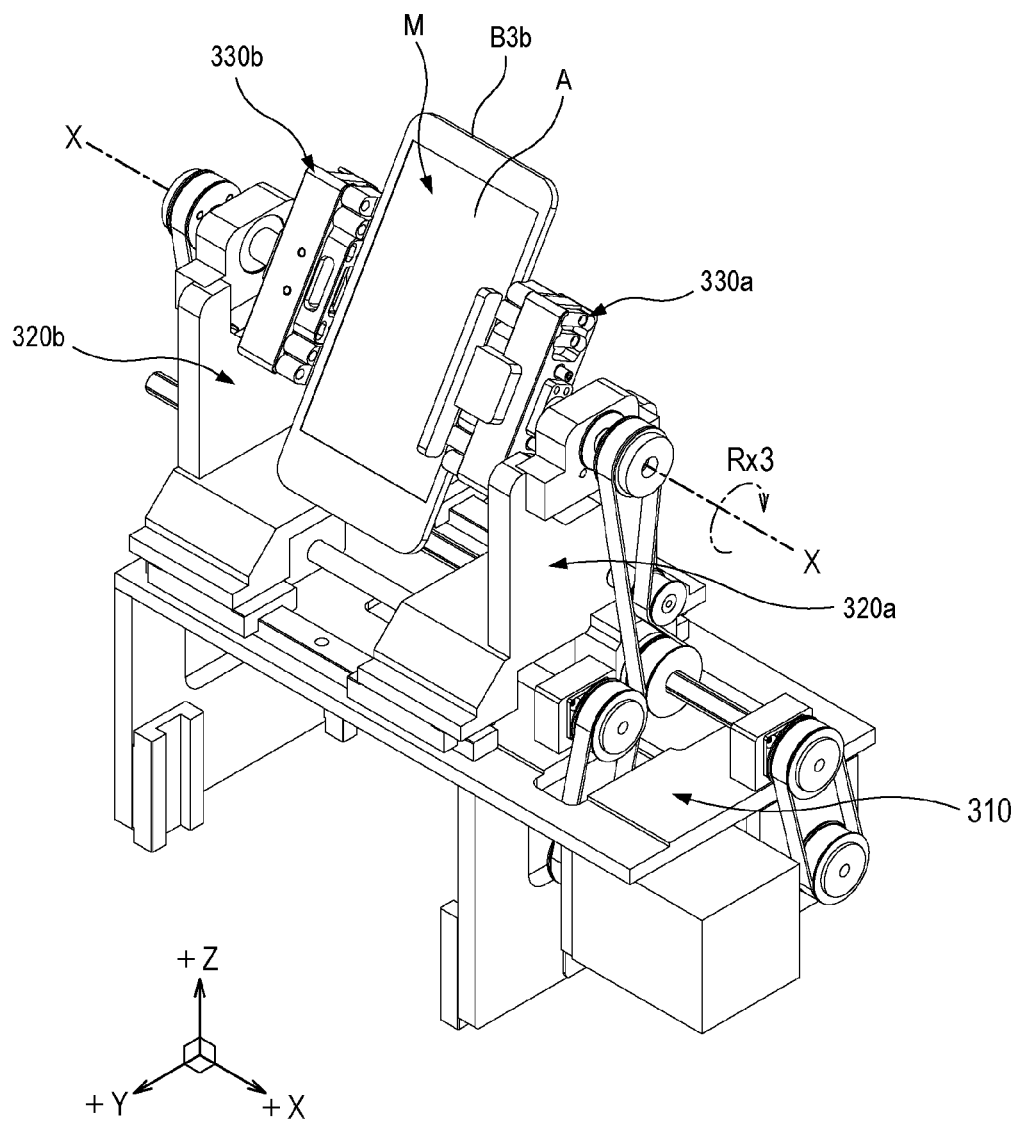

Referring to FIGS. 21A and 21B, the X-axis holders 330 rotate the object M by an angle of less than 90 degrees about the X-axis, and object surfaces B3a and B3b, which are inclined by an angle of less than 90 degrees with respect to the object surface B3, can also be inspected. When the corners of the object M are rounded, this inspection method becomes very useful. For example, referring to FIG. 21A, the object surface B3a is inspected by rotating the X-axis holders 330 in any one rotation direction Rx2, and referring to FIG. 21B, the object surface B3b may be inspected by rotating the X-axis holders 330 in the opposite rotation direction Rx3.

Figure 22:
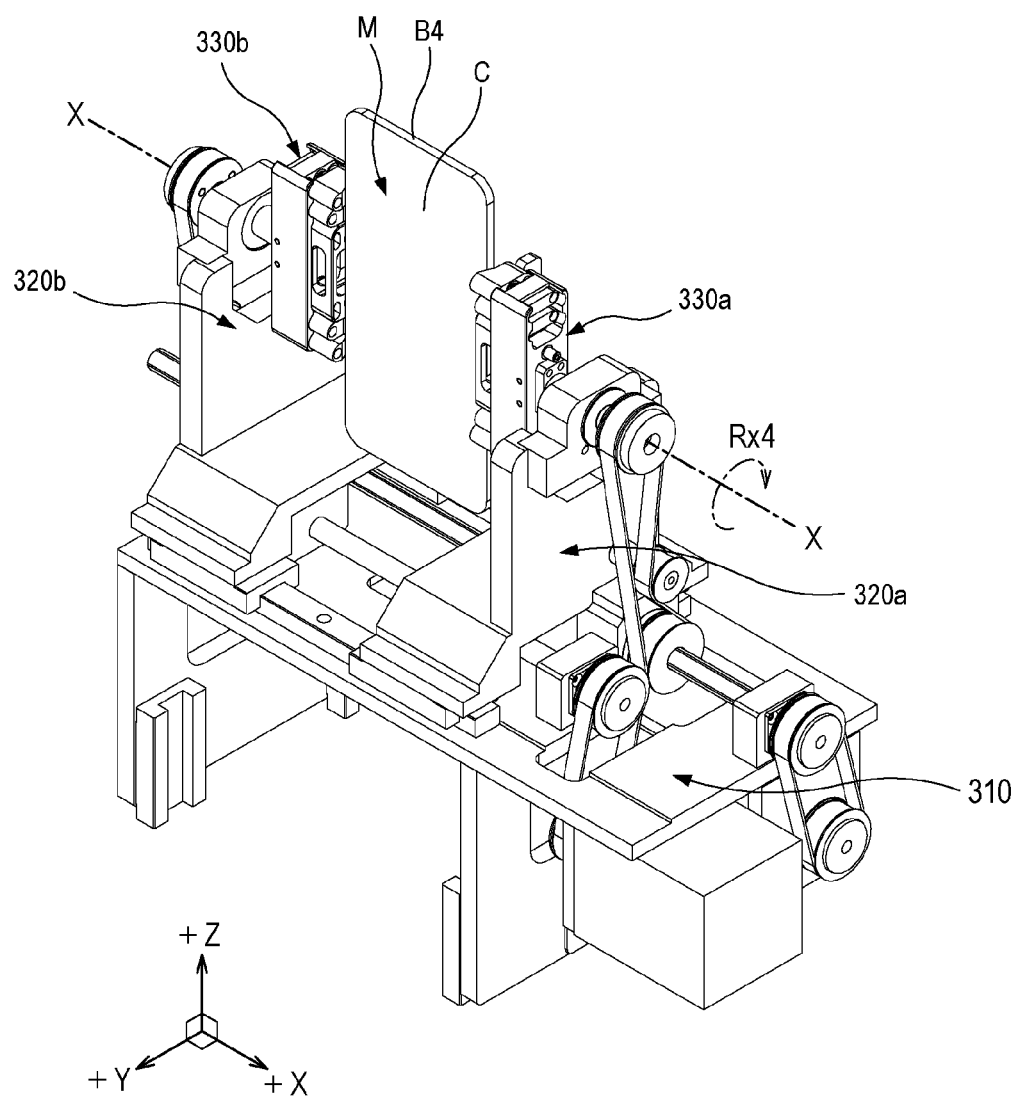

Referring to FIG. 22, when the X-axis holders 330 rotate the object M in any one rotation direction Rx4 about the X-axis, the object surface B4, which is opposite to the object surface B3, faces the +Z-axis direction. Here, the object surface B4 is inspected by the camera device.

Although not illustrated, when the X-axis flipper unit 300 rotates the object M, the camera device 30 maintains a predetermined distance Lo from the object surface of the object M facing the +Z-axis direction. For example, the Z-axis elevation unit 500 integrally moves the Y-axis flipper unit 100 and the X-axis flipper unit 300 in the Z-axis direction so as to maintain the distance Lo constant. A specific mechanism for this is the same as that of FIGS. 17A to 17C described above.

Figure 23:
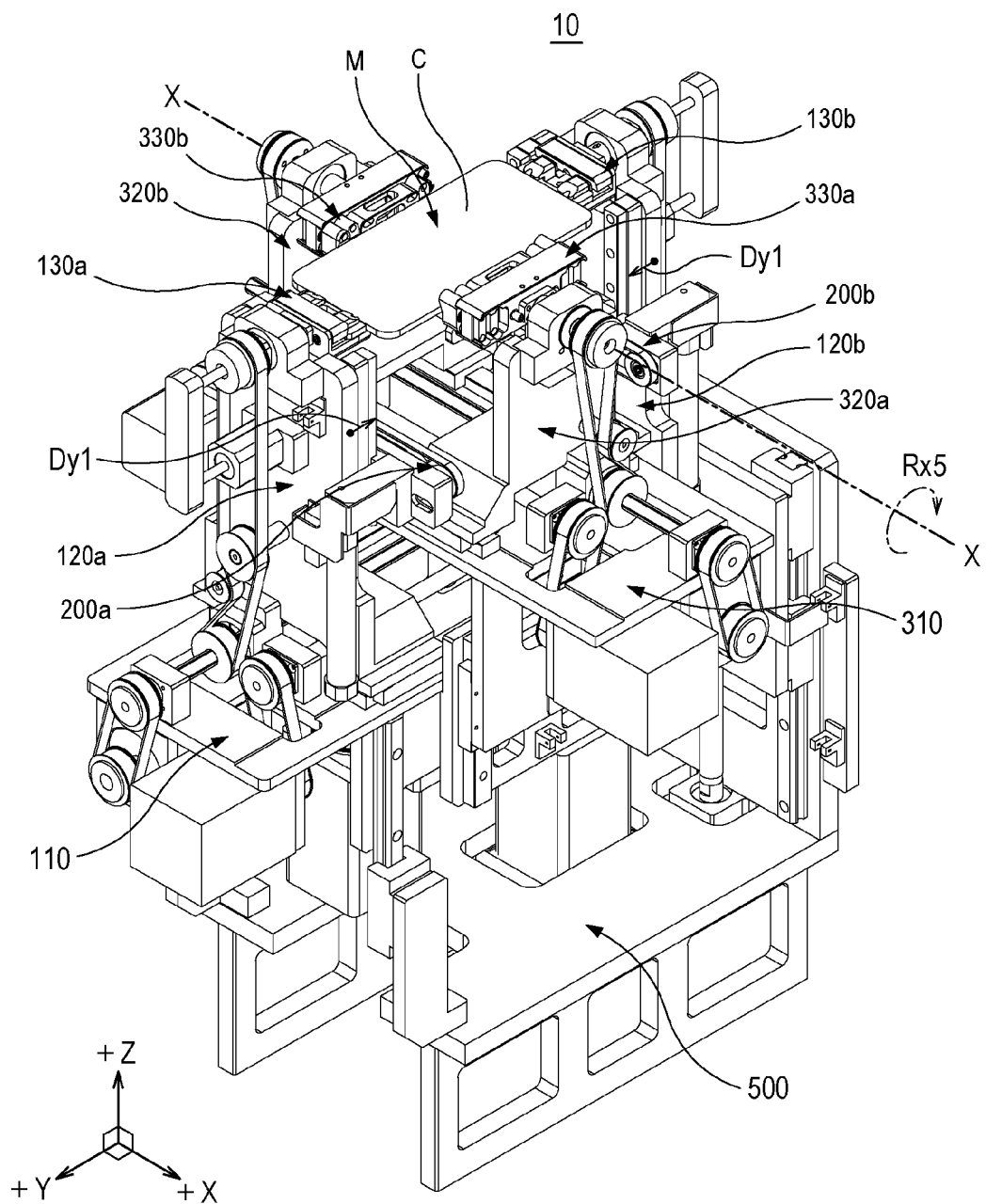

Referring to FIG. 23, the X-axis holders 330 rotate the object M (see arrow Rx5), and dispose the object such that the object surface C, which is opposite to the object surface A, faces the +Z-axis direction. A space between the pair of side frames 320a and 320b is narrowed in the Y-axis direction, and thus the pair of Y-axis holders 130a and 130b hold the object M (see arrows Dy1).

Figure 24:
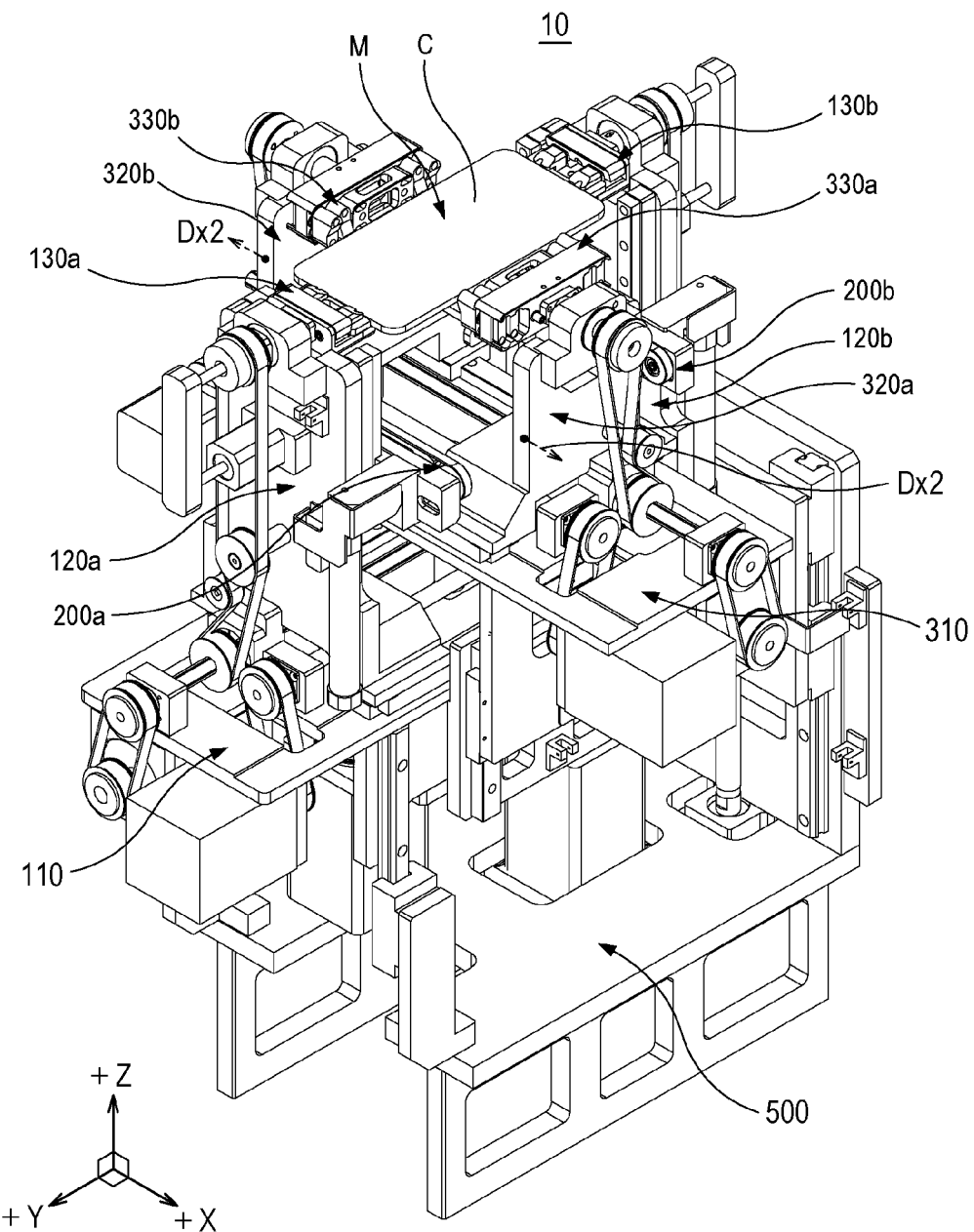

Referring to FIG. 24, the pair of side frames 320a and 320b are spaced apart from each other, and thus the pair of X-axis holders 330a and 330b are spaced apart from the object M (see arrows Dx2). Here, the object surface C, which is opposite to the object surface A, may be inspected.

Figure 25:
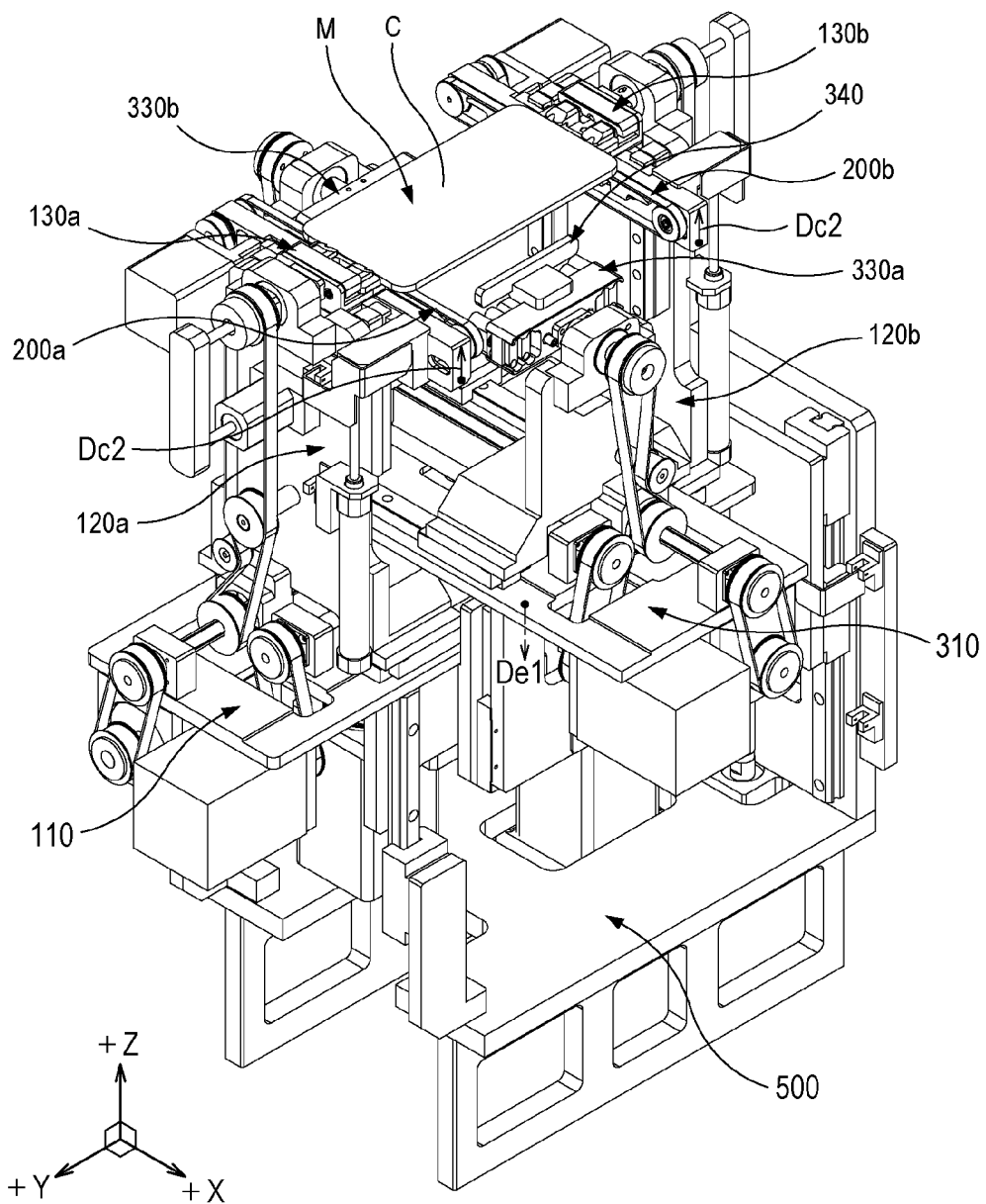

Referring to FIG. 25, the X-axis flipper unit 300 moves a predetermined distance in the −Z-axis direction with respect to the Y-axis flipper unit 100 (see arrow De1). Here, the X-axis flipper unit 300 is sufficiently lowered with respect to the Y-axis flipper unit 100, and thus the transfer stopper 340 is also disposed below the proceeding path of the object. In addition, the transfer unit 200 moves a predetermined distance in the +Z-axis direction with respect to the Y-axis flipper unit 100 (see arrows Dc2). Here, the transfer belts 210 of the transfer unit 200 support the bottom surface of the object M.

Figure 26:
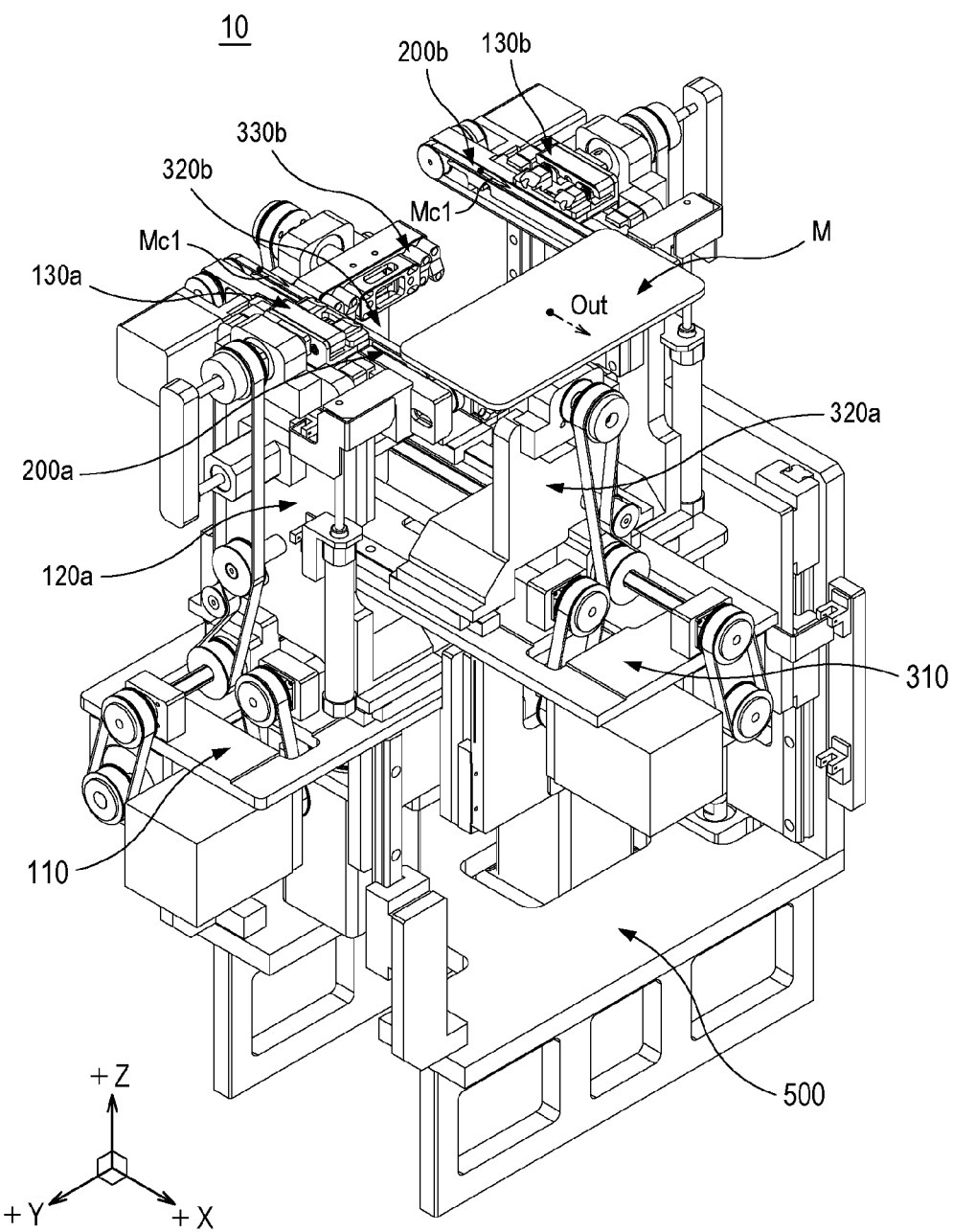

Referring to FIG. 26, the pair of body frames 120a and 120b are spaced apart from each other in the Y-axis direction, and thus only the transfer unit 200 supports the object M. Here, the top surfaces of the transfer belts 210 of the pair of transfer parts 200a and 200b move in the +X-axis direction (see arrows Mc1). Accordingly, the object M is discharged from the flipper apparatus 10 by the transfer unit 200 (see arrow Out).

Although process steps, method steps, algorithms, and the like are illustrated in sequential orders in flowcharts of FIGS. 27A to 29, such processes, methods, and algorithms may be configured to operate in any suitable orders. In other words, the steps of the processes, methods and algorithms described in various embodiments of the present disclosure need not be performed in the orders described in this disclosure. In addition, although some steps are described as being performed asynchronously, in other embodiments, these steps may be performed simultaneously. In addition, illustration of a process in a drawing does not imply that the illustrated process excludes other changes and modifications thereto, that the illustrated process or any of steps thereof are essential to one or more of the various embodiments of the present disclosure, or that the illustrated process is desirable.

Figure 27A:
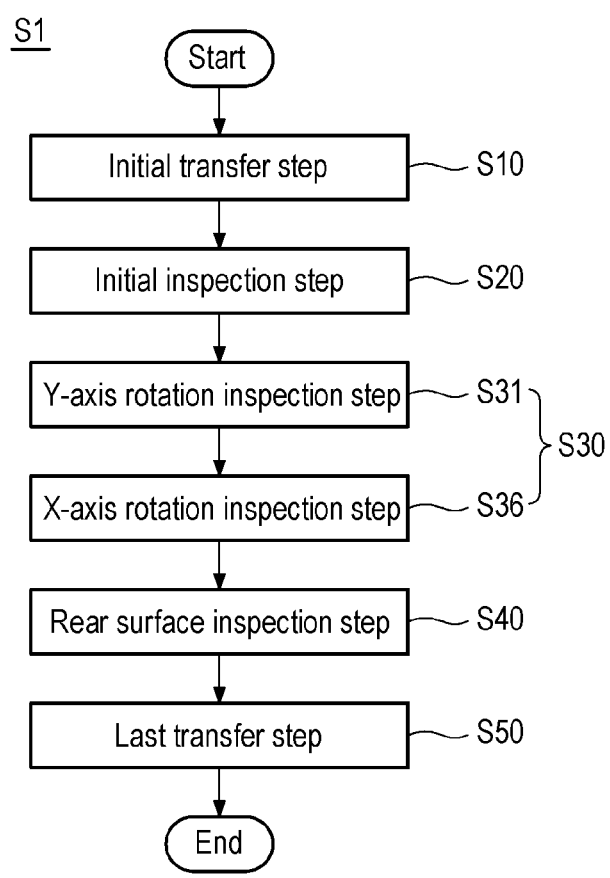
FIG. 27A is a flowchart of a method S1 for inspecting an object according to an embodiment.
Figure 27B:
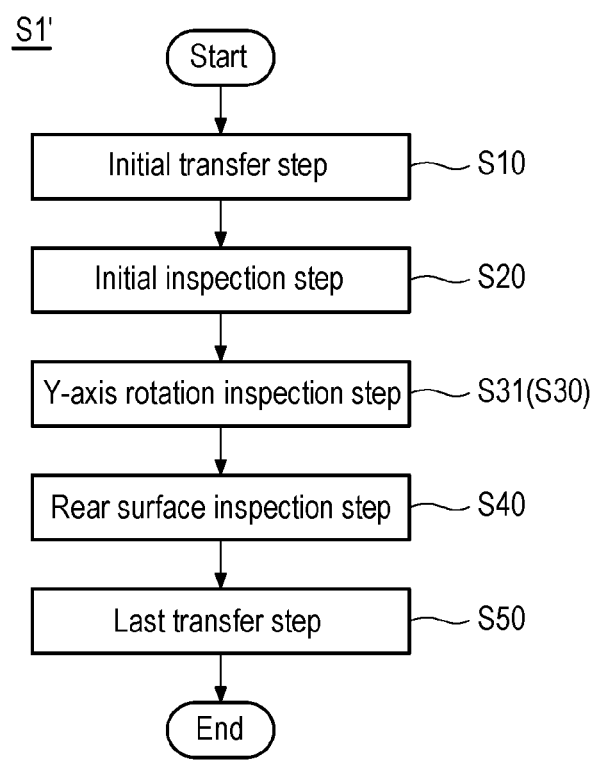
FIG. 27B is a flowchart of a method S1' for inspecting an object according to another embodiment.

FIG. 27A is a flowchart of a method S1 for inspecting one object according to an embodiment, and FIG. 27B is a flowchart of a method S1' for inspecting one object according to another embodiment. Here, "one object" means one of the first object M1 and the second object M2, and FIGS. 27A and 27B are flowcharts prepared with reference to the object M rotated by one of the first flipper apparatus 10A and the second flipper apparatus 10B.

Referring to FIG. 27A, a method S1 for inspecting one object M1 or M2 according to an embodiment may be performed using the flipper apparatus 10 of FIG. 3A and the camera device 30 of FIG. 1. The method S1 includes, before an initial inspection step S20, an initial transfer step S10 in which the object M is transferred in the X-axis direction by the transfer unit 200 of the flipper apparatus 10 (see FIGS. 9 and 10). In the initial transfer step S10, the object M is transferred in the X-axis direction such that the object M is placed at a correct position. Here, the correct position may be a position at which the Y-axis holders 130 are capable of holding the object M in the Y-axis direction. In the initial transfer step S10, the object M may be engaged with the transfer stopper 340 and may be disposed at the correct position. In the initial transfer step S10, the object M may be transferred in the +X-axis direction.

The method S1 includes, after the initial transfer step S10, an initial inspection step S20 in which the Y-axis holders 130 hold the object M in the Y-axis direction and the camera device inspects the object surface A of the object M (see FIGS. 11 and 12). In the initial inspection step S20, the Y-axis holders 130 hold the object M in the state in which the auxiliary grip parts 137 are disengaged from the object surface A. Here, the disengaged state means the state in which the auxiliary grip parts 137 do not cover a portion of the object surface A. Through this, the camera device is capable of inspecting the entire area of the object surface A without interference. The initial inspection step S20 may be referred to as a first inspection step S20.

In the initial inspection step S20, the transfer unit 200 moves in the −Z-axis direction with respect to the Y-axis flipper unit 100. In the initial inspection step S20, after the Y-axis holders 130 hold the object M, the transfer unit 200 may move in the −Z-axis direction with respect to the Y-axis holders 130. The transfer unit 200 is lowered with respect to the Y-axis flipper unit 100 and does not interfere with the rotational motion of the object M. Here, while the transfer unit 200 is lowered, the camera device may inspect the object surface A.

The method S1 includes, after the initial inspection step S20, a rotation inspection step S30 in which an object surface perpendicular to the object surface A is inspected by rotating the object M. In the rotation inspection step S30, the Y-axis holders 130 may rotate the object M about the Y-axis, and the camera device may inspect an object surface B1, which is perpendicular to the object surface A, and an object surface B2, which is opposite to the object surface B1. The rotation inspection step S30 may be referred to as a second inspection step S30.

In the rotation inspection step S30, the Y-axis holders 130 hold the object in the state in which the auxiliary grip parts 137 are engaged with the object surface A. Through this, the object M can be stably held by the Y-axis holders 130.

In the method S1 using the flipper apparatus 10 according to an embodiment in which the Y-axis flipper unit 100 and the X-axis flipper unit 300 are provided, the rotation inspection step S30 includes a Y-axis rotation inspection step S31 and an X-axis rotation inspection step S36.

In the Y-axis rotation inspection step S31, the Y-axis holders 130 rotate the object M about the Y-axis, and the camera device inspects an object surface B1, which is perpendicular to the object surface A, and an object surface B2, which is opposite to the object surface B1 (FIGS. 13 to 16). In the Y-axis rotation inspection step S31, the auxiliary grip parts 137 may move in the first direction with respect to the support grip parts 133 to be in the engaged state.

In the Y-axis rotation inspection step S31, the Y-axis holders 130 may rotate the object M about the Y-axis, and the camera device may inspect at least one of object surfaces B1a and B1b inclined by an angle of less than 90 degrees with respect to the object surface B1 and object surfaces (not illustrated) inclined by an angle of less than 90 degrees with respect to the object surface B2. In the Y-axis rotation inspection step S31, the Y-axis holders 130 may move in the Z-axis direction such that the object surface B1 and the object surface B2 are positioned at the same height as the object surface A (see FIGS. 17A to 17C). Here, the Y-axis holders 130 are moved in the Z-axis direction by the Z-axis elevation unit 500.

The X-axis rotation inspection step S36 may be performed after the Y-axis rotation inspection step S31. In the X-axis rotation inspection step S36, the X-axis holders 330 hold the object M in the X-axis direction and rotate the object M about the X-axis, and the camera device inspects an object surface B3, which is perpendicular to the object surface A, and an object surface B4, which is opposite to the object surface B3 (see FIGS. 18 to 22).

The X-axis rotation inspection step S36 includes a step in which the X-axis holders 330 hold the object M, a step in which the Y-axis holders 130 release the object M, and a step in which the X-axis holders 330 rotate the object M. A step in which a space between the pair of side frames 320a and 320b is narrowed in the X-axis direction such that the X-axis holders 330 hold the object M is performed in the state in which the object surface A of the object M is disposed to face the +Z axis by the Y-axis holders 130. In another embodiment (not illustrated), a step in which a space between the pair of side frames 320a and 320b is narrowed in the X-axis direction such that the X-axis holders 330 hold the object M may be performed in the state in which an object surface C of the object M is disposed to face the +Z axis by the Y-axis holders 130. After the step in which the X-axis holders 330 hold the object M, a step in which the pair of body frames 120a and 120b are spaced apart from each other in the Y-axis direction and the auxiliary grip parts 137 are moved in the second direction with respect to the support grip parts 136 so as to release the object M is performed. After the step in which the Y-axis holders 130 release the object M, a step in which the X-axis holders 330 rotate the object M is performed.

In the X-axis rotation inspection step S36, the X-axis holders 330 may rotate the object M about the X-axis, and the camera device may inspect at least one of object surfaces B3a and B3b inclined to an angle of less than 90 degrees with respect to the object surface B3 and object surfaces (not illustrated) inclined to an angle of less than 90 degrees with respect to the object surface B4. In the X-axis rotation inspection step S36, the X-axis holders 330 may move in the Z-axis direction such that the object surface B3 and the object surface B4 are positioned at the same height as the object surface A. Here, the X-axis holders 330 are moved in the Z-axis direction by the Z-axis elevation unit 500.

The method S1 may include a rear surface inspection step S40 of inspecting an object surface C after the rotation inspection step S30 (see FIGS. 23 to 25). In the rear surface inspection step S40, the Y-axis holders 130 hold the object M in the Y-axis direction, and the camera device inspects the object surface C, which is opposite to the object surface A. The rear surface inspection step S40 may be referred to as a third inspection step S40.

In the rear surface inspection step S40, the Y-axis holders 130 hold the object M in the state in which the auxiliary grip parts 137 are disengaged from the object surface C. Here, the disengaged state means the state in which the auxiliary grip parts 137 do not cover a portion of the object surface C. Through this, the camera device is capable of inspecting the entire area of the object surface C without interference.

The rear surface inspection step S40 includes a step in which the object M is rotated such that the object surface C faces the +Z-axis direction. In the embodiment in which the X-axis rotation inspection step S36 is provided, the rear surface inspection step S40 includes a step in which the X-axis holders 330 rotate the object M such that the object surface C faces the +Z-axis direction, and a step in which the Y-axis holders 130 hold the object M.

In the rear surface inspection step S40, the transfer unit 200 moves in the +Z-axis direction with respect to the Y-axis flipper unit 100. In the rear surface inspection step S40, the transfer unit 200 is raised in the +Z-axis direction with respect to the Y-axis holders 130 to support the object M. Here, it is also possible to inspect the object surface C while the transfer unit 200 is being raised.

In the rear surface inspection step S40, after the Y-axis holders 130 hold the object M, the X-axis holders 330 may move in the −Z-axis direction with respect to the Y-axis holders 130. Specifically, after the Y-axis holders 130 hold the object M, the pair of X-axis holders 330 may be spaced apart from each other in the X-axis direction, and may move in the −Z-axis direction with respect to the Y-axis holders 130. When the X-axis holders 330 are sufficiently lowered with respect to the Y-axis flipper unit 100 and the object M is transferred in the last transfer step S50, the transfer stopper 340 may be spaced apart from the object M in the −Z-axis direction. Here, it is also possible to inspect the object surface C while the X-axis holders 330 are being lowered.

The method S1 includes, after the rear surface inspection step S40, a last transfer step S50 in which the object M is transferred in the X-axis direction by the transfer unit 200 (see FIG. 26). In the last transfer step S50, the object M may be transferred in the +X-axis direction.

Referring to FIG. 27B, a method S1' for inspecting one object M1 or M2 according to another embodiment may be performed using the flipper apparatus 10' of FIG. 3B and the camera device 30 of FIG. 1. Hereinafter, a method S1' according to the embodiment of FIG. 27B will be described, focusing on differences from the embodiment of FIG. 27A described above.

In the method S1' performed using the flipper apparatus 10' according to another embodiment in which the X-axis flipper unit 300 is not provided and the Y-axis flipper unit 100 is provided, the rotation inspection step S30 may not include the X-axis rotation inspection step S36. After the object surface B1 and the object surface B2 are inspected in the Y-axis rotation inspection step S31, the rear surface inspection step S40 may be performed. In the rear surface inspection step S40, in the state in which the Y-axis holders 130 are disposed such that the object surface C of the object M faces the +Z-axis, the pair of transfer parts 200a and 200b may move up so as to support the object M and the pair of Y-axis holders 130 may be spaced apart from each other and may release the object M. After the pair of Y-axis holders 130 are spaced apart from each other and release the object M, the Y-axis holders may rotate 180 degrees about the Y-axis and may narrow a space therebetween to hold the object M again, and then the object surface C may be inspected.

Figure 28:
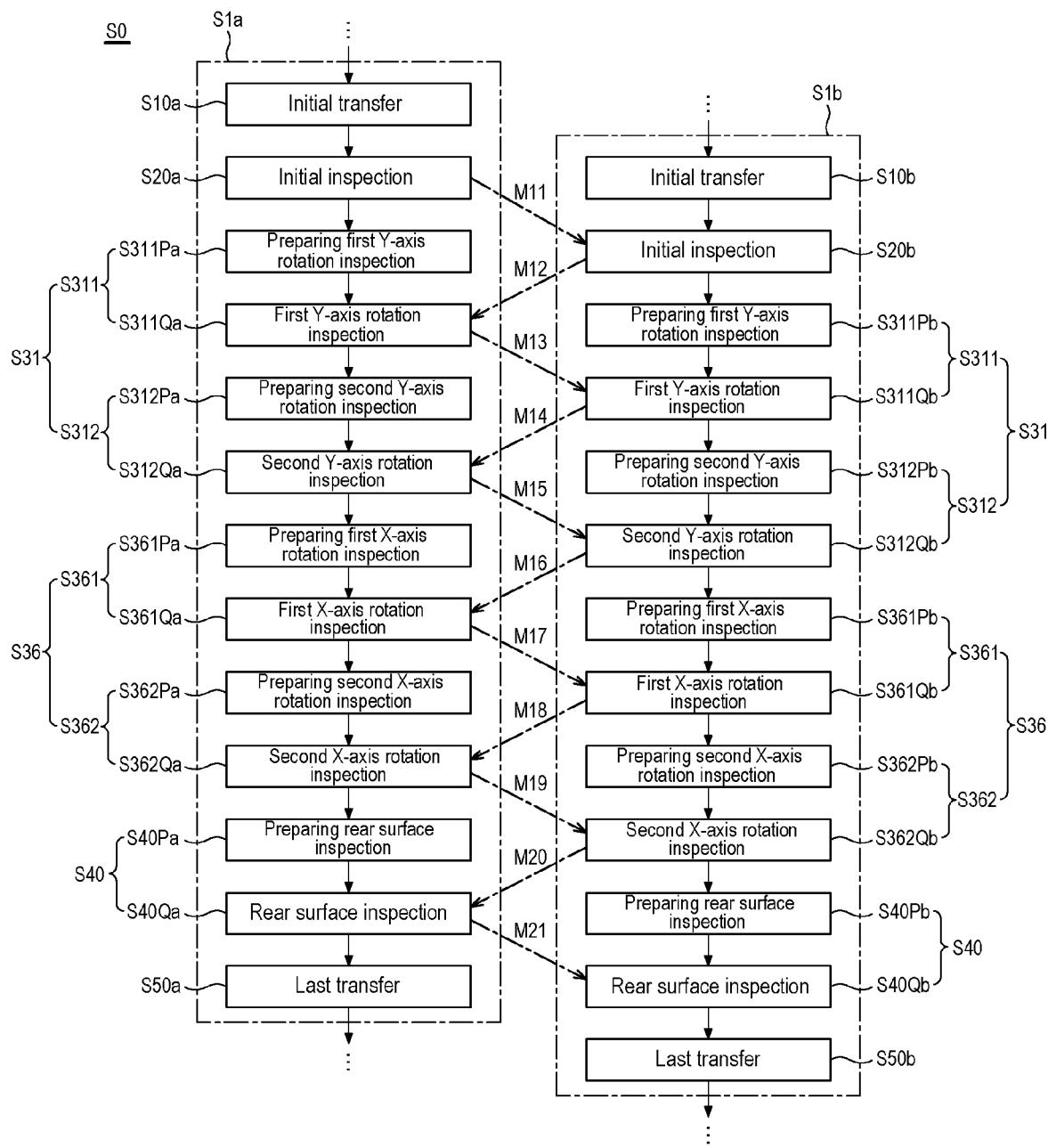
FIG. 28 is a flowchart of an object inspection method S0 according to an embodiment of the present disclosure.
Figure 29:
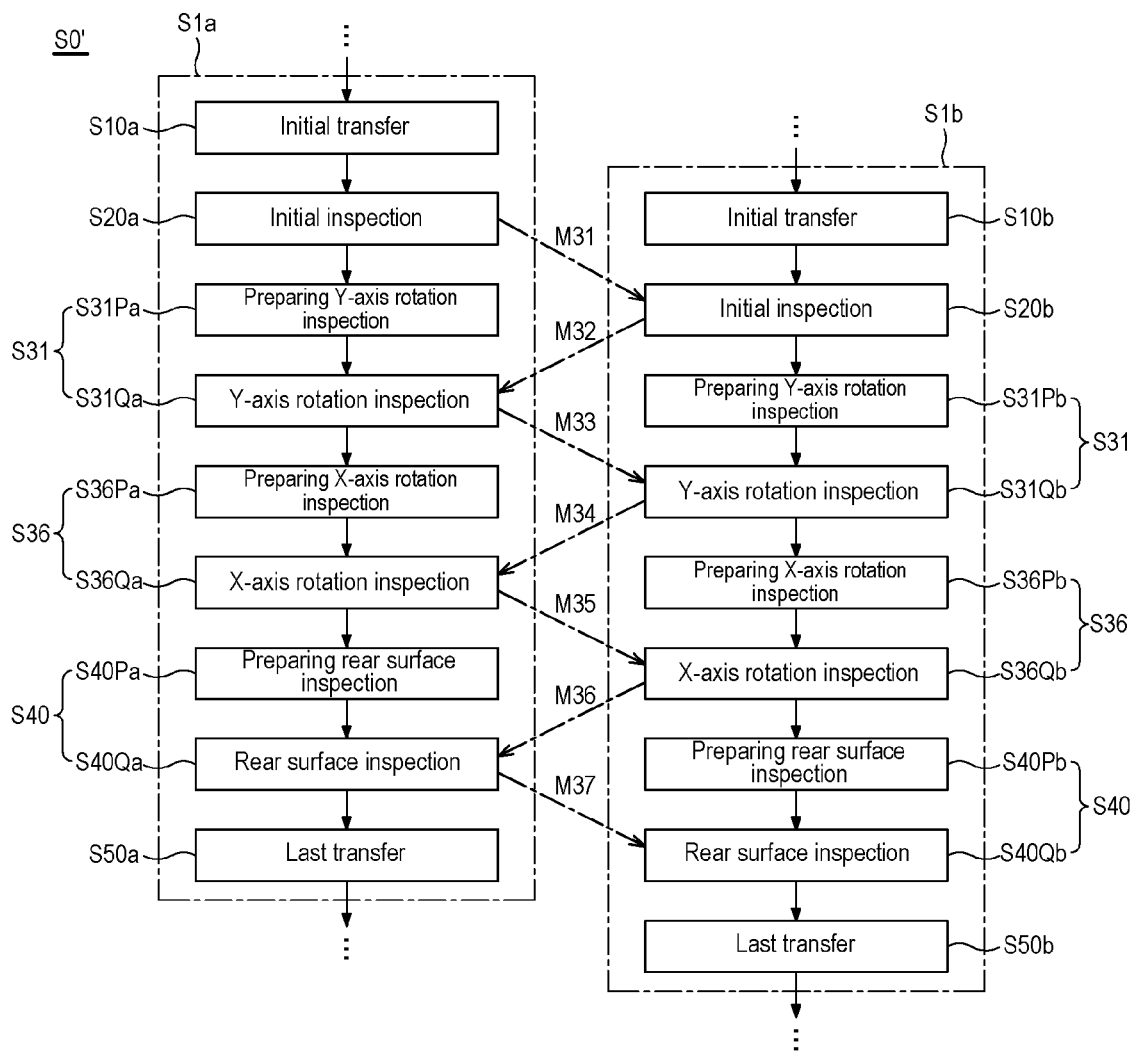
FIG. 29 is a flowchart of an object inspection method S0' according to another embodiment of the present disclosure.

For convenience of description, an object inspection method is described with reference to the method S1 according to the embodiment of FIG. 27A, but is not limited thereto. FIG. 28 is a flowchart of an object inspection method S0 according to an embodiment of the present disclosure, and FIG. 29 is a flowchart of an object inspection method S0' according to another embodiment of the present disclosure. Referring to FIGS. 28 and 29, the object inspection methods S0 and S0' may be performed using the first flipper apparatus 10A, the second flipper apparatus 10B, and the single camera device 30.

Referring to FIGS. 28 and 29, the object inspection method S0 or S0' includes: a first object inspection step S1a in which the first flipper apparatus 10A rotates a first object M1 and the camera device 30 inspects an object surface of the first object M1; and a second object inspection step S1b in which the second flipper apparatus 10B rotates a second object M2 and the camera device 30 inspects an object surface of the second object M2 while the first object inspection step S1a is performed.

While the first object inspection step S1a and the second object inspection step S1b are performed, the camera device 30 moves at least once from a position corresponding to one of the first flipper apparatus 10A and the second flipper apparatus 10B to a position corresponding to the other. While the first object inspection step S1*a* and the second object inspection step S1*b* are performed, the camera device 30 may alternately inspect the object surface of the first object M1 and the object surface of the second object M2. During this, in the process in which the flipper apparatus 10 is performing a preparation operation in order to dispose a corresponding object surface of one object M1 or M2, the camera device 30 is capable of inspecting the other object M2 or M1. Thus, it is possible to reduce the loss time of the camera device 30.

In the present disclosure, the movement of the camera device 30 from one of a position corresponding to the first flipper apparatus 10 and a position corresponding to the second flipper apparatus 10B to the other may be referred to as a "switching movement." M11 to M21 of FIG. 28 and M31 to M37 of FIG. 29 are arrows representing the switching movement of the camera device 30, and an arrow directed from the first object inspection step S1*a* to the second object inspection step indicates a switching movement from the first flipper apparatus 10A to the second flipper apparatus 10B, and an arrow directed from the second object inspection step S1*b* to the first object inspection step indicates a switching movement from the second flipper apparatus 10B to the first flipper apparatus 10A.

Referring to FIGS. 28 and 29, each of the first object inspection step S1*a* and the second object inspection step S1*b* may be understood as the above-described method S1, but in another embodiment, each of the first object inspection step S1*a* and the second object inspection step S1*b* may be the method S1' described above or the like. Each of the first object inspection step S1*a* and the second object inspection step S1*b* may include an initial transfer step S10*a* or S10*b*. Each of the first object inspection step S1*a* and the second object inspection step S1*b* may include an initial inspection step S20*a* or S20*b* in which corresponding Y-axis holders hold a corresponding object in the Y-axis direction, and the camera device 30 inspects an object surface A of the corresponding object. Each of the first object inspection step S1*a* and the second object inspection step S1*b* includes a Y-axis rotation inspection step S31 in which the corresponding Y-axis holders rotate the corresponding object about the Y-axis and the camera device 30 inspects an object surface B1 perpendicular to the corresponding object surface A and an object surface B2 opposite to the corresponding object surface B1. Each of the first object inspection step S1*a* and the second object inspection step S1*b* may include an X-axis rotation inspection step S36 in which the corresponding X-axis holders hold the corresponding object M in the X-axis direction and rotate the corresponding object M about the X-axis and the camera device 30 inspects an object surface B3 perpendicular to the corresponding object surface A and an object surface B4 opposite to the corresponding object surface B3. Each of the first object inspection step S1*a* and the second object inspection step S1*b* may include a rear surface inspection step S40 in which the corresponding Y-axis holders hold the corresponding object M in the Y-axis direction and the camera device inspects an object surface C opposite the corresponding object surface A. The rear surface inspection step S40 may be performed after the X-axis rotation inspection step S36, but may be performed after the Y-axis rotation inspection step S31 according to an embodiment. Each of the first object inspection step S1*a* and the second object inspection step S1*b* may include, after the rear surface inspection step S40, a last transfer step S50*a* or S50*b* in which the corresponding object M is transferred in the X-axis direction. Here, the "corresponding object" means an object to be inspected in each of the first object inspection step S1*a* and the second object inspection step S1*b*, and the "corresponding" configuration means a configuration used in each of the first object inspection steps S1*a* and the second object inspection step S1*b*.

Referring to FIGS. 28 and 29, while the initial inspection step S20*a* of the first object M1 and the Y-axis rotation inspection step S31 of the first object M1 are performed, the initial inspection step S20*b* of the second object M2 may be performed. After the initial inspection step S20*a* is performed in the state in which the camera device 30 is at located a position corresponding to the first flipper apparatus 10A, the camera device 30 may perform a switching movement M11 or M31 to the second flipper apparatus 10B and may perform the initial inspection step S20*b*. After the initial inspection step S20*b* is performed in the state in which the camera device 30 is at located a position corresponding to the second flipper apparatus 10B, the camera device 30 may perform a switching movement M12 or M32 to the first flipper apparatus 10A and may perform inspection processes S311Qa and S31Qa of the initial inspection step S31.

While the Y-axis rotation inspection step S31 of the first object M1 is performed, the camera device 30 may move at least once between the position corresponding to the first flipper apparatus 10A and the position corresponding to the second flipper apparatus 10B. In the example of FIG. 28, while the Y-axis rotation inspection step S31 of the first object M1 is performed, the camera device 30 performs three switching movements M12, M13, and M14, and in the example of FIG. 29, while the Y-axis rotation inspection step S31 of the object M1 is performed, the camera device 30 performs one switching movement M32.

While the Y-axis rotation inspection step S31 of the second object M2 and the X-axis rotation inspection step S36 of the second object M2 are performed, the camera device 30 may move at least once between the position corresponding to the first flipper apparatus 10A and the position corresponding to the second flipper apparatus 10B. In the example of FIG. 28, while the Y-axis rotation inspection step S31 of the second object M2 and the X-axis rotation inspection step S36 of the second object M2 are performed, the camera device 30 performs seven switching movements M13, M14, M15, M16, M17, M18, and M19, and in the example of FIG. 29, while the Y-axis rotation inspection step S31 of the second object M2 and the X-axis rotation inspection step S36 of the second object M2 are performed, the camera device 30 performs three switching movements M33, M34, and M35.

While the X-axis rotation inspection step S36 of the first object M1 is performed, the camera device 30 may move at least once between the position corresponding to the first flipper apparatus 10A and the position corresponding to the second flipper apparatus 10B. In the example of FIG. 28, while the X-axis rotation inspection step S36 of the first object M1 is performed, the camera device 30 performs three switching movements M16, M17, and M18, and in the example of FIG. 29, while the X-axis rotation inspection step S36 of the object M1 is performed, the camera device 30 performs one switching movement M34.

While the X-axis rotation inspection step S36 of the second object M2 and the rear surface inspection step S40 of the second object M2 are performed, the rear surface inspection step S40 of the first object M1 may be performed. After the inspection processes S362Qb and S36Qb of the X-axis rotation inspection step S36 of the second object M2 are performed in the state in which the camera device 30 is located at the position corresponding to the second flipper apparatus 10B, the camera device performs a switching movement M20 or M36 to the first flipper apparatus 10A and may perform an inspection process S40Qa of the rear inspection step S40 of the first object M1. After the inspection process S40Qa is performed in the state in which the camera device 30 is located at the position corresponding to the second flipper apparatus 10B, the camera device 30 may perform a switching movement M21 or M37 to the second flipper apparatus 10B and may perform an inspection process S40Qb of the rear surface inspection step S40.

While the rear surface inspection step S40 of the first object M1 and the post transfer step S50a of the first object M1 are performed, the camera device 30 may move at least once between the position corresponding to the first flipper apparatus 10A and the position corresponding to the second flipper apparatus 10B. In the example of FIG. 28, while the rear surface inspection step S40 of the first object M1 and the last transfer step S50a of the first object M1 are performed, the camera device 30 performs at least two switching movements M20 and M21, and in the example of FIG. 29, while the rear surface inspection step S40 of the first object M1 and the last transfer step S50a of the first object M1 are performed, the camera device 30 performs at least two switching movements M36 and M37.

Referring to FIG. 28, the Y-axis rotation inspection step S31 may include a first Y-axis rotation inspection step S311 in which the object surface B1 is disposed at a preset position and is inspected, and a second Y-axis rotation inspection step S312 in which the object surface B2 is disposed at a preset position and is inspected. The X-axis rotation inspection step S36 may include a first X-axis rotation inspection step S361 in which the object surface B3 is disposed at a preset position and is inspected, and a second X-axis rotation inspection step S362 in which the object surface B4 is disposed at a preset position and is inspected.

Referring to FIGS. 28 and 29, the Y-axis rotation inspection step S31 of one object M1 or M2 includes preparation processes S311Pa, S312Pa, S311Pb, and S312Pb in FIG. 28 and S3iPa and S31Pb in FIG. 29 in which the camera device 30 stays at the position corresponding to the other object M2 or M1 and performs switching movements to the position corresponding to the one object M1 or M2. The Y-axis rotation inspection step S31 of one object M1 or M2 includes inspection processes S311Qa, S312Qa, S311Qb, and S312Qb in FIG. 28 and S31Qa and S31Qb in FIG. 29 in which the camera device 30 stays at the position corresponding to the one object M1 or M2.

The X-axis rotation inspection step S36 of one object M1 or M2 includes preparation processes S361Pa, S362Pa, S361Pb, and S362Pb in FIG. 28 and S36Pa and S36Pb in FIG. 29 in which the camera device 30 stays at the position corresponding to the other object M2 or M1 and performs switching movements to the position corresponding to the one object M1 or M2. The X-axis rotation inspection step S36 of one object M1 or M2 includes inspection processes S361Qa, S362Qa, S361Qb, and S362Qb in FIG. 28 and S36Qa and S36Qb in FIG. 29 in which the camera device 30 stays at the position corresponding to the one object M1 or M2.

The rear surface inspection step S40 of one object M1 or M2 includes preparation processes S40Pa and S40Pb in which the camera device 30 stays at the position corresponding to the other object M2 or M1 and performs switching movements to the position corresponding to the one object M1 or M2. The rear surface inspection step S40 of one object M1 or M2 includes inspection processes S40Qa and S40Qb in which the camera device 30 stays at the position corresponding to the one object M1 or M2.

In the preparation processes (the processes indicated by P in FIGS. 28 and 29), the camera device 30 performs switching movements. In addition, during the preparation process of one object M1 or M2, an inspection of an object surface of the other object M2 or M1 is performed. In addition, the flipper apparatus 10 of the one object M1 or M2 operates to dispose the object surface of the one object M1 or M2 at a predetermined position during the preparation processes of the one object M1 or M2.

During the inspection processes (FIGS. 28 and 29) of the object surface of one object M1 or M2, an inspection of the object surface of the one object M1 or M2 is performed. In addition, the flipper apparatus 10 of the one object M1 or M2 may operate to dispose the object surface of the one object M1 or M2 at a predetermined position even during the inspection processes of the one object M1 or M2.

Table 1 below is a test example according to the object inspection method S0 of FIG. 28. In Table 1, operations Na for the first object M1 and a time Ta required for each of the operations were measured in a unit of seconds, operations Nb for the second object M2 and a time Tb required for each of the operations were measured in a unit of seconds, and a net required time To was measured in a unit of seconds when the operations Na and Nb for the first object M1 and the second object M2 were simultaneously performed.

TABLE 1

| First object M1 | | Second object M2 | | |
|---|---|---|---|---|
| Operation Na | Required time Ta [sec] | Operation Nb | Required time Tb [sec] | Net required time To [sec] |
| N1 | 0.69 | | | 0.69 |
| N2 | 2.71 | N1 | 0.69 | 2.71 |
| N3 | 1.11 | N2 | 2.71 | 2.71 |
| N4 | 3.82 | N3 | 1.11 | 3.82 |
| N5 | 0.42 | N4 | 3.82 | 3.82 |
| N6 | 3.82 | N5 | 0.42 | 3.82 |
| N7 | 2.70 | N6 | 3.82 | 3.82 |
| N8 | 3.94 | N7 | 2.70 | 3.94 |
| N9 | 2.77 | N8 | 3.94 | 3.94 |
| N10 | 2.71 | N9 | 2.77 | 2.77 |
| N11 | 0.79 | N10 | 2.71 | 2.71 |
| | | N11 | 0.79 | |

Here, N1 denotes an operation in which an object M is transferred and the object surface A is placed at a preset position, and N2 denotes an operation in which the object surface A is inspected. N3 denotes an operation in which the object surface B2 is placed at a preset position, and N4 denotes an operation in which the object surface B2 is inspected. N5 denotes an operation in which the object surface B3 is placed at a preset position, and N6 denotes an operation in which the object surface B3 is inspected. N7 denotes an operation in which the object surface B4 is placed at a preset position, and N8 denotes an operation in which the object surface B4 is inspected. N9 denotes an operation in which the object surface C is placed at a preset position, and N10 denotes an operation in which the object surface C is inspected. N11 denotes an operation in which an object M is transferred and discharged from the flipper apparatus 10. Each required time (Ta, Tb) reflects the time for the camera device 30 to perform a switching movement.

Referring to Table 1, the sum of the required time Ta for one cycle of the operations for the first object M1 is 25.48 seconds, and the sum of the required time Tb for one cycle of the operations for the second object M2 is also 25.48 seconds. Accordingly, when one cycle for the first object M1 is performed and then one cycle for the second object M2 is performed, a total of 66.23 seconds will be required. However, by reducing the loss time through the switching operation of the camera device 30, it can be seen that the sum of the net required time To for one cycle of the operations for the first object M1 and the second object M2 is 34.75 seconds, which is significantly smaller than 66.23 seconds. Since the inspection cycle for two objects M is performed for 34.75 seconds, it can be seen that the inspection cycle of one object M is about 17.38 seconds, which is significantly smaller than 25.48 seconds. Through this, it can be seen that according to the embodiments of the present disclosure, it is possible to significantly improve inspection efficiency while using only one camera device 30, which is expensive equipment.

While the foregoing methods have been described with respect to particular embodiments, these methods may also be implemented as computer-readable codes on a computer-readable recording medium. The computer-readable recoding medium includes any kind of data storage devices that can be read by a computer system. Examples of the computer-readable recording medium include a ROM, RAM, CD-ROM, magnetic tape, floppy disk, optical data storage device and the like. Also, the computer-readable recoding medium can be distributed on computer systems which are connected through a network so that the computer-readable codes can be stored and executed in a distributed manner. Further, the functional programs, codes and code segments for implementing the foregoing embodiments can easily be inferred by programmers in the art to which the present disclosure pertains.

Although the technical spirit of the present disclosure has been described by the examples described in some embodiments and illustrated in the accompanying drawings, it should be noted that various substitutions, modifications, and changes can be made without departing from the scope of the present disclosure which can be understood by those skilled in the art to which the present disclosure pertains. In addition, it should be noted that that such substitutions, modifications and changes are intended to fall within the scope of the appended claims.

What is claimed is:

1. An object inspection apparatus, on XYZ orthogonal coordinates, comprising:
    a first flipper apparatus configured to hold and rotate a first object;
    a second flipper apparatus configured to hold and rotate a second object, the first flipper apparatus and the second flipper apparatus being arranged in a Y-axis direction; and
    a single camera device configured to move from one of a position at which the first object held by the first flipper apparatus is to be inspected and a position at which the second object held by the second flipper apparatus is to be inspected to the other, the camera device being configured to inspect object surfaces of the first object and the second object facing a +Z-axis direction,
    wherein each of the first flipper apparatus and the second flipper apparatus includes at least one flipper unit configured to hold an object in a predetermined axis direction and to rotate the object about a predetermined axis, and
    wherein the at least one flipper unit comprises:
        a Y-axis flipper unit configured to hold the object in the Y-axis direction and to rotate the object about a Y-axis; and
        an X-axis flipper unit configured to hold the object in an X-axis direction orthogonal to the Y-axis direction and the +Z-axis direction and to rotate the object about an X-axis.

2. The object inspection apparatus of claim 1, wherein the at least one flipper unit comprises a Y-axis flipper unit configured to hold the object in a Y-axis direction and to rotate the object about a Y-axis.

3. The object inspection apparatus of claim 2, wherein each of the first flipper apparatus and the second flipper apparatus further comprises a transfer unit configured to transfer the object in an X-axis direction.

4. The object inspection apparatus of claim 3, wherein the first flipper apparatus and the second flipper apparatus are arranged in the Y-axis direction, and
    the camera device is configured to move in the Y-axis direction.

5. The object inspection apparatus of claim 2, wherein the at least one flipper unit comprises an X-axis flipper unit configured to hold the object in an X-axis direction and to rotate the object about an X-axis.

6. The object inspection apparatus of claim 5, wherein the Y-axis flipper unit comprises:
    a pair of body frames configured to operate to narrow or widen a space therebetween in the Y-axis direction;
    a Y-axis flipper base supporting the pair of body frames; and
    a pair of Y-axis holders supported on the pair of body frames corresponding thereto, the pair of Y-axis holders being configured to rotate about the Y-axis and hold the object therebetween, and
    wherein the X-axis flipper unit comprises:
    a pair of side frames configured to operate to narrow or widen a space therebetween in the X-axis direction;
    an X-axis flipper base supporting the pair of side frames; and
    a pair of X-axis holders supported on the pair of side frames corresponding thereto, the pair of X-axis holders being configured to rotate about the X-axis with respect to the pair of side frames and hold the object therebetween.

7. The object inspection apparatus of claim 1, wherein each of the first flipper apparatus and the second flipper apparatus includes a Z-axis elevation unit on which the at least one flipper unit is supported, the Z-axis elevation unit being configured to move the at least one flipper unit up and down in a Z-axis direction.

8. The object inspection apparatus of claim 1, further comprising:
    a camera device frame configured to movably support the camera device.

9. An object inspection method using the objection inspection apparatus of claim 1, the object inspection method comprising:
    a first object inspection step in which the first flipper apparatus rotates the first object and the camera device inspects an object surface of the first object; and
    a second object inspection step in which the second flipper apparatus rotates the second object and the camera device inspects an object surface of the second object while the first object inspection step is performed,
    wherein, while the first object inspection step and the second object inspection step are performed, the camera device moves at least once from one of a position at which the first object held by the first flipper apparatus is to be inspected and a position at which the second object held by the second flipper apparatus is to be inspected to the other, and wherein, while the first object inspection step and the second object inspection step are performed, the camera device alternately inspects the object surface of the first object and the object surface of the second object.

10. The object inspection method of claim 9, wherein each of the first object inspection step and the second object inspection step comprises:
an initial inspection step in which a corresponding Y-axis holder holds a corresponding object in a Y-axis direction and the camera device inspects an object surface A of the corresponding object; and
a Y-axis rotation inspection step in which the corresponding Y-axis holder rotates the corresponding object about a Y-axis and the camera device inspects an object surface B1, which is perpendicular to the corresponding object surface A, and an object surface B2, which is opposite to the corresponding object surface B1,
wherein, while the initial inspection step of the first object and the Y-axis rotation inspection step of the first object are performed, the initial inspection step of the second object is performed.

11. The object inspection method of claim 10, wherein, while the Y-axis rotation inspection step of the first object is performed, the camera device moves at least once between the position at which the first object held by the first flipper apparatus is to be inspected and the position at which the second object held by the second flipper apparatus is to be inspected.

12. The object inspection method of claim 9, wherein each of the first object inspection step and the second object inspection step comprises:
an initial inspection step in which a corresponding Y-axis holder holds a corresponding object in a Y-axis direction and the camera device inspects an object surface A of the corresponding object;
a Y-axis rotation inspection step in which the corresponding Y-axis holder rotates the corresponding object about a Y-axis and the camera device inspects an object surface B1, which is perpendicular to the corresponding object surface A, and an object surface B2, which is opposite to the corresponding object surface B1; and
an X-axis rotation inspection step in which a corresponding X-axis holder holds the corresponding object in an X-axis direction and rotates the corresponding object about an X-axis and the camera device inspects an object surface B3, which is perpendicular to the corresponding object surface A, and an object surface B4, which is opposite to the corresponding object surface B3,
wherein, while the Y-axis rotation inspection step of the second object and the X-axis rotation inspection step of the second object are performed, the camera device moves at least once between the position at which the first object held by the first flipper apparatus is to be inspected and the position at which the second object held by the second flipper apparatus is to be inspected.

13. The object inspection method of claim 12, wherein, while the X-axis rotation inspection step of the first object is performed, the camera device moves at least once between the position at which the first object held by the first flipper apparatus is to be inspected and the position at which the second object held by the second flipper apparatus is to be inspected.

14. The object inspection method of claim 12, wherein each of the first object inspection step and the second object inspection step comprises:
a rear surface inspection step in which the corresponding Y-axis holder holds the corresponding object in the Y-axis direction and the camera device inspects an object surface C, which is opposite to the corresponding object surface A, after the X-axis rotation inspection step, and
wherein, while the X-axis rotation inspection step of the second object and the rear surface inspection step of the second object are performed, the rear surface inspection step of the first object is performed.

15. The object inspection method of claim 9, wherein each of the first object inspection step and the second object inspection step comprises:
an initial inspection step in which a corresponding Y-axis holder holds a corresponding object in a Y-axis direction and the camera device inspects an object surface A of the corresponding object;
a Y-axis rotation inspection step in which the corresponding Y-axis holder rotates the corresponding object about a Y-axis and the camera device inspects an object surface B1, which is perpendicular to the corresponding object surface A, and an object surface B2, which is opposite to the corresponding object surface B1;
a rear surface inspection step in which the corresponding Y-axis holder holds the corresponding object in the Y-axis direction and the camera device inspects an object surface C, which is opposite to the corresponding object surface A of the object; and
a last transfer step in which the corresponding object is transferred in an X-axis direction, after the rear surface inspection step,
wherein, while the rear surface inspection step of the first object and the last transfer step of the first object are performed, the camera device moves at least once between the position at which the first object held by the first flipper apparatus is to be inspected and the position at which the second object held by the second flipper apparatus is to be inspected.

* * * * *